US011215896B2

(12) United States Patent
Kadono et al.

(10) Patent No.: US 11,215,896 B2
(45) Date of Patent: Jan. 4, 2022

(54) DISPLAY APPARATUS

(71) Applicant: Sony Corporation, Tokyo (JP)

(72) Inventors: Koji Kadono, Kanagawa (JP); Akio Machida, Kanagawa (JP)

(73) Assignee: Sony Corporation, Tokyo (JP)

(*) Notice: Subject to any disclaimer, the term of this patent is extended or adjusted under 35 U.S.C. 154(b) by 6 days.

(21) Appl. No.: 16/339,503

(22) PCT Filed: Aug. 2, 2017

(86) PCT No.: PCT/JP2017/028100
§ 371 (c)(1),
(2) Date: Apr. 4, 2019

(87) PCT Pub. No.: WO2018/070094
PCT Pub. Date: Apr. 19, 2018

(65) Prior Publication Data
US 2020/0041793 A1    Feb. 6, 2020

(30) Foreign Application Priority Data

Oct. 11, 2016 (JP) .............................. JP2016-199734

(51) Int. Cl.
*G02B 27/01* (2006.01)
*G02F 1/163* (2006.01)
(Continued)

(52) U.S. Cl.
CPC .......... *G02F 1/155* (2013.01); *G02B 27/0172* (2013.01); *G02F 1/1503* (2019.01);
(Continued)

(58) Field of Classification Search
CPC .... G02B 2027/0118; G02B 2027/0178; G02B 2027/0187; G02B 27/01; G02B 27/017;
(Continued)

(56) References Cited

U.S. PATENT DOCUMENTS

| 2012/0050142 A1 | 3/2012 | Border et al. |
| 2012/0050143 A1 | 3/2012 | Border |

(Continued)

FOREIGN PATENT DOCUMENTS

| CN | 102540463 A | 7/2012 |
| CN | 102830490 A | 12/2012 |

(Continued)

OTHER PUBLICATIONS

English translation of JPS62166321, machine translated on Aug. 25, 2020.*

(Continued)

*Primary Examiner* — Jie Lei
(74) *Attorney, Agent, or Firm* — Wolf, Greenfield & Sacks, P.C.

(57) ABSTRACT

It is an object of the present invention to provide a display apparatus having a configuration and a structure that enable virtual images to be observed by an observer to exhibit high contrast, and enable the observer who uses the display apparatus to safely act in a real environment while reliably recognizing an external environment. A display apparatus of the present invention includes: a frame to be mounted to a head of an observer; an image display apparatus attached to the frame; and a dimming apparatus 700. The image display apparatus includes an image forming apparatus, and an optical apparatus 120 having a virtual-image forming region 701 in which virtual images are formed. The optical apparatus 120 overlaps with at least a part of the dimming apparatus 700. When the dimming apparatus 700 operates, a light blocking rate of the dimming apparatus decreases, for example, from an upper region and an outer-side region of a virtual-image-forming-region facing region 701 toward a central portion of the virtual-image-forming-region facing region.

8 Claims, 29 Drawing Sheets

(51) Int. Cl.
  *G02F 1/155* (2006.01)
  *G02F 1/1523* (2019.01)
  *G02F 1/1524* (2019.01)
  *G02F 1/1503* (2019.01)
(52) U.S. Cl.
  CPC ...... *G02F 1/163* (2013.01); *G02B 2027/0118* (2013.01); *G02B 2027/0174* (2013.01); *G02B 2027/0178* (2013.01); *G02F 1/1523* (2013.01); *G02F 1/1524* (2019.01); *G02F 1/15245* (2019.01)
(58) Field of Classification Search
  CPC .............. G02B 27/0172; G02B 27/14; G02B 27/0101; G02B 5/205; G02B 27/0093; G02B 27/2027; G02B 27/0174; G02F 1/163; G02F 1/155; G02F 1/15; G02F 1/1523; G02F 1/1524; G02F 1/1313; G02F 1/15245; G02F 1/1503
  USPC ......... 359/275, 276, 13, 630, 633, 638, 726, 359/831, 833, 834; 345/7–9, 178, 204, 345/656, 690
  See application file for complete search history.

(56) References Cited

U.S. PATENT DOCUMENTS

| | | |
|---|---|---|
| 2012/0068913 A1 | 3/2012 | Bar-Zeev et al. |
| 2012/0092328 A1 | 4/2012 | Flaks et al. |
| 2012/0154277 A1 | 6/2012 | Bar-Zeev et al. |
| 2012/0320100 A1* | 12/2012 | Machida ............ G02B 27/017 345/690 |
| 2014/0002491 A1 | 1/2014 | Lamb |
| 2015/0370071 A1 | 12/2015 | Alton et al. |
| 2017/0199383 A1 | 7/2017 | Machida |

FOREIGN PATENT DOCUMENTS

| | | | |
|---|---|---|---|
| CN | 103389579 A | 11/2013 | |
| CN | 104067334 A | 9/2014 | |
| CN | 105044913 A | 11/2015 | |
| CN | 105319717 A | 2/2016 | |
| CN | 108027519 A | 5/2018 | |
| EP | 3147699 A1 | 3/2017 | |
| JP | S62166321 * | 7/1987 | .............. G02F 1/15 |
| JP | 2006-162767 A | 6/2006 | |
| JP | 2007-094175 | 4/2007 | |
| JP | 2012-252091 A | 12/2012 | |
| JP | 2013542462 A | 11/2013 | |
| JP | 2014511512 A | 5/2014 | |
| JP | 2015092856 A | 5/2015 | |
| WO | WO 2013/155217 A1 | 10/2013 | |
| WO | WO 2016/084831 A1 | 6/2016 | |
| WO | WO 2016/174928 A1 | 11/2016 | |

OTHER PUBLICATIONS

International Written Opinion and English translation thereof dated Oct. 31, 2017 in connection with International Application No. PCT/JP2017/028100.
International Preliminary Report on Patentability and English translation thereof dated Apr. 25, 2019 in connection with International Application No. PCT/JP2017/028100.
Extended European Search Report dated Jul. 12, 2019 in connection with European Application No. 17859578.1.
International Search Report and English translation thereof dated Oct. 31, 2017 in connection with International Application No. PCT/JP2017/028100.
English translation of Chinese Office Action dated Nov. 27, 2020 in connection with Chinese Application No. 201780061829.4.

* cited by examiner

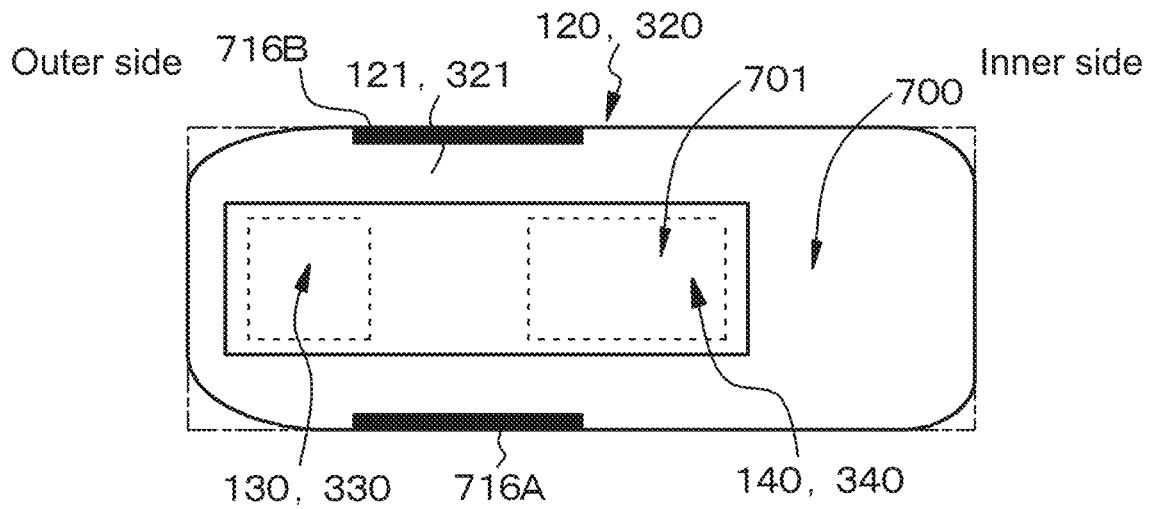
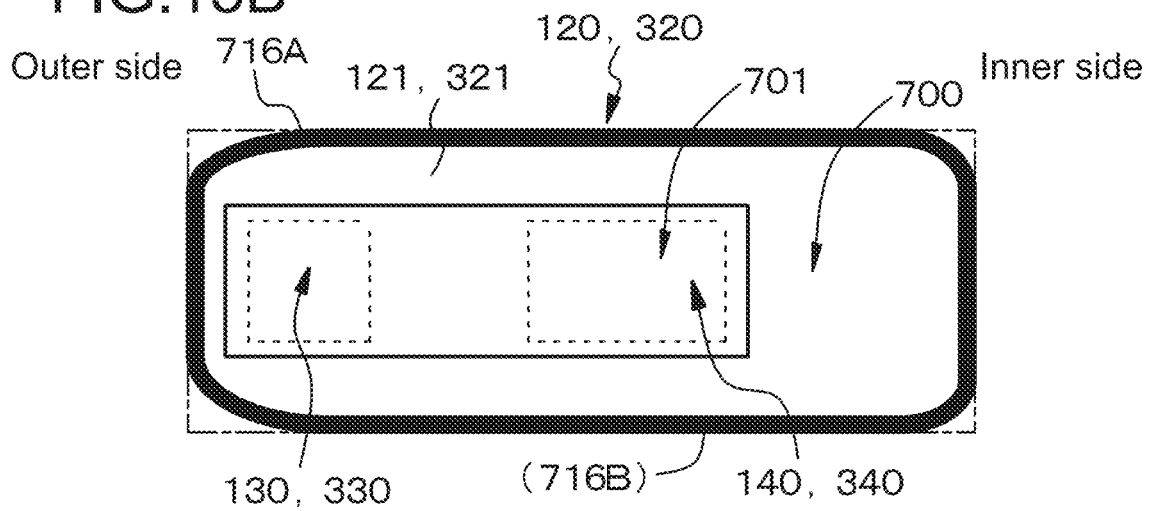
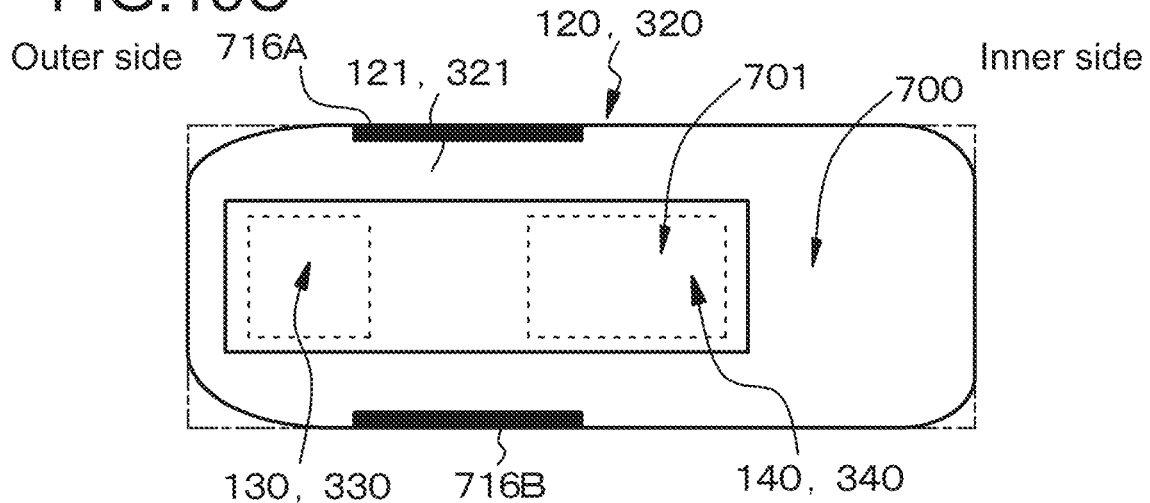

DISPLAY APPARATUS

CROSS-REFERENCE TO RELATED APPLICATIONS

This application claims the benefit under 35 U.S.C. § 371 as a U.S. National Stage Entry of International Application No. PCT/JP2017/028100, filed in the Japanese Patent Office as a Receiving Office on Aug. 2, 2017, which claims priority to Japanese Patent Application Number JP2016-199734, filed in the Japanese Patent Office on Oct. 11, 2016, each of which is hereby incorporated by reference in its entirety.

TECHNICAL FIELD

The present disclosure relates to a display apparatus, and more particularly, to a display apparatus to be used as a head mounted display (HMD).

BACKGROUND ART

In recent years, an augmented reality (AR) technology of synthesizing and presenting a virtual object or various information items as additional electronic-information items into a real environment (or part thereof) has been spotlighted. In order to implement the augmented reality technology, for example, the head mounted display has been studied as an apparatus that presents visual information items. In addition, as its application field, work supporting in the real environment is expected. For example, there may be mentioned provision of road-guidance information items, and provision of technical information items to engineers who perform maintenance and the like. In particular, the head mounted display is hands-free, and hence is significantly useful. In addition, also when an observer wants to enjoy a video or images while moving outdoors, the video or the images can be recognized together with an external environment within a field of vision. Thus, the observer can smoothly move.

A virtual-image display apparatus (display apparatus) for enabling the observer to observe a two-dimensional image formed by an image forming apparatus as a virtual image enlarged by a virtual-image optical system has been known, for example, from Japanese Patent Application Laid-open No. 2006-162767.

As illustrated in the conceptual view of FIG. 29, this image display apparatus 100' includes an image forming apparatus 111 including a plurality of pixels arrayed in two-dimensional matrix, a collimating optical system 112 that converts light beams emitted from the pixels of the image forming apparatus 111 to parallel light beams, and an optical apparatus 120 to which the light beams converted to the parallel light beams by the collimating optical system 112 are input, and which guides and emits the parallel light beams. The optical apparatus 120 includes a light guide plate 121 in which the input light beams are propagated by total reflection therein and then emitted, first deflecting means 130 (constituted, for example, by a light reflecting film in a single layer) that reflects the light beams input to the light guide plate 121 such that the light beams input to the light guide plate are totally reflected in the light guide plate 121, and second deflecting means 140 (constituted, for example, by a light-reflecting multi-layer film having a multi-layer laminated structure) that causes the light beams propagated by the total reflection in the light guide plate 121 to be emitted from the light guide plate 121. Further, when the HMD is constituted, for example, by such an image display apparatus 100', the HMD can be downsized and reduced in weight. Note that, with regard to reference numerals denoting other components in FIG. 29, refer to those of an image display apparatus of Embodiment 1, which is described with reference to FIG. 6.

Further, another virtual-image display apparatus (display apparatus) that uses a holographic diffraction grating so as to enable the observer to observe the two-dimensional image formed by the image forming apparatus as the virtual image enlarged by the virtual-image optical system has been known, for example, from Japanese Patent Application Laid-open No. 2007-094175.

As illustrated in the conceptual view of FIG. 30, this image display apparatus 300' basically includes the image forming apparatus 111 that display images, the collimating optical system 112, and an optical apparatus 320 to which the light beams displayed on the image forming apparatus 111 are input, and which guides the light beams to a pupil 21 of the observer. In this context, the optical apparatus 320 includes a light guide plate 321, a first diffraction-grating member 330 and a second diffraction-grating member 340 each constituted by a reflective volume-holographic diffraction grating provided to the light guide plate 321. In addition, the light beams emitted from the pixels of the image forming apparatus 111 are input to the collimating optical system 112. A plurality of parallel light beams different from each other in incident angle with respect to the light guide plate 321 are generated by the collimating optical system 112, and input to the light guide plate 321. The parallel light beams are input and emitted through a first surface 322 of the light guide plate 321. Meanwhile, the first diffraction-grating member 330 and the second diffraction-grating member 340 are attached to a second surface 323 of the light guide plate 321, which is parallel to the first surface 322 of the light guide plate 321. Note that, with regard to reference numerals denoting other components in FIG. 30, refer to those of an image display apparatus of Embodiment 3, which is described with reference to FIG. 17.

Then, when the virtual image based on the image is formed in these image display apparatuses 100' and 300', the observer can view an image of an outside world and the formed virtual image in a superimposed manner.

Incidentally, when surrounding environments of the image display apparatuses 100' and 300' are significantly bright, or depending on contents of the formed virtual image, a problem that sufficient contrast cannot be exhibited by the virtual image to be observed by the observer may arise. As a countermeasure, a virtual-image display apparatus (display apparatus) including means for solving such problems, that is, a dimming apparatus has been known, for example, from Japanese Patent Application Laid-open No. 2012-252091.

CITATION LIST

Patent Literature

Patent Literature 1: Japanese Patent Application Laid-open No. 2006-162767
Patent Literature 2: Japanese Patent Application Laid-open No. 2007-094175
Patent Literature 3: Japanese Patent Application Laid-open No. 2012-252091

DISCLOSURE OF INVENTION

Technical Problem

In this context, the display apparatus is frequently required to enable the observer who uses the display apparatus not only to reliably recognize the virtual image by sight while reliably recognizing an external environment, but also to safely act in a real environment.

In view of such circumstances, the present disclosure has been made to provide a display apparatus having a configuration and a structure that enable virtual images to be observed by an observer to exhibit high contrast, and enable the observer who uses the display apparatus to safely act in a real environment while reliably recognizing an external environment.

Solution to Problem

In order to achieve the above-mentioned object, according to the present disclosure, there is provided a display apparatus including:

(A) a frame to be mounted to a head of an observer;
(B) an image display apparatus attached to the frame; and
(C) a dimming apparatus that adjusts light intensities of external light beams that enter from an outside,
the image display apparatus including
(a) an image forming apparatus, and
(b) an optical apparatus having a virtual-image forming region in which virtual images are formed on a basis of light beams emitted from the image forming apparatus,
the optical apparatus overlapping with at least a part of the dimming apparatus,
when the dimming apparatus operates,
(i) a light blocking rate of the dimming apparatus decreasing from an upper region and an outer-side region of a virtual-image-forming-region facing region toward a central portion of the virtual-image-forming-region facing region,
(ii) the light blocking rate of the dimming apparatus decreasing from a lower region and the outer-side region of the virtual-image-forming-region facing region toward the central portion of the virtual-image-forming-region facing region,
(iii) the light blocking rate of the dimming apparatus decreasing from the outer-side region of the virtual-image-forming-region facing region toward an inner-side region of the virtual-image-forming-region facing region,
(iv) the light blocking rate of the dimming apparatus decreasing from the lower region of the virtual-image-forming-region facing region toward the upper region of the virtual-image-forming-region facing region, or
(v) the light blocking rate of the dimming apparatus decreasing from an outer-edge region of the virtual-image-forming-region facing region toward the central portion of the virtual-image-forming-region facing region, the inner side being an observer's nose side, the outer side being an observer's ear side, the virtual-image-forming-region facing region being a region in the dimming apparatus, the region facing the virtual-image forming region in the optical apparatus.

Advantageous Effects of Invention

The display apparatus according to the present disclosure includes the dimming apparatuses, which enable the virtual images that the observer observes to exhibit high contrast. Further, the observer who uses the display apparatus is enabled to reliably recognize an external environment. In addition, the light blocking rate of each of the dimming apparatuses is set to start to decrease from a first predetermined region of the virtual-image-forming-region facing region to a second predetermined region of the virtual-image-forming-region facing region. Thus, through the virtual-image-forming-region facing region, through the virtual-image-forming-region facing region, which has a proper color tone, the observer who uses the display apparatus can safely act in a real environment while reliably recognizing an external environment. Note that, the advantages described herein are merely examples, and hence are not limited thereto. Thus, other advantages may be obtained.

BRIEF DESCRIPTION OF DRAWINGS

FIG. 15A, FIG. 15B, and FIG. 15C are schematic front views of the optical apparatus and the dimming apparatus in yet other modifications of the display apparatus according to Embodiment 1 (specifically, display apparatus according to a fourth embodiment, display apparatus according to a fifth embodiment, and display apparatus according to a sixth embodiment).

MODE(S) FOR CARRYING OUT THE INVENTION

Figure 1A:
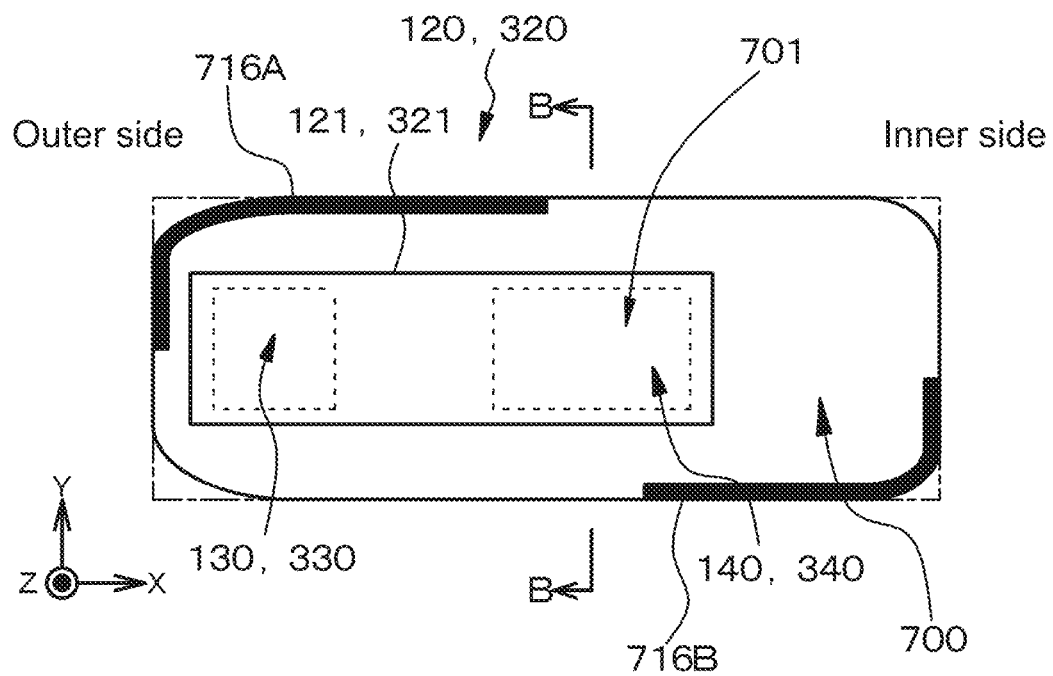
FIG. 1A is a schematic front view of an optical apparatus and a dimming apparatus in a display apparatus according to Embodiment 1.

Now, Embodiments of the present disclosure are described with reference to the drawings. The present disclosure is not limited to Embodiments, that is, various numerical values and materials in Embodiments are merely examples. Note that, the description is made in the following order.

1. Display Apparatus According to Present Disclosure and General Description Thereof
2. Embodiment 1 (Display Apparatus According to Present Disclosure, Display Apparatuses According to First Embodiment to Seventh Embodiment, Optical Apparatus Having Structure 1-A, and Image Forming Apparatus Having First Configuration)
3. Embodiment 2 (Modification of Embodiment 1, Optical Apparatus Having Structure 1-A, and Image Forming Apparatus Having Second Configuration)
4. Embodiment 3 (Another Modification of Embodiment 1, Optical Apparatus Having Structure 1-B, and Image Forming Apparatus Having First Configuration)
5. Embodiment 4 (Still Another Modification of Embodiment 1, Optical Apparatus Having Structure 1-B, and Image Forming Apparatus Having Second Configuration)
6. Embodiment 5 (Yet Another Modification of Embodiment 1, Optical Apparatus Having Second Structure, and Image Forming Apparatus Having Second Configuration)
7. Embodiment 6 (Modification of Embodiment 1 to Embodiment 5)
8. Embodiment 7 (Modification of Embodiment 1 to Embodiment 5)
9. Embodiment 8 (Modification of Embodiment 1 to Embodiment 7)
10. Embodiment 9 (Modification of Embodiment 8)
11. Others <General Description of Display Apparatus According to Present Disclosure>

In the display apparatus according to the present disclosure, the dimming apparatuses may each include a first substrate, a second substrate that faces the first substrate, a first transparent electrode provided to face a facing surface of the first substrate, the facing surface of the first substrate facing the second substrate, a second transparent electrode provided to face a facing surface of the second substrate, the facing surface of the second substrate facing the first substrate, and a dimming layer sandwiched between the first transparent electrode and the second transparent electrode. Note that, the dimming apparatus may each further include a first electrode formed on a part of the first transparent electrode. In this case, the first electrode may be connected directly to a control circuit (dimming-apparatus control circuit) for controlling the light blocking rate of corresponding one of the dimming apparatuses. When necessary, a first connecting portion connected to the first electrode may be provided, and the first connecting portion may be connected to the dimming-apparatus control circuit. Alternatively, without providing the first electrode, the first connecting portion and the first transparent electrode may be connected directly to each other. Further, a second connection portion that is held in contact with a part of the second transparent electrode may be provided, and the second connecting portion may be connected to the dimming-apparatus control circuit. Alternatively, the dimming apparatuses may each further include a second electrode formed on a part of the second transparent electrode. In addition, the second electrode may be connected directly to the dimming-apparatus control circuit. When necessary, the second connecting portion connected to the second electrode may be provided, and the second connecting portion may be connected to the dimming-apparatus control circuit. It is appropriate to provide the first connecting portion on the facing surface of the first substrate, which faces the second substrate, in a manner that parts other than the connecting portion are kept out of contact with the first transparent electrode. It is appropriate to provide the second connecting portion on the facing surface of the second substrate, which faces the first substrate, in a manner that parts other than the connecting portion are kept out of contact with the second transparent electrode.

A voltage is applied from the dimming-apparatus control circuit to the first transparent electrode via the first electrode (or both first connecting portion and first electrode), and a voltage is applied from the same to the second transparent electrode via the second connecting portion (or both second connecting portion and second electrode). In accordance with a potential difference between a certain part of the first transparent electrode (for the sake of convenience, referred to as "part-A"), and a part of the second transparent electrode, which faces the part-A (for the sake of convenience, referred to as "part-B"), a light blocking rate of a region in the dimming layer, which is sandwiched between the part-A and the part-B, is controlled. A potential at the part-A is determined by an electric resistance depending on a distance between the first electrode and the part-A of the first transparent electrode, and a potential at the part-B is determined by an electric resistance depending on a distance between the second connecting portion (or second electrode) and the part-B of the second transparent electrode. Thus, the light-blocking-rate decrease state of (i), (ii), (iii), (iv), or (v) described above is established merely by determining, as appropriate, a position and a length of the first electrode, and a connecting position of the second connecting portion with respect to the second transparent electrode (or position and length of the second electrode).

In addition, in these cases, there may be employed a configuration in which the dimming apparatus is constituted by an optical shutter that utilizes color variation of a substance to be generated by an oxidation-reduction reaction of an inorganic or an organic electrochromic material. Specifically, in this configuration, the dimming layer may contain the inorganic or the organic electrochromic material. In addition, the dimming layer may have a laminated structure of inorganic-electrochromic material layers such as a $WO_3$ layer/a $Ta_2O_5$ layer/an $Ir_xSn_{1-x}O$ layer from the first transparent electrode side, or a laminated structure of inorganic-electrochromic material layers such as the $WO_3$ layer/the $Ta_2O_5$ layer/an $IrO_x$ layer from the same. Instead of the $WO_3$ layer, there may be used a $MoO_3$ layer or a $V_2O_5$ layer. Further, instead of the $IrO_x$ layer, there may be used a $ZrO_2$ layer, a zirconium phosphate layer, or a Prussian blue complex/nickel-substituted Prussian blue complex. As examples of the organic electrochromic material, there may be used electrochromic materials disclosed in Japanese Patent Application Laid-open No. 2014-111710 and Japanese Patent Application Laid-open No. 2014-159385.

In the display apparatus according to the present disclosure, which includes the various preferred configurations described above, there may be employed a configuration in which the optical apparatus is attached to corresponding one of the dimming apparatuses. Note that, the optical apparatus may be attached to corresponding one of the dimming apparatuses in close contact therewith, or may be attached to corresponding one of the dimming apparatuses with a gap therebetween.

In addition, in the display apparatus according to the present disclosure, which includes the various preferred configurations described above, there may be employed a configuration in which
a frame includes
a front portion that is arranged in front of the observer,
two temple portions attached in a freely pivotal manner to both ends of the front portion via hinges, and
nose pads; and
the dimming apparatuses are arranged at the front portion.
Further, in this configuration,
the front portion may include a rim; and
the dimming apparatuses may be fitted in the rim. In addition, in the display apparatus according to the present disclosure, which includes the various preferred configurations described above, the optical apparatus and the dimming apparatuses may be arranged in this order from the observer's side, or the dimming apparatuses and the optical apparatus may be arranged in this order from the same.

Still further, in the display apparatus according to the present disclosure, which includes the various preferred configurations described above, there may be employed a configuration in which
the optical apparatus includes
(b-1) a light guide plate in which the light beams input from the image forming apparatus are propagated by total reflection in the light guide plate, and then emitted toward the observer,
(b-2) first deflecting means that deflects the light beams input to the light guide plate such that the light beams input to the light guide plate are totally reflected in the light guide plate, and
(b-3) second deflecting means that deflects the light beams propagated by the total reflection in the light guide plate such that the light beams propagated by the total reflection in the light guide plate are emitted from the light guide plate, and
the virtual-image forming region in the optical apparatus is formed of the second deflecting means. Herein, for the sake of convenience, such an optical apparatus is referred to as an "optical apparatus having a first structure." Note that, the term "total reflection" refers to internal total reflection or total reflection in the light guide plate. The second deflecting means (virtual-image forming region) is located within a projection image in corresponding one of the dimming apparatuses. Further, in this configuration, the second deflecting means or both the first deflecting means and the second deflecting means may be covered with one of substrates constituting corresponding one of the dimming apparatuses.

In the display apparatus according to the present disclosure, which includes the various preferred configurations described above (hereinafter, collectively referred to as "display apparatus or the like according to the present disclosure"), in operating the dimming apparatuses, in operating the dimming apparatuses, for example, a voltage higher than that to be applied to the second transparent electrode is applied to the first transparent electrode.

In the display apparatus or the like according to the present disclosure, the light blocking rate of each of the dimming apparatuses, which varies from the first predetermined region toward the second predetermined region, may gradually vary (that is, continuously vary). Depending on arrangement patterns or shapes of the electrodes and the connecting portions, there may be employed a configuration in which the light blocking rate varies in a stepwise manner, or varies continuously or in a stepwise manner from a certain value. In other words, the dimming apparatuses may be held in a state in which color gradation is displayed, or brought into a state in which color varies in a stepwise manner. Alternatively, the dimming apparatuses, which have been colored in a certain color, may be brought into a state in which the color varies continuously or in a stepwise manner. The light blocking rate can be controlled with the voltages to be applied to the first electrode and the second connecting portion. The potential difference between the first transparent electrode and the second transparent electrode may be controlled, or the voltage to be applied to the first electrode and the voltage to be applied to the second connecting portion may be controlled independently of each other. At a time of adjusting the light blocking rate, a test pattern may be displayed on the optical apparatus.

Hereinbelow, for the sake of simplicity of the description, the virtual-image forming region in the optical apparatus, an outer shape of each of the dimming apparatuses, and a planar shape of the virtual-image-forming-region facing region in each of the dimming apparatuses are each a quadrangle.

In addition, in the virtual-image-forming-region facing region, for the sake of convenience, a corner portion between an upper side (for the sake of convenience, referred to as "upper side (A)") and an outer-side lateral side (for the sake of convenience, referred to as "outer-side lateral side (A)") is referred to as a "first corner portion (A)." For the sake of convenience, a corner portion between a lower side (for the sake of convenience, referred to as "lower side (A)") and the outer-side lateral side (A) is referred to as a "second corner portion (A)." For the sake of convenience, a corner portion between the lower side (A) and an inner-side lateral side (for the sake of convenience, referred to as "inner-side lateral side (A)") is referred to as a "third corner portion (A)." For the sake of convenience, a corner portion between the upper side (A) and the inner-side lateral side (A) is referred to as a "fourth corner portion (A)."

Further, in each of the dimming apparatuses, for the sake of convenience, a corner portion between an upper side (for the sake of convenience, referred to as "upper side (B)") and an outer-side lateral side (for the sake of convenience, referred to as "outer-side lateral side (B)") is referred to as a "first corner portion (B)." For the sake of convenience, a corner portion between a lower side (for the sake of convenience, referred to as "lower side (B)") and the outer-side lateral side (B) is referred to as a "second corner portion (B)." For the sake of convenience, a corner portion between the lower side (B) and an inner-side lateral side (for the sake of convenience, referred to as "inner-side lateral side (B)") is referred to as a "third corner portion (B)." For the sake of convenience, a corner portion between the upper side (B) and the inner-side lateral side (B) is referred to as a "fourth corner portion (B)."

The four sides of these quadrangles may each be formed of a segment, or may each be formed of a part of a curve. Vertices of these quadrangles may be rounded. Note that, a planar shape of the virtual-image forming region in the optical apparatus, and the outer shape of each of the dimming apparatuses are not limited thereto. When the planar shape of the virtual-image forming region is not the quadrangle, it is appropriate to assume a rectangle that circumscribes an outline of the virtual-image forming region, to define four points at which diagonals of this assumed rectangle (referred to as "virtual rectangle") and the outline of the virtual-image forming region intersect with each other as virtual vertices (corner portions), and to define parts of the outline of the virtual-image forming region, which connect the virtual vertices to each other, respectively as the sides (upper side, lower side, outer-side lateral side, and inner-side lateral side of the virtual-image forming region). When the outer shape of each of the dimming apparatuses is not the quadrangle, it is appropriate to assume a dimming-apparatus virtual rectangle that circumscribes the outline of each of the dimming apparatuses, to define four points at which diagonals of this dimming-apparatus rectangle and the outline of corresponding one of the dimming apparatuses with each other as virtual vertices (corner portions), and to define parts of the outline of corresponding one of the dimming apparatuses, which connect the virtual vertices to each other, respectively as the sides (upper side, lower side, outer-side lateral side, and inner-side lateral side of corresponding one of the dimming apparatuses). A direction in which the upper side and the lower side of each of the dimming apparatuses extend is referred to as a "horizontal direction," and a direction in which the inner-side lateral side of each of the dimming apparatuses and the outer-side lateral side of each of the dimming apparatuses extend is referred to as a "perpendicular direction."

Figure 3:
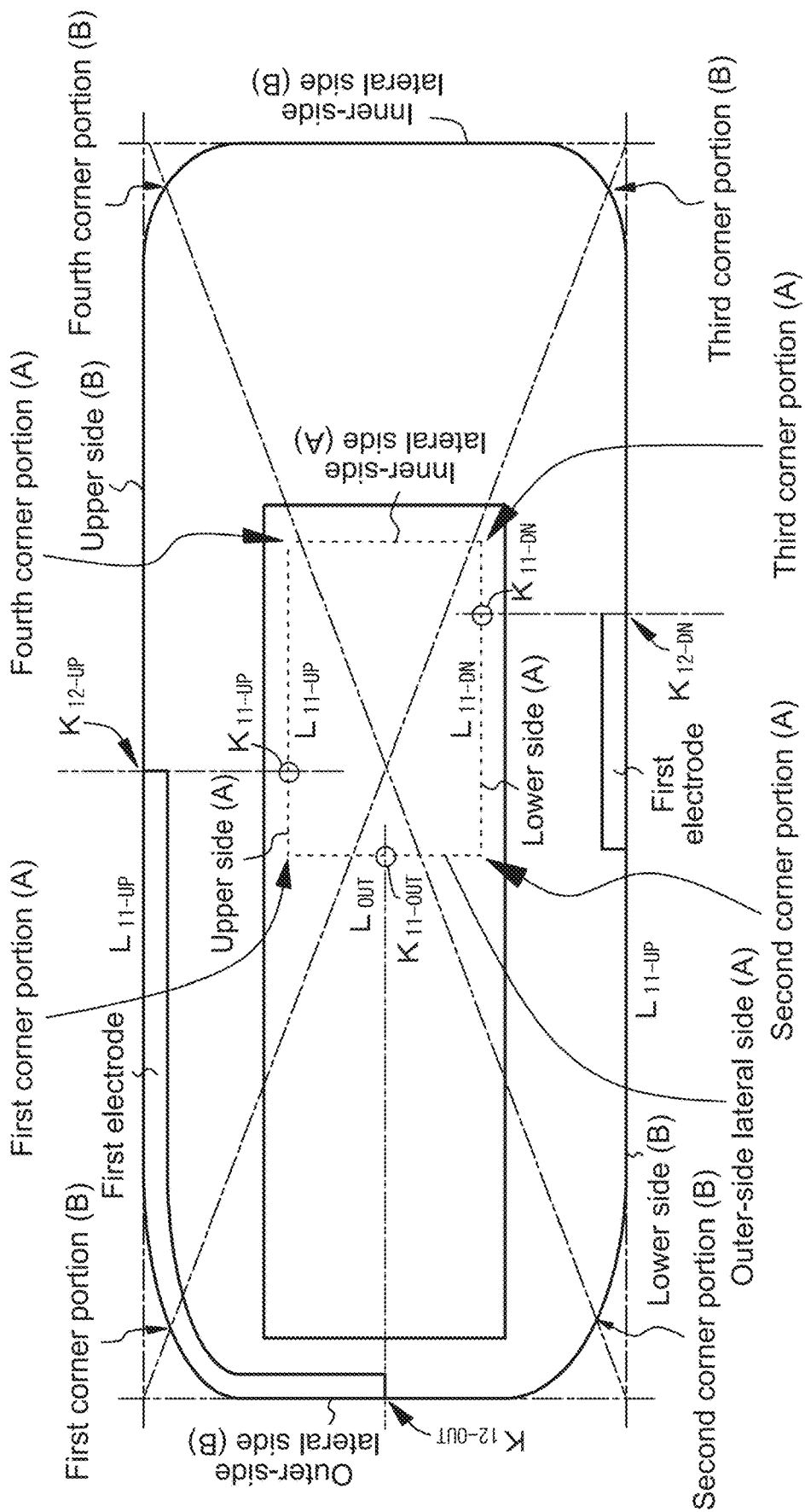
FIG. 3 is a schematic view in which the dimming apparatus and the optical apparatus of the present disclosure are viewed from front.

The dimming apparatus and the optical apparatus are illustrated in the schematic view of FIG. 3. With regard to the first electrode, on the upper side (A) of the virtual-image-forming-region facing region, when a length of the upper side from the first corner portion (A) to the fourth corner portion (A) is $L_{11\text{-}UP}$, a percentage of a length from the first corner portion (A), specifically, of a length from the first corner portion (A) to a position $K_{11\text{-}UP}$ on the upper side (A) is denoted by $k_{11\text{-}UP}$ ($=K_{11\text{-}UP}/L_{11\text{-}UP}\times 100\%$). A position on the upper side (B) of the dimming apparatus, at which a straight line that extends through the position $K_{11\text{-}UP}$ on the upper side (A) and extends in the perpendicular direction intersects with the upper side (B), is denoted by $K_{12\text{-}UP}$. On the lower side (A) of the virtual-image-forming-region facing region, when a length of the lower side from the second corner portion (A) to the third corner portion (A) is $L_{11\text{-}DN}$, a percentage of a length from the second corner portion (A), specifically, of a length from the second corner portion (A) to a position $K_{11\text{-}DN}$ on the lower side (A) is denoted by $k_{11\text{-}DN}$ ($=K_{11\text{-}DN}/L_{11\text{-}DN}\times 100\%$). A position on the lower side (B) of the dimming apparatus, at which a straight line that extends through the position $K_{11\text{-}DN}$ on the lower side (A) and extends in the perpendicular direction intersects with the lower side (B), is denoted by $K_{12\text{-}DN}$. On the outer-side lateral side (A) of the virtual-image-forming-region facing region, when a length of the upper side from the first corner portion (A) to the second corner portion (A) is $L_{11\text{-}OUT}$, a percentage of a length from the first corner portion (A), specifically, of a length from the first corner portion (A) to a position $K_{11\text{-}OUT}$ on the second corner portion (A) is denoted by $k_{11\text{-}OUT}$ ($=K_{11\text{-}OUT}/L_{11\text{-}OUT}\times 100\%$). A position on the outer-side lateral side (B) of the dimming apparatus, at which a straight line that extends through the position $K_{11\text{-}OUT}$ on the outer-side lateral side (A) and extends in the horizontal direction intersects with the outer-side lateral side (B), is denoted by $K_{12\text{-}OUT}$. Values of the length percentages $k_{11\text{-}UP}$ and $k_{11\text{-}DN}$ are calculated with respect to the first corner portion (A). Positive ones of the values correspond to a direction toward the inner-side lateral side, and negative ones of the values correspond to a direction toward the outer-side lateral side. Values of the length percentage $k_{11\text{-}OUT}$ are also calculated with respect to the first corner portion (A). Positive ones of the values correspond to a downward direction, and negative ones of the values correspond to an upward direction.

In this context, (i) when the light blocking rate of the dimming apparatus decreases from the upper region and the outer-side region of the virtual-image-forming-region facing region toward the central portion of the virtual-imageforming-region facing region, the light blocking rate decreases in a direction from, for example, the first corner portion (B) of the dimming apparatus substantially toward, for example, the third corner portion (B) of the dimming apparatus. Note that, for the sake of convenience, such a display apparatus is referred to as a "display apparatus according to a first embodiment." The first electrode is arranged along the upper side (B) of the dimming apparatus, and extends from the first corner portion (B) of the dimming apparatus toward the inner side along the upper side (B) of the dimming apparatus. Specifically, as examples of the position $K_{12\text{-}UP}$ of an inner-side-direction end portion of the first electrode at this part, there may be mentioned positions corresponding to 10% to 100% of the value of $k_{11\text{-}UP}$. In addition, the first electrode extends downward from the first corner portion (B) along the outer-side lateral side (B). Specifically, as examples of the position $K_{12\text{-}OUT}$ of a downward-direction end portion of the first electrode at this part, there may be mentioned positions corresponding to 10% to 70% of the value of $k_{11\text{-}OUT}$. One or a plurality of first-electrode branch electrodes may be provided from the first electrode in a direction toward the lower side (B). When the first connecting portion is provided, it is appropriate to connect the first connecting portion, for example, to a part on the outer-side lateral side (B) of the first electrode.

Further, with respect to the first electrode, it is appropriate to provide the second connecting portion or the second electrode at a position where a potential gradient that causes the light blocking rate of the dimming apparatus to decrease from the upper region and the outer-side region of the virtual-image-forming-region facing region toward the central portion of the virtual-image-forming-region facing region is obtained. Specifically, it is appropriate to provide the second connecting portion, for example, at the third corner portion (B) or on the lower side (B). Alternatively, it is appropriate to provide the second electrode from the third corner portion (B) to the lower side (B) and to the inner-side lateral side (B), on the lower side (B) on the third corner portion (B) side, on the inner-side lateral side (B) on the third corner portion (B) side, from the second corner portion (B) to the lower side (B) and the outer-side lateral side (B), or on the lower side (B) on the second corner portion (B) side.

Alternatively, (ii) when the light blocking rate of the dimming apparatus decreases from the lower region and the outer-side region of the virtual-image-forming-region facing region toward the central portion of the virtual-image-forming-region facing region, the light blocking rate decreases from the second corner portion (B) of the dimming apparatus substantially in a direction toward, for example, the fourth corner portion (B) of the dimming apparatus. Note that, for the sake of convenience, such a display apparatus is referred to as a "display apparatus according to a second embodiment." The first electrode is arranged along the lower side (B) of the dimming apparatus, and extends from the second corner portion (B) of the dimming apparatus toward the inner side along the lower side (B) of the dimming apparatus. Specifically, as examples of the position $K_{12\text{-}DN}$ of an inner-side-direction end portion of the first electrode at this part, there may be mentioned positions corresponding to 10% to 100% of the value of $k_{11\text{-}DN}$. In addition, the first electrode extends upward from the second corner portion (B) along the outer-side lateral side (B). Specifically, as examples of the position $K_{12\text{-}OUT}$ of an upward-direction end portion of the first electrode at this part, there may be mentioned positions corresponding to 30% to 90% of the value of $k_{11\text{-}OUT}$. The one or the plurality of first-electrode branch electrodes may be provided from the first electrode in a direction toward the upper side (B). When the first connecting portion is provided, it is appropriate to connect the first connecting portion, for example, to the part on the outer-side lateral side (B) of the first electrode.

Further, with respect to the first electrode, it is appropriate to provide the second connecting portion or the second electrode at a position where a potential gradient that causes the light blocking rate of the dimming apparatus to decrease from the lower region and the outer-side region of the virtual-image-forming-region facing region toward the central portion of the virtual-image-forming-region facing region is obtained. Specifically, it is appropriate to provide the second connecting portion, for example, at the fourth corner portion (B) or on the upper side (B). Alternatively, the second electrode may be provided from the fourth corner portion (B) to the upper side (B) and to the inner-side lateral side (B), on the upper side (B) on the fourth corner portion (B) side, on the inner-side lateral side (B) on the fourth corner portion (B) side, from the first corner portion (B) to the upper side (B) and to the outer-side lateral side (B), or on the upper side (B) on the first corner portion (B) side.

Further, (iii) when the light blocking rate of the dimming apparatus decreases from the outer-side region of the virtual-image-forming-region facing region toward the inner-side region of the virtual-image-forming-region facing region, the light blocking rate of the dimming apparatus decreases substantially along the horizontal direction. Note that, for the sake of convenience, such a display apparatus is referred to as a "display apparatus according to a third embodiment." The first electrode is arranged on the outer-side lateral side (B) of the dimming apparatus, and extends upward and downward from a central portion of the outer-side lateral side (B) of the dimming apparatus along the outer-side lateral side (B) of the dimming apparatus. Specifically, as examples of the position $K_{12\text{-}OUT}$ of the upward-direction end portion of the first electrode at this part, there may be mentioned positions corresponding to 0% to 30% of the value of $k_{11\text{-}OUT}$. As examples of the position $K_{12\text{-}OUT}$ of the downward-direction end portion of the same, there may be mentioned positions corresponding to 70% to 100% of the value of $k_{11\text{-}OUT}$. The upward-direction end portion of the first electrode may be located on the upper side (B) of the dimming apparatus, and the downward-direction end portion of the first electrode may be located on the lower side (B) of the dimming apparatus. When the first connecting portion is provided, it is appropriate to connect the first connecting portion, for example, to the part on the outer-side lateral side (B) of the first electrode. Further, with respect to the first electrode, it is appropriate to provide the second connecting portion or the second electrode at a position where a potential gradient that causes the light blocking rate of the dimming apparatus to decrease from the outer-side region of the virtual-image-forming-region facing region toward the inner-side region of the virtual-image-forming-region facing region is obtained. Specifically, it is appropriate to provide the second connecting portion, for example, at a central portion of the inner-side lateral side (B). Alternatively, it is appropriate to provide the second electrode over the inner-side lateral side (B), or from the inner-side lateral side (B) to the upper side (B) and from the inner-side lateral side (B) to the lower side (B).

Alternatively, it is appropriate to arrange the first electrode on the upper side (B) on the first corner portion side of the dimming apparatus, and on the lower side (B) on the first corner portion (B) side of the dimming apparatus. When necessary, it is appropriate to arrange the second electrode on the upper side (B) on the first corner portion (B) side of the dimming apparatus, and on the lower side (B) on the first corner portion (B) side of the dimming apparatus. Still alternatively, there may be employed a configuration in which the first connecting portion is connected to a part on the outer-side lateral side (B) of the first transparent electrode, and the second connecting portion is connected to a part on the outer-side lateral side (B) of the second transparent electrode.

Yet alternatively, (iv) when the light blocking rate of the dimming apparatus decreases from the lower region of the virtual-image-forming-region facing region toward the upper region of the virtual-image-forming-region facing region, the light blocking rate of the dimming apparatus decreases substantially along the perpendicular direction. Note that, for the sake of convenience, such a display apparatus is referred to as a "display apparatus according to a fourth embodiment." The first electrode is arranged on the outer-side lateral side (B) of the dimming apparatus. Specifically, as examples of the position $K_{12\text{-}DN}$ of the end portion of the first electrode at this part, there may be mentioned positions corresponding to 100% to 120% of the value of $k_{11\text{-}DN}$. The one or the plurality of first-electrode branch electrodes may be provided from the first electrode in the direction toward the upper side (B). The first connecting portion may be connected to the first electrode.

In addition, with respect to the first electrode, it is appropriate to provide the second connecting portion or the second electrode at a position where a potential gradient that causes the light blocking rate of the dimming apparatus to decrease from the lower region of the virtual-image-forming-region facing region toward the upper region of the virtual-image-forming-region facing region is obtained. Specifically, it is appropriate to provide the second connecting portion, for example, on the upper side (B). Alternatively, it is appropriate to provide the second electrode on the upper side (B).

Yet alternatively, (v) when the light blocking rate of the dimming apparatus decreases from outer-edge regions of the virtual-image-forming-region facing region toward the central portion of the virtual-image-forming-region facing region, it is appropriate to provide the first electrode over the upper side (B), the outer-side lateral side (B), the lower side (B), and the inner-side lateral side (B) of the dimming apparatus, that is, over an outer peripheral portion of the dimming apparatus. In this case, the first electrode to be provided may be continuous, or the first electrode to be provided may be discontinuous. In the latter case, it is appropriate to connect segments of the first electrode to each other with the first connecting portions. In addition, with respect to the first electrode, it is appropriate to provide the second connecting portion or the second electrode at a position where a potential gradient that causes the light blocking rate of the dimming apparatus to decrease from the outer-edge regions of the virtual-image-forming-region facing region toward the central portion of the virtual-image-forming-region facing region is obtained. Specifically, it is appropriate to provide, for example, a plurality of second connecting portions to the peripheral portion of the dimming apparatus.

Yet alternatively, when necessary, (vi) there may be employed a configuration in which the light blocking rate of the dimming apparatus decreases from the upper region of the virtual-image-forming-region facing region toward the lower region of the virtual-image-forming-region facing region. In this case, the light blocking rate of the dimming apparatus decreases substantially along the perpendicular direction. Note that, for the sake of convenience, such a display apparatus is referred to as a "display apparatus according to a sixth embodiment." The first electrode is arranged along the upper side of the dimming apparatus. Specifically, as examples of the position $K_{12\text{-}UP}$ of the inner-side-direction end portion of the first electrode at this part, there may be mentioned positions corresponding to 100% to 120% of the value of $k_{11\text{-}UP}$. The one or the plurality of first-electrode branch electrodes may be provided from the first electrode in the direction toward the lower side (B). The first connecting portion may be connected to the first electrode. In addition, with respect to the first electrode, it is appropriate to provide the second connecting portion or the second electrode at a position where a potential gradient that causes the light blocking rate of the dimming apparatus to decrease from the upper region of the virtual-image-forming-region facing region toward the lower region of the virtual-image-forming-region facing region is obtained. Specifically, it is appropriate to provide the second connecting portion, for example, on the lower side (B). Alternatively, it is appropriate to provide the second electrode on the lower side (B).

Further, when necessary, there may be employed a configuration in which, when the virtual image is formed in a part of the virtual-image forming region on the basis of the light beams emitted from the image forming apparatus, the light blocking rate of the dimming apparatus decreases from a region in the dimming apparatus, which faces the part of the virtual-image forming region, the virtual image being formed in this part, toward the central portion of the virtual-image-forming-region facing region. Note that, for the sake of convenience, such a display apparatus is referred to as a "display apparatus according to a seventh embodiment."

There may be employed a configuration in which the display apparatus or the like according to the present disclosure further includes an illuminance sensor (environment-illuminance measurement sensor) that measures an illuminance in a surrounding environment of the display apparatus; and in which, on the basis of a measurement result of the illuminance sensor (environment-illuminance measurement sensor), the display apparatus or the like according to the present disclosure controls the light blocking rate of the dimming apparatus. Alternatively, there may be employed a configuration in which the display apparatus or the like according to the present disclosure further includes the illuminance sensor (environment-illuminance measurement sensor) that measures the illuminance in the surrounding environment of the display apparatus; and in which, on the basis of the measurement result of the illuminance sensor (environment-illuminance measurement sensor), the display apparatus or the like according to the present disclosure controls luminances of the images to be formed by the image forming apparatus. These configurations may be combined with each other.

Still alternatively, there may be employed a configuration in which the display apparatus or the like according to the present disclosure further includes a second illuminance sensor (for the sake of convenience, sometimes referred to as "transmitted-light-illuminance measurement sensor") that measures an illuminance on the basis of light beams from the external environment, which have transmitted through the dimming apparatus; and in which, on the basis of a measurement result of the second illuminance sensor (transmitted-light-illuminance measurement sensor), the display apparatus or the like according to the present disclosure controls the light blocking rate of the dimming apparatus.

Yet alternatively, there may be employed a configuration in which the display apparatus or the like according to the present disclosure further includes the second illuminance sensor (transmitted-light-illuminance measurement sensor) that measures the illuminance on the basis of the light beams from the external environment, which have transmitted through the dimming apparatus; and in which, on the basis of the measurement result of the second illuminance sensor (transmitted-light-illuminance measurement sensor), the display apparatus or the like according to the present disclosure controls the luminances of the images to be formed by the image forming apparatus. Note that, in this configuration, it is desired that the second illuminance sensor (transmitted-light-illuminance measurement sensor) be arranged on the observer's side with respect to the optical apparatus. At least two second illuminance sensors (transmitted-light-illuminance measurement sensors) may be arranged such that the illuminance is measured on the basis of light beams that have passed through a part corresponding to a high light-blocking rate, and that the illuminance is measured on the basis of light beams that have passed through a part corresponding to a low light-blocking rate. These configurations may be combined with each other. Further, these configurations and the above-described configurations in each of which the control is performed on the basis of the measurement result of the illuminance sensor (environment-illuminance measurement sensor) may be combined with each other.

It is appropriate to provide known illuminance sensors as the illuminance sensors (environment-illuminance measurement sensors and transmitted-light-illuminance measurement sensors), and to control the illuminance sensors with known control circuits.

There may be employed a configuration in which a maximum light transmittance of the dimming apparatus is 50% or more, and a minimum light transmittance of the dimming apparatus is 30% or less. Note that, an upper limit value of the maximum light transmittance of the dimming apparatus may be 99%, and a lower limit value of the minimum light transmittance of the dimming apparatus may be 1%. In this context, the relationship of (Light Transmittance)=1−(Light Blocking Rate)

is established.

It is appropriate to connect connectors to the dimming apparatus (specifically, connect the connector to the first electrode, the second electrode, the first connecting portion, and the second connecting portion) such that, via these connectors and wires, the dimming apparatus is connected electrically to the control circuit for controlling the light blocking rate of the dimming apparatus (dimming-apparatus control circuit, which is installed, for example, in a control apparatus for controlling the image forming apparatus).

When necessary, there may be employed a configuration in which the light beams that pass through the dimming apparatus are colored in a desired color by the dimming apparatus. In addition, in this configuration, the color to be exhibited by the dimming apparatus can be varied, or the color to be exhibited by the dimming apparatus may be fixed. Note that, in the former case, it is appropriate to laminate a dimming apparatus to be colored in red, a dimming apparatus to be colored in yellow, and a dimming apparatus to be colored in blue. Further, in the latter case, although not limited, as another example of the colors to be exhibited by the dimming apparatus, there may be mentioned brown.

Instead of the configuration in which the dimming layer in the dimming apparatus provided in the display apparatus or the like according to the present disclosure contains the electrochromic material, there may be employed a configuration in which the dimming layer contains an electrophoretic dispersion liquid. Alternatively, there may be employed a configuration in which the dimming apparatus is constituted by an optical shutter of an electrodeposition type (electric-field deposition) utilizing an electrodeposition/dissociation phenomenon to be cause by a reversible oxidation-reduction reaction of a metal (such as silver particles), that is, the dimming layer contains an electrolyte containing metal ions.

In this context, the electrophoretic dispersion liquid contains a large number of charged electrophoretic particles, and a dispersion medium in a color different from that of the electrophoretic particles. For example, the electrophoretic particles are negatively charged, the first transparent electrode is patterned, and the second transparent electrode is not patterned (has what is called a solid electrode configuration). In this case, when a relatively negative voltage is applied to the first transparent electrode, and a relatively positive voltage is applied to the second transparent electrode, the negatively-charged electrophoretic particles migrate in a manner of covering the second transparent electrode. Thus, a value of the light blocking rate of the dimming apparatus increases. Meanwhile, in contrast, when the relatively positive voltage is applied to the first transparent electrode, and the relatively negative voltage is applied to the second transparent electrode, the electrophoretic particles migrate in a manner of covering the first transparent electrode. Thus, the value of the light blocking rate of the dimming apparatus decreases. By appropriately performing such voltage application to the transparent electrodes, the light blocking rate of the dimming apparatus can be controlled. The voltages may be direct-current, or may be alternating-current. It is appropriate to pattern the first transparent electrode into a shape that facilitates, when the electrophoretic particles migrate in the manner of covering the first transparent electrode, and the value of the light blocking rate of the dimming apparatus decreases thereby, optimization of the value of the light blocking rate of the dimming apparatus. It is appropriate to determine this shape through various tests. When necessary, insulating layers may be formed on the transparent electrodes. As examples of materials of these insulating layers, there may be mentioned colorless-transparent insulating resins. Specifically, there may be mentioned, for example, an acrylic resin, an epoxy resin, a fluorine resin, a silicone resin, a polyimide resin, and a polystyrene resin.

As examples of a ratio of an amount of the electrophoretic particles to an amount of a dispersion liquid (dispersion medium) in the electrophoretic dispersion liquid, there may be mentioned 0.1 parts by mass to 15 parts by mass, preferably, 1 part by mass to 10 parts by mass of the electrophoretic particles with respect to 100 parts by mass of the dispersion liquid (dispersion medium). As examples of the dispersion liquid (dispersion medium) that causes the electrophoretic particles to disperse, there may be mentioned colorless transparent liquids having high insulating properties, specifically, a non-polar dispersion medium, more specifically, aliphatic hydrocarbon, aromatic hydrocarbon, halogenated hydrocarbon, and silicone oil. In this context, as examples of the aliphatic hydrocarbon, there may be mentioned pentane, hexane, cyclohexane, heptane, octane, nonane, decane, dodecane, ligroin, solvent naphtha, kerosene, normal paraffin, and isoparaffin. Further, as examples of the aromatic hydrocarbon, there may be mentioned benzene, toluene, xylene, and alkylbenzene. As the silicone oil, there may be mentioned various dimethylpolysiloxane including modified silicone oil. More specifically, there may be mentioned, for example, Isopar G, Isopar H, Isopar L, Isopar M, Exxsol D30, Exxsol D40, Exxsol D80, Exxsol D110, and Exxsol D130 manufactured by Exxon Mobil Corporation, IP Solvent 1620, IP Solvent 2028, and IP Solvent 2835 manufactured by Idemitsu Petrochemical Co., Ltd., Shellsol 70, Shellsol 71, Shellsol 72, Shellsol A, and Shellsol AB manufactured by Shell Chemicals Japan Ltd., and Naphthesol L, Naphthesol M, and Naphthesol H manufactured by Nippon Oil Cooperation. Note that, these may be used alone, or two or more of them can be used by being mixed with each other.

There may be employed a structure in which the electrophoretic dispersion liquid is sealed in microcapsules. The microcapsules can be obtained by known methods such as an interfacial polymerization method, an in-situ polymerization method, and a coacervation method. Excellent light-transmitting properties are required of materials of the microcapsules. Specifically, as examples of these materials, there may be mentioned urea-formaldehyde resins, melamine-formaldehyde resins, polyester resins, polyurethane resins, polyamide resins, polyethylene resins, polystyrene resins, polyvinyl alcohol resins, gelatin, or copolymers thereof. A method of arranging the microcapsules on a substrate is not particularly limited, and there may be mentioned, for example, an ink jet method. Note that, in order to prevent misalignment of the microcapsules arranged on the substrate, the microcapsules may be fixed on a substrate with use of a light-transmitting binder resin. As examples of the light-transmitting binder resin, there may be mentioned water-soluble polymers, more specifically, for example, polyvinyl alcohol, polyurethane, polyester, acrylic resins, and silicone resins.

It is not particularly necessary to use a charge control agent with respect to the electrophoretic particles. However, when a positive-charge control agent is used for positively charging the electrophoretic particles, as examples of the positive-charge control agent, there may be mentioned nigrosine dyes such as Nigrosine Base EX (manufactured by Orient Chemical Industries Co., Ltd.), quaternary ammonium salts such as P-51 (manufactured by Orient Chemical Industries Co., Ltd.) and COPY CHARGE PX VP435 (manufactured by Hoechst Japan Co., Ltd.), alkoxylated amines, alkylamides, molybdic acid chelate pigments, imidazole compounds such as PLZ1001 (manufactured by SHIKOKU CHEMICALS CORPORATION), and transparent or white onium compounds. Note that, as the onium compounds, primary to quaternary compounds can be freely selected from ammonium compounds, sulfonium compounds, and phosphonium compounds. For example, a substituent bonded to a nitrogen atom, a sulfur atom, or a phosphorous atom is an alkyl group or an aryl group. As salts, halogen elements represented by chlorine, a hydroxyl group, and a carboxylic acid group are preferred as counter ions. However, salts are not limited thereto. Among them, primary to tertiary amine salts, and quaternary ammonium salts are particularly preferred. When a negative-charge control agent is used for negatively charging the electrophoretic particles, as examples of the negative-charge control agent, there may be mentioned metal complexes such as Bontron S-22, Bontron S-34, Bontron E-81, and Bontron E-84 (all manufactured by Orient Chemical Industries Co., Ltd.) and Spiron Black TRH (manufactured by Hodogaya Chemical Co., Ltd.), thioindigo pigments, quaternary ammonium salts such as COPY CHARGE NX VP434 (manufactured by Hoechst Japan Co., Ltd.), calixarene compounds such as Bontron E-89 (manufactured by Orient Chemical Industries Co., Ltd.), boron compounds such as LR147 (manufactured by Japan Carlit Co., Ltd.), fluorine compounds such as magnesium fluoride and fluorinated carbon, known metal soaps such as aluminum stearate, calcium stearate, aluminum laurate, barium laurate, sodium oleate, zirconium octylate, and cobalt naphthenate, salicylic acid-based metal complexes with azine compounds, and phenol-based condensates. As additive amounts of the charge control agents, there may be mentioned 100 parts by mass to 300 parts by mass with respect to 100 parts by mass of the electrophoretic particles.

As the dispersion liquid (dispersion medium) constituting the electrophoretic dispersion liquid, there may be used non-ionic surfactants such as sorbitan fatty acid esters (for example, sorbitan monooleate, sorbitan monolaurate, sorbitan sesquioleate, and sorbitan trioleate); polyoxyethylene sorbitan fatty acid esters (for example, polyoxyethylene sorbitan monostearate and polyoxyethylene sorbitan monooleate); polyethylene glycol fatty acid esters (for example, polyoxyethylene monostearate and polyethylene glycol diisostearate); polyoxyethylene alkylphenyl ethers (for example, polyoxyethylene nonylphenyl ether and polyoxyethylene octylphenyl ether); and aliphatic diethanolamides. Further, as examples of a polymeric dispersing agent, there may be mentioned styrene-maleic acid resins, styrene-acrylic resins, rosin, urethane-based polymer compounds BYK-160, BYK-162, BYK-164, and BYK-182 (manufactured by BYK-Chemie GmbH), urethane-based dispersing agents EFKA-47 and LP-4050 (manufactured by Efka Chemicals BV), polyester-based polymer compound Solsperse 24000 (manufactured by Zeneca Co. Ltd.), and aliphatic diethanolamide-based polymer compound Solsperse 17000 (manufactured by Zeneca Co. Ltd.). In addition, as other examples of the polymeric dispersing agent, there may be mentioned random copolymers with monomers capable of forming segments that can be solvated to the dispersion medium, such as lauryl methacrylate, stearyl methacrylate, 2-ethylhexyl methacrylate, and cetyl methacrylate, monomers capable of forming segments that are difficult to solvate to the dispersion medium, such as methyl methacrylate, ethyl methacrylate, isopropyl methacrylate, styrene, and vinyltoluene, and monomers having polar functional groups, and graft copolymers disclosed in Japanese Patent Application Laid-open No. 3-188469. As the monomers having the polar functional groups, there may be mentioned monomers having acidic functional groups, such as acrylic acid, methacrylic acid, itaconic acid, fumaric acid, maleic acid, and styrenesulfonic acid; monomers having basic functional groups, such as dimethylaminoethyl methacrylate, diethylaminoethyl methacrylate, vinylpyridine, vinylpyrrolidine, vinylpiperidine, and vinyl lactam; salts thereof; styrene-butadiene copolymers, and block copolymers of styrene and long-chain alkyl methacrylate disclosed in Japanese Patent Application Laid-open No. 60-10263. Further, the dispersing agent such as the graft copolymers disclosed in Japanese Patent Application Laid-Open No. 3-188469 may be added. As additive amounts of the dispersing agents, there may be mentioned 0.01 parts by mass to 5 parts by mass with respect to 100 parts by mass of the electrophoretic particles. Ionic surfactants may be added to more effectively cause electrophoretic movements of the electrophoretic particles. As specific examples of anionic surfactants, there may be mentioned sodium dodecylbenzenesulfonate, sodium dodecylsulfate, sodium alkylnaphthalenesulfonate, and sodium dialkyl sulfosuccinate. Further, as specific examples of cationic surfactants, there may be mentioned alkylbeneznedimethylammonium chloride, alkyltrimethylammonium chloride, and distearylammonium chloride. In addition, ionic additives soluble in the non-polar dispersion medium, such as trifluorosulfonylimide salts, trifluoroacetate salts, and trifluorosulfate salts may be added. As additive amounts of the ionic additives, there may be mentioned 1 part by mass to 10 parts by mass with respect to 100 parts by mass of the electrophoretic particles.

As examples of the electrophoretic particles, there may be mentioned carbon black (black), various metal oxides, phthalocyanine dyes (cyan), Direct Blue 199 (Project Cyan), Magenta 377 (magenta), Reactive Red 29 (magenta), Reactive Red 180 (magenta), and azo dyes (yellow, more specifically, Yellow 104, Ilford AG, Rue de l'Industrie, CH-1700 Fribourg, Switzerland).

When the dimming layer is constituted by an electrolyte layer containing metal ions, it is desired that the metal ions be silver ions, and the electrolyte contain at least one salt (referred to as "supporting electrolyte salt") selected from the group consisting of LiX, NaX, and KX (note that, X is a fluorine atom, a chlorine atom, a bromine atom, or an iodine atom).

The electrolyte contains the metal ions as a coloring material that exhibits its color by electrochemical reduction and oxidation, and deposition/dissolution to be caused thereby. In addition, by the electrochemical deposition/dissolution reaction of the metal ions, coloration and decoloration are caused. With this, the light blocking rate of the dimming apparatus is varied. In other words, it can be said that such an operation of the dimming apparatus in the display apparatus is what is called an operation that reversibly causes a deposition reaction of the metal by electrolytic plating and an elution reaction of the deposited metal. As examples of the metal ions capable of causing the coloration and the decoloration by the electrochemical deposition/dissolution in this way, although not particularly limited, there may be mentioned, in addition to silver (Ag) mentioned above, ions of bismuth (Bi), copper (Cu), sodium (Na), lithium (Li), iron (Fe), chromium (Cr), nickel (Ni), and cadmium (Cd), and combinations of these ions. Among them, particularly preferred metal ions are those of silver (Ag) and bismuth (Bi). Silver and bismuth are capable of causing the reversible reaction to easily progress, and have a high degree of discoloration at the time of the deposition.

In this context, with regard to the metal ions contained in the electrolyte, specifically, a substance containing the metal ions is dissolved in the electrolyte. More specifically, as examples of the substance containing the metal ions, there may be mentioned at least one of silver halides such as AgF, AgCl, AgBr, and AgI, preferably, AgI or AgBr. The substance containing ions of these metals is dissolved in the electrolyte. As examples of a concentration of the silver halide, there may be mentioned 0.03 mol/L to 2.0 mol/L.

The electrolyte containing the metal ions is sealed between the first substrate and the second substrate. In this context, the electrolyte may be an electrolytic solution or a polymer electrolyte. Specifically, as the electrolytic solution, there may be used those obtained by dissolving a metal salt or the alkyl quaternary ammonium salt into a solvent. Specifically, as the electrolyte, there may be used water, ethyl alcohol, isopropyl alcohol, 2-ethoxyethanol, 2-methoxyethanol, propylene carbonate, dimethyl carbonate, ethylene carbonate, γ-butyrolactone, acetonitrile, sulfolane, dimethoxyethane, dimethylformamide (DMF), diethylformamide (DEF), dimethylsulfoxide (DMSO), N,N-dimethylacetamide (DMAA), N-methylpropionic acid amide (MPA), N-methylpyrrolidone (MP), dioxolan (DOL), ethyl acetate (EA), tetrahydrofuran (THF), methyltetrahydrofuran (MeTHF), or mixtures thereof. Further, as a matrix (base material) polymer to be used as that of the polymer electrolyte, there may be mentioned a polymeric material having a repeating unit of alkylene oxide, alkyleneimine, or alkylene sulfide in a main skeleton unit or a side chain unit, or in both the main skeleton unit and the side chain unit, a copolymer containing a plurality of these compounds in different units, a polymethyl methacrylate derivative, polyvinylidene fluoride, polyvinylidene chloride, polyacrylonitrile, a polycarbonate derivative, or a mixture thereof. When the electrolyte is formed of a polymer electrolyte, the electrolyte may be a single layer, or may have a laminated structure in which a plurality of polymer electrolytes are laminated.

A matrix polymer swollen by adding water or an organic solvent may also be used. Particularly, when, for example, a response speed is required, by adding water or the organic solvent to the matrix polymer, the metal ions contained in the electrolyte are allowed to more easily move.

Note that, when hydrophilicity is required depending on properties of the matrix polymer and on which type of electrochemical reaction is desired, it is preferred to add water, ethyl alcohol, isopropyl alcohol, or a mixture thereof. When hydrophobicity is required, it is preferred to add propylene carbonate, dimethyl carbonate, ethylene carbonate, γ-butyrolactone, acetonitrile, sulfolane, dimethoxyethane, ethyl alcohol, isopropyl alcohol, dimethylformamide, dimethyl sulfoxide, dimethylacetamide, n-methylpyrrolidone, or a mixture thereof.

As described above, by the deposition of the metal on the second electrode and the dissolution of the metal into the electrolyte, which are caused by the application of the voltages to the first electrode and the second electrode, the coloration and the decoloration of the dimming apparatus (specifically, an electrodeposition-type dimming apparatus) are caused. In this case, in general, a surface of a layer formed of the metal deposited on the second electrode (metal layer), which is held in contact with the electrolyte, is uneven, and exhibits a blackish color. Meanwhile, another surface of the metal layer, which is held in contact with the second electrode, has a mirror-surface shape. Therefore, in use as the dimming apparatus, it is desired that the surface of the metal layer, which is held in contact with the electrolyte, face the observer's side. In other words, it is preferred to employ a configuration in which the first substrate is arranged on the observer's side with respect to the second substrate.

As described above, when the salt (supporting electrolyte salt) containing ion species different from metal ion species to be deposited or dissolved is added to the electrolyte, the electrochemical deposition/dissolution reaction can be performed more effectively and stably. As such a supporting electrolyte salt, the lithium salts, the potassium salts, the sodium salts, and the tetraalkyl quaternary ammonium salts described above may be mentioned. In this context, as examples of the lithium salts, specifically, there may be mentioned LiCl, LiBr, LiI, LiBF$_4$, LiClO$_4$, LiPF$_6$, and LiCF$_3$SO$_3$. Further, as the potassium salts, specifically, there may be mentioned KCl, KI, and KBr. Still further, as the sodium salts, specifically, there may be mentioned NaCl, NaI, and NaBr. Yet further, as the tetraalkyl quaternary ammonium salts, specifically, there may be mentioned tetraethylammonium fluoroborate, tetraethylammonium perchlorate, tetrabutylammonium fluoroborate, tetrabutylammonium perchlorate, and tetrabutylammonium halide salts.

Note that, the alkyl chain lengths of the quaternary ammonium salts mentioned above may be different from each other. It is appropriate to add the supporting electrolyte salt, for example, at a concentration of approximately ½ times to 5 times as high as that of the substance containing the metal ions. Further, inorganic particles may be mixed as a coloring agent into the electrolyte formed of the polymer electrolyte.

In addition, in order to reversibly and efficiently perform the electrochemical reaction, in particular, the deposition/dissolution of the metal, at least one of additives such as a growth inhibitor, a stress inhibitor, a brightener, a complexing agent, and a reducing agent may be added to the electrolyte. As such additives, organic compounds including a group having an oxygen atom or a sulfur atom are preferred. For example, it is preferred to add at least one selected from the group consisting of thiourea, 1-aryl-2-thiourea, mercaptobenzimidazole, coumalin, phthalic acid, succinic acid, salicylic acid, glycolic acid, dimethylamine borane (DMAB), trimethylamine borane (TMAB), tartaric acid, oxalic acid, and D-glucono-1,5-lactone. In particular, it is preferred to add mercaptobenzimidazole based on mercaptoalkylimidazole because the reversibility is increased, and because advantages of long-term storage stability and high-temperature storage stability can be significantly increased.

As materials of the transparent first substrate and the transparent second substrate constituting the dimming apparatus, specifically, there may be mentioned a transparent glass substrate of, for example, a soda-lime glass or a white plate glass, a plastic substrate, a plastic sheet, and a plastic film. In this context, as examples of the plastic, there may be mentioned polyethylene terephthalate, polyethylene naphthalate, polycarbonate, cellulose esters such as acetylcellulose, fluorinated polymers such as a copolymer of polyvinylidene fluoride or polytetrafluoroethylene and hexafluoropropylene, polyethers such as polyoxymethylene, polyolefins such as polyacetal, polystyrene, polyethylene, polypropylene, and a methyl pentene polymer, a polyimide such as polyamidimide or polyetherimide, polyamide, polyethersulfone, polyphenylenesulfide, polyvinylidene fluoride, tetra acetyl cellulose, brominatedphenoxy, polyarylate, and polysulfone. The plastic sheet or the plastic film may be rigid so as not to be easily bent, or may be flexible. When the first substrate and the second substrate are constituted by the transparent plastic substrates, barrier layers each made of an inorganic material or an organic material may be formed on inner surfaces of the substrates in advance.

The first substrate and the second substrate are sealed and bonded along their outer-rim portions. As a sealing member that is also referred to as a sealant, there may be used various resins such as thermosetting, photo-curable, moisture-curable, and anaerobic-curable resins, specifically, an epoxy resin, a urethane resin, an acrylic resin, a vinyl acetate resin, an ene-thiol-based resin, a silicone-based resin, or a modified polymer resin.

When one of the substrates constituting the dimming apparatus is configured to double as a component of the optical apparatus, a weight of an entirety of the display apparatus can be reduced. In addition, there is no risk that a user of the display apparatus feels a sense of discomfort. Note that, another one of the substrates may be configured to be thinner than the one of the substrates.

The first transparent electrode may be patterned, or need not necessarily be patterned. The second transparent electrode also may be patterned, or need not necessarily be patterned. As materials of the first transparent electrode and the second transparent electrode, specifically, there may be mentioned an indium-tin oxide (ITO, including Sn-doped $In_2O_3$, crystalline ITO, and amorphous ITO), fluorine-doped $SnO_2$ (FTC), IFO (F-doped $In_2O_3$), antimony-doped $SnO_2$ (ATO), $SnO_2$, ZnO (including Al-doped ZnO and B-doped ZnO), an indium-zinc oxide (IZO), a spinel-type oxide, an oxide having a $YbFe_2O_4$ structure, and conductive polymers such as polyaniline, polypyrrole, and polythiophene. However, the materials are not limited thereto, and combinations of two or more thereof also may be used. For example, the first electrode and the second electrode, each of which has a thin-line planar shape, or one of the first connecting portion and the second connecting portion may be made of metals such as gold, silver, copper, aluminum, nickel, and titanium, or alloys thereof. Both the first electrode and the second electrode, or one of the first connecting portion and the second connecting portion is required to be lower in electric resistance than the first transparent electrode and the second transparent electrode. The first transparent electrode, the second transparent electrode, the first electrode, the second electrode, the first connecting portion, and the second connecting portion may be formed by physical vapor deposition methods (PVD methods) such as a vacuum deposition method and a sputtering method, various chemical vapor deposition methods (CVD methods), or various types of coating. The electrodes, the transparent electrodes, and the connecting portions may be patterned by arbitrary methods such as an etching method, a lift-off method, and methods using various types of masking.

The optical apparatus is of a transflective type (see-through type). Specifically, at least a part of the optical apparatus, which faces an eyeball (pupil) of the observer, is configured to be transflective (see-through) such that the observer can see an outside scene through this part of the optical apparatus and the dimming apparatus. The observer can observe brightness of the light beams that have passed through the dimming apparatus and the optical apparatus, and the observer can manually control and adjust the light blocking rate by operating a switch, a button, a dial, a slider, a knob, or the like. Alternatively, the light blocking rate can be controlled and adjusted on the basis of a measurement result of the above-described second illuminance sensor (transmitted-light-illuminance measurement sensor) that measures the illuminance on the basis of the light beams from the external environment, which have transmitted through the dimming apparatus. Note that, in order to control and adjust the light blocking rate, specifically, it is appropriate to control the voltages to be applied to the first electrode and the second electrode. The at least two second illuminance sensors (transmitted-light-illuminance measurement sensors) may be arranged such that the illuminance is measured on the basis of the light beams that have passed through the part corresponding to the high light-blocking rate, and that the illuminance is measured on the basis of the light beams that have passed through the part corresponding to the low light-blocking rate. The display apparatus may include one image display apparatus, or may include two image display apparatuses. When the two image display apparatuses are provided, in one of the dimming apparatuses and in another one of the dimming apparatuses, by adjusting the voltages to be applied to the first electrode and the second electrode, a light blocking rate of the one of the dimming apparatuses, and a light blocking rate of the other one of the dimming apparatuses can be equalized to each other. The light blocking rate of the one of the dimming apparatuses, and the light blocking rate of the other one of the dimming apparatuses can be controlled on the basis of, for example, the measurement results of the above-described second illuminance sensors (transmitted-light-illuminance measurement sensors) that measure the illuminance on the basis of the light beams from the external environment, which have transmitted through the dimming apparatuses. Alternatively, these light blocking rates may be manually controlled and adjusted by the operations of the switch, the button, the dial, the slider, the knob, or the like by the observer who observes brightness of light beams that have passed through one of the dimming apparatuses and corresponding one of the optical apparatuses, and brightness of light beams that have passed through the other one of the dimming apparatuses and another corresponding one of the optical apparatuses. At a time of adjusting the light blocking rates, test patterns may be displayed on the optical apparatuses.

The term "transflective," which is used sometimes herein, does not mean transmitting or reflecting ½ (50%) of the light beams to be input, but means transmitting ones of the light beams to be input, and reflecting the other.

In this context, in the optical apparatus having the first structure, as described above, the configuration in which the first deflecting means deflects the light beams input to the light guide plate, and the second deflecting means deflects the light beams propagated by the total reflection in the light guide plate may be employed. Further, in this configuration, the first deflecting means may function as a reflective mirror, and the second deflecting means may function as a transflective mirror. Note that, for the sake of convenience, such a display apparatus having the first structure is referred to as an "optical apparatus having a structure 1-A."

In such an optical apparatus having the structure 1-A, the first deflecting means may be constituted by a light reflecting film (type of mirror) that is made, for example, of metals including alloys, and that reflects the light beams input to the light guide plate, or by a diffraction grating (such as holographic diffraction-grating film) that diffracts the light beams input to the light guide plate. Alternatively, the first deflecting means may be constituted, for example, by the multi-layer laminated structure in which a large number of dielectric lamination films are laminated, a half mirror, or a polarizing beam splitter. Further, the second deflecting means may be constituted by the multi-layer laminated structure in which a large number of dielectric lamination films are laminated, the half mirror, the polarizing beam splitter, or the holographic diffraction grating. In addition, the first deflecting means and the second deflecting means are arranged in the light guide plate (built in the light guide plate). In the first deflecting means, in order that parallel light beams input to the light guide plate are totally reflected in the light guide plate, the parallel light beams input to the light guide plate are reflected or diffracted. Meanwhile, in the second deflecting means, the parallel light beams propagated by the total reflection in the light guide plate are reflected or diffracted a plurality of times, and are emitted in a state of the parallel light beams from the light guide plate.

Alternatively, there may be employed a configuration in which the first deflecting means diffracts the light beams input to the light guide plate, and the second deflecting means diffracts the light beams propagated by the total reflection in the light guide plate. Further, in this configuration, the first deflecting means and the second deflecting means may each be constituted by a diffraction grating element. More specifically, the diffraction grating element may be constituted by a reflective diffraction-grating element or a transmissive diffraction-grating element. Alternatively, one of the diffraction grating elements may be constituted by the reflective diffraction-grating element, and another one of the diffraction grating elements may be constituted by the transmissive diffraction-grating element. Note that, as the reflective diffraction-grating element, there may be mentioned a reflective volume-holographic diffraction grating. For the sake of convenience, the first deflecting means constituted by the reflective volume-holographic diffraction grating is sometimes referred to as a "first diffraction-grating member," and for the sake of convenience, the second deflecting means constituted by the reflective volume-holographic diffraction grating is sometimes referred to as a "second diffraction-grating member." In addition, for the sake of convenience, such an optical apparatus having the first structure is referred to as an "optical apparatus having a structure 1-B."

The image display apparatus in the display apparatus or the like according to the present disclosure can display monochromatic (for example, green) images. Further, in this case, there may be employed a configuration in which a viewing angle is divided, for example, into two parts (more specifically, for example, bisected), and the first deflecting means is formed by laminating two diffraction-grating members corresponding respectively to the two viewing-angle groups formed by the division. Alternatively, there may be employed a configuration in which, at a time of displaying color images, the first diffraction-grating member or the second diffraction-grating member is formed by laminating P (for example, P=3, which corresponds to three types of red, green, and blue) diffraction-grating layers each formed of the reflective volume-holographic diffraction grating so as to adapt to diffraction of different P types of light beams in the P types of wavelength bands (or wavelengths). Interference fringes corresponding to one of the types of the wavelength bands (or wavelengths) are formed in each of the diffraction grating layers. Alternatively, in order to adapt to the diffraction of the different P types of the light beams in the P types of the wavelength bands (or wavelengths), there may be employed a configuration in which the P types of the interference fringes are formed in the first diffraction-grating member or the second diffraction-grating member that is formed of a single diffraction-grating layer. Still alternatively, there may be employed a structure in which, for example, a first light-guide plate, a second light-guide plate, and a third light-guide plate are laminated with clearances therebetween, the first light-guide plate being provided with a diffraction grating member constituted by the diffraction grating layer formed of the reflective volume-holographic diffraction grating that diffracts and reflects light beams in a red wavelength band (or wavelength), the second light-guide plate being provided with a diffraction grating member constituted by the diffraction grating layer formed of the reflective volume-holographic diffraction grating that diffracts light beams in a green wavelength band (or wavelength), the third light-guide plate being provided with a diffraction grating member constituted by the diffraction grating layer formed of the reflective volume-holographic diffraction grating that diffracts light beams in a blue wavelength band (or wavelength). Yet alternatively, there may be employed a configuration in which, for example, the viewing angle is trisected, and the first diffraction-grating member or the second diffraction-grating member is formed by laminating the diffraction grating layers corresponding respectively to the viewing angles. In this context, by employing such configurations, it is possible to achieve an increase in diffraction efficiency, an increase in diffraction receiving angle, and optimization of a diffraction angle at the time when the light beams in corresponding ones of the wavelength bands (or wavelengths) are diffracted by the first diffraction-grating member or the second diffraction-grating member. It is preferred to arrange a protective member such that the reflective volume-holographic diffraction grating is not directly exposed to the atmosphere. One of the first substrate and the second substrate constituting the dimming apparatus may double as this protective member.

As a material of the first diffraction-grating member and the second diffraction-grating member, there may be mentioned a photopolymer material. It is appropriate to use constituent materials or structures of related-art reflective volume-holographic diffraction gratings as they are as the constituent material or a basic structure of each of the first diffraction-grating member and the second diffraction-grating member each constituted by the reflective volume-holographic diffraction grating. The reflective volume-holographic diffraction grating refers to a holographic diffraction grating that diffracts only +first order diffracted light beams. The interference fringes are formed from an inside of the diffraction grating member to surfaces thereof. There are no problems even when these interference fringes themselves are formed by related-art forming methods. Specifically, it is appropriate, for example, to irradiate a member (such as a photopolymer material) constituting the diffraction grating member with object light beams in a first predetermined direction on one side, and at the same time, irradiate the member constituting the diffraction grating member with reference light beams in a second predetermined direction on another side such that the interference fringes that are formed by the object light and the reference light are recorded in the member constituting the diffraction grating member. By appropriately selecting the first predetermined direction, the second predetermined direction, a wavelength of the object light beams, and a wavelength of the reference light beams, it is possible to set a desired pitch of the interference fringes and a desired inclination angle (slant angle) of the interference fringes with respect to the surfaces of the diffraction grating member. The inclination angle of the interference fringes refers to an angle to be formed between the surfaces of the diffraction grating member (or diffraction grating layer) and each of the interference fringes. When the first diffraction-grating member and the second diffraction-grating member are constituted by a laminated structure of the P diffraction-grating layers each formed of the reflective volume-holographic diffraction grating, at a time of laminating such diffraction grating layers, it is appropriate to separately prepare the P diffraction-grating layers, and then to laminate (bond) the P diffraction-grating layers with use of, for example, a UV-curable adhesive. Alternatively, the P diffraction-grating layers may be prepared by preparing one of the diffraction grating layers with use of an adhesive photopolymer material, and then by sequentially applying the adhesive photopolymer materials thereon.

Alternatively, in the image display apparatus in the display apparatus or the like according to the present disclosure, there may be employed a configuration in which the optical apparatus is constituted by a transflective mirror to which the light beams emitted from the image forming apparatus are input, and from which the light beams are emitted toward the pupil of the observer. There may be employed a configuration in which the optical apparatus is constituted by a polarizing beam splitter (PBS). A virtual-image forming region in the optical apparatus is formed of the transflective mirror or the polarizing beam splitter. There may be employed a structure in which the light beams emitted from the image forming apparatus are propagated in the air, and then enter the transflective mirror or the polarizing beam splitter. There may be employed a structure in which the light beams are propagated, for example, in a transparent member (specifically, member made of a material similar to a material of the light guide plate described below) such as a glass plate or a plastic plate, and then enter the transflective mirror or the polarizing beam splitter. The transflective mirror or the polarizing beam splitter may be attached to the image forming apparatus via the transparent member, or the transflective mirror or the polarizing beam splitter may be attached to the image forming apparatus via a member other than the transparent member. Herein, for the sake of convenience, such an optical apparatus is referred to as an "optical apparatus having a second structure." The transflective mirror may be constituted by the first deflecting means in the optical apparatus having the structure 1-A, specifically, by the light reflecting film (type of mirror) that is made, for example, of the metals including the alloys, and that reflects the light beams, or by the diffraction grating (such as holographic diffraction-grating film).

Alternatively, there may be employed a configuration in which the optical apparatus is constituted by a prism to which the light beams emitted from the image forming apparatus are input, and from which the light beams are emitted toward the pupil of the observer.

With regard to the image display apparatus in the display apparatus or the like according to the present disclosure, which includes the various preferred embodiments and the various preferred configurations described above, there may be employed a configuration in which the image forming apparatus includes a plurality of pixels arrayed in two-dimensional matrix. Note that, for the sake of convenience, such a configuration of the image forming apparatus is referred to as an "image forming apparatus having a first configuration."

As examples of the image forming apparatus having the first configuration, there may be mentioned an image forming apparatus including a reflective spatial-light modulator and a light source; an image forming apparatus including a transmissive spatial-light modulator and a light source; and an image forming apparatus including light-emitting elements such as organic EL (electro luminescence) elements, inorganic EL elements, light emitting diodes (LEDs), or semiconductor laser elements. Of those, the image forming apparatus including the reflective spatial-light modulator and the light source, or the image forming apparatus including the organic EL elements is preferred. As the spatial light modulators, there may be mentioned light valves, for example, a transmissive or reflective liquid-crystal-display apparatus such as an LCOS (Liquid Crystal On Silicon), and a digital micromirror device (DMD). As the light source, the light emitting elements may be mentioned. Further, there may be employed a configuration in which the reflective spatial-light modulator is constituted by the polarizing beam splitter that reflects ones of the light beams from the liquid-crystal-display apparatus and the light source, guides the ones of the light beams to the liquid-crystal-display apparatus, allows other ones of the light beams to pass, which are reflected by the liquid-crystal-display apparatus, and guides the other ones of the light beams to the optical system. As the light-emitting elements constituting the light source, there may be mentioned a red-light-emitting element, a green-light-emitting element, a blue-light-emitting element, and a white-light-emitting element. Alternatively, a white light beam may be generated by mixing colors of a red light beam, a green light beam, and a blue light beam emitted from the red-light-emitting element, the green-light-emitting element, and the blue-light-emitting element, and by equalizing their luminances to each other with use of light pipes. As examples of the light-emitting elements, the semiconductor laser elements, solid-state laser, and the LEDs may be mentioned. It is appropriate to determine the number of the pixels on the basis of specifications required of the image display apparatus. As examples of a specific value of the number of the pixels, there may be mentioned 320×240, 432×240, 640×480, 1024×768, and 1920×1080.

Alternatively, with regard to the image display apparatus in the display apparatus or the like according to the present disclosure, which includes the preferred embodiments and the preferred configurations described above, there may be employed a configuration in which the image forming apparatus includes a light source and a scanning means that scans the parallel light beams emitted from the light source. Note that, for the sake of convenience, such a configuration of the image forming apparatus is referred to as an "image forming apparatus having a second configuration."

As the light source in the image forming apparatus having the second configuration, the light-emitting elements may be mentioned. Specifically, the red-light-emitting element, the green-light-emitting element, the blue-light-emitting element, and the white-light-emitting element may be mentioned. Alternatively, the white light beam may be generated by mixing the colors of the red light beam, the green light beam, and the blue light beam emitted from the red-light-emitting element, the green-light-emitting element, and the blue-light-emitting element, and by equalizing their luminances to each other with use of the light pipes. As examples of the light-emitting elements, the semiconductor laser elements, the solid-state laser, and the LEDs may be mentioned. It is appropriate to determine the number of the pixels (virtual pixels) in the image forming apparatus having the second configuration on the basis of the specifications required of the image display apparatus. As examples of a specific value of the number of the pixels (virtual pixels), there may be mentioned 320×240, 432×240, 640×480, 1024×768, and 1920×1080. Further, in displaying the color images, when the light source includes the red-light-emitting element, the green-light-emitting element, and the blue-light-emitting element, it is preferred that the colors be mixed with each other with use of, for example, a cross prism. As examples of the scanning means, there may be mentioned MEMS (Micro Electro Mechanical Systems) and a mirror galvanometer each having a micromirror that horizontally and vertically scans the light beams emitted from the light source, the micromirror being rotatable in two-dimensional directions.

In the image forming apparatus having the first configuration or the image forming apparatus having the second configuration in the image display apparatus including the optical apparatus having the first structure, the optical system (optical system that converts the emitted light beams to the parallel light beams, sometimes referred to as a "parallel-light-emitting optical system," specifically, for example, a collimating optical system or a relay optical system) allows the light beams as the plurality of parallel light beams to be input to the light guide plate. The parallel light beams need to be generated in this way because optical-wavefront information items at the time when the light beams enter the light guide plate need to be maintained even after the light beams are emitted from the light guide plate via the first deflecting means and the second deflecting means. Note that, in order to generate the plurality of parallel light beams, specifically, it is appropriate to locate, for example, a light-emitting portion of the image forming apparatus, for example, at a position (point) at a focal length of the parallel-light-emitting optical system. The parallel-light-emitting optical system has a function to convert position information items of the pixels to angle information items in the optical system of the optical apparatus. As an example of the parallel-light-emitting optical system, there may be mentioned an optical system having a positive optical power as a whole, which is formed of any of or any combination of a convex lens, a concave lens, a free-form-surface prism, and a holographic lens. A light blocking portion having an opening portion may be arranged between the parallel-light-emitting optical system and the light guide plate such that undesired ones of the light beams emitted from the parallel-light-emitting optical system do not enter the light guide plate.

The light guide plate has two parallel surfaces (first surface and second surface) extending parallel to an axial line (longitudinal direction and horizontal direction, which correspond to X-axis) of the light guide plate. Note that, a width direction (height direction and vertical direction) of the light guide plate corresponds to a Y-axis, and a thickness direction of the light guide plate corresponds to a Z-axis. When a surface of the light guide plate, which receives the light beams, is referred to as a light-guide-plate light incident surface, and another surface of the light guide plate, from which the light beams are emitted, is referred to as a light-guide-plate light emitting surface, both the light-guide-plate light incident surface and the light-guide-plate light emitting surface may be constituted by the first surface. Alternatively, the light-guide-plate light incident surface may be constituted by the first surface, and the light-guide-plate light emitting surface may be constituted by the second surface. The interference fringes of the diffraction grating member extend substantially parallel to the Y-axis. As materials of the light guide plate, there may be mentioned glasses including optical glasses such as a quartz glass and BK7, and plastic materials (such as PMMA, a polycarbonate resin, an acrylic resin, a non-crystalline polypropylene-based resin, and styrene resins including an AS resin). The shape of the light guide plate is not limited to a flat plate shape, and may be a curved shape.

In the display apparatus or the like according to the present disclosure, there may be employed a configuration in which, in a region in the optical apparatus, to which the light beams emitted from the image forming apparatus are input, a light blocking member that blocks entry of the external light beams to the optical apparatus is arranged. By arranging, in the region in the optical apparatus, to which the light beams emitted from the image forming apparatus are input, the light blocking member that blocks the entry of the external light beams to the optical apparatus, the external light beams do not enter the region in the optical apparatus, to which the light beams emitted from the image forming apparatus are input. Thus, even when light intensities of the external light beams vary due to the operation of the dimming apparatus, there are no problems such as degradation in quality of images to be displayed on the display apparatus due to generation of, for example, undesired stray-light beams. Note that, it is preferred to employ a configuration in which the region in the optical apparatus, to which the light beams emitted from the image forming apparatus are input, is located within a projection image of the light blocking member onto the optical apparatus.

There may be employed a configuration in which the light blocking member is arranged away from the optical apparatus on an opposite side in the optical apparatus, the opposite side being opposite to a side on which the image forming apparatus is arranged. In the display apparatus having such a configuration, it is appropriate to prepare the light blocking member from, for example, an opaque plastic material. In this configuration, such a light blocking member may extend integrally from a casing of the image display apparatus, be attached to the casing of the image display apparatus, extend integrally from the frame, or be attached to the frame. Alternatively, in this configuration, the light blocking member may be arranged on a part of the optical apparatus on the opposite side with respect to the side on which the image forming apparatus is arranged, or the light blocking member may be arranged in the dimming apparatus. Note that, the light blocking member made of the opaque material may be formed on the surface of the optical apparatus, for example, by the physical vapor deposition method (PVD method) or the chemical vapor deposition method (CVD method), or may be formed, for example, by a printing method. Alternatively, a film, a sheet, or a foil made of the opaque material (such as plastic material, a metal material, or an alloy material) may be applied. It is preferred to employ a configuration in which projection images of end portions of the dimming apparatus onto the optical apparatus are located within the projection image of the light blocking member onto the optical apparatus.

In the display apparatus or the like according to the present disclosure, there may be employed a configuration in which, as described above, the frame includes the front portion that is arranged in front of the observer, and the two temple portions attached in the freely pivotal manner to both the ends of the front portion via the hinges. Note that, modern portions are attached to distal end portions of the temple portions. It is appropriate to attach the image display apparatus, which is attached to the frame, to, specifically, for example, corresponding one of the temple portions. Further, there may be employed a configuration in which the front portion and the two temple portions are integrated with each other. In other words, in an overall view of the display apparatus or the like according to the present disclosure, the frame has substantially the same structure as those of typical glasses. The frame including the pad portions may be made of the same material as those of the typical glasses, such as metals, alloys, plastic, and combinations thereof. Further, there may be employed a configuration in which the nose pads are attached to the front portion. In other words, in the overall view of the display apparatus or the like according to the present disclosure, an assembly of the frame (including the rim) and the nose pads has substantially the same structure as those of the typical glasses. The nose pads also may have known configurations and structures.

In addition, in the display apparatus or the like according to the present disclosure, from a viewpoint of design or of ease of wearing, it is desired to employ a configuration in which the wire (such as signal line or power line) from the one or the two image forming apparatuses, passes through the temple portion and the modern portion, extends from the distal end portion of the modern portion to an outside, and is connected to the control apparatus (control circuit or control means). In addition, there may be employed a configuration in which the image forming apparatuses each include a headphone unit, and a headphone-unit wire from each of the image forming apparatuses passes through the temple portion and the modern portion, and extends from the distal end portion of the modern portion to the headphone unit. As examples of the headphone unit, there may be mentioned an earbud-type headphone unit and a canal-type headphone unit. More specifically, it is preferred to employ a configuration in which the headphone-unit wire extends from the distal end portion of the modern portion to the headphone unit in a manner of wrapping around a rear of an auricle (concha). Further, there may be employed a configuration in which an imaging apparatus is attached to a central part of the front portion. Specifically, the imaging apparatus includes a lens and a solid-state image pickup element constituted, for example, by a CCD sensor or a CMOS sensor. It is appropriate to connect a wire from the imaging apparatus, for example, to one of the image display apparatuses (or image forming apparatuses) via the front portion, and to bundle this wire with the wire from the image display apparatus (or image forming apparatus).

The display apparatus or the like according to the present disclosure may constitute, for example, a head mounted display (HMD). Further, with this, the display apparatus can be downsized and reduced in weight. The sense of discomfort at the time of wearing the display apparatus can be significantly reduced, and in addition, manufacturing cost can be reduced. Further, the display apparatus or the like according to the present disclosure is applicable to a head-up display (HUD) installed, for example, in a cockpit of a vehicle or an aircraft. Specifically, the HUD projects, onto a windshield of, for example, the cockpit of the vehicle or the aircraft, the virtual-image forming region in which the virtual images are formed on the basis of the light beams emitted from the image forming apparatus, or the HUD includes a combiner that is arranged with respect to the windshield of, for example, the cockpit of the vehicle or the aircraft, and that includes the virtual-image forming region in which the virtual images are formed on the basis of the light beams emitted from the image forming apparatus. With respect to these HUDs, it is appropriate to cause the virtual-image forming region or the combiner to overlap with at least a part of the dimming apparatus.

Embodiment 1

Figure 1B:
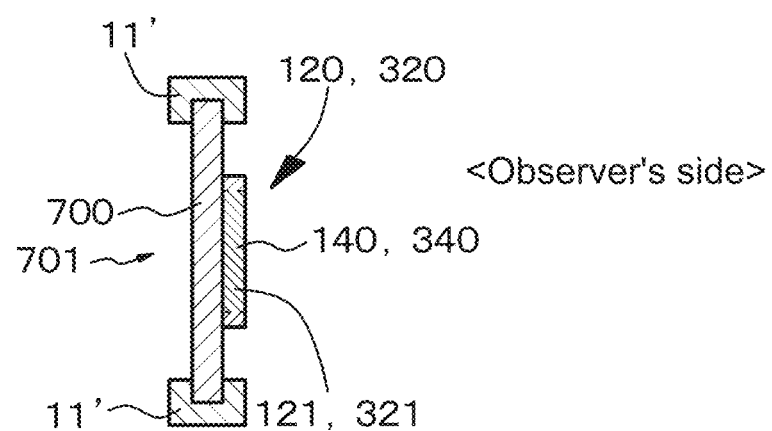
FIG. 1B is a schematic cross-sectional view of the optical apparatus and the dimming apparatus, which is taken along arrows B-B in FIG. 1A.
Figure 4A:
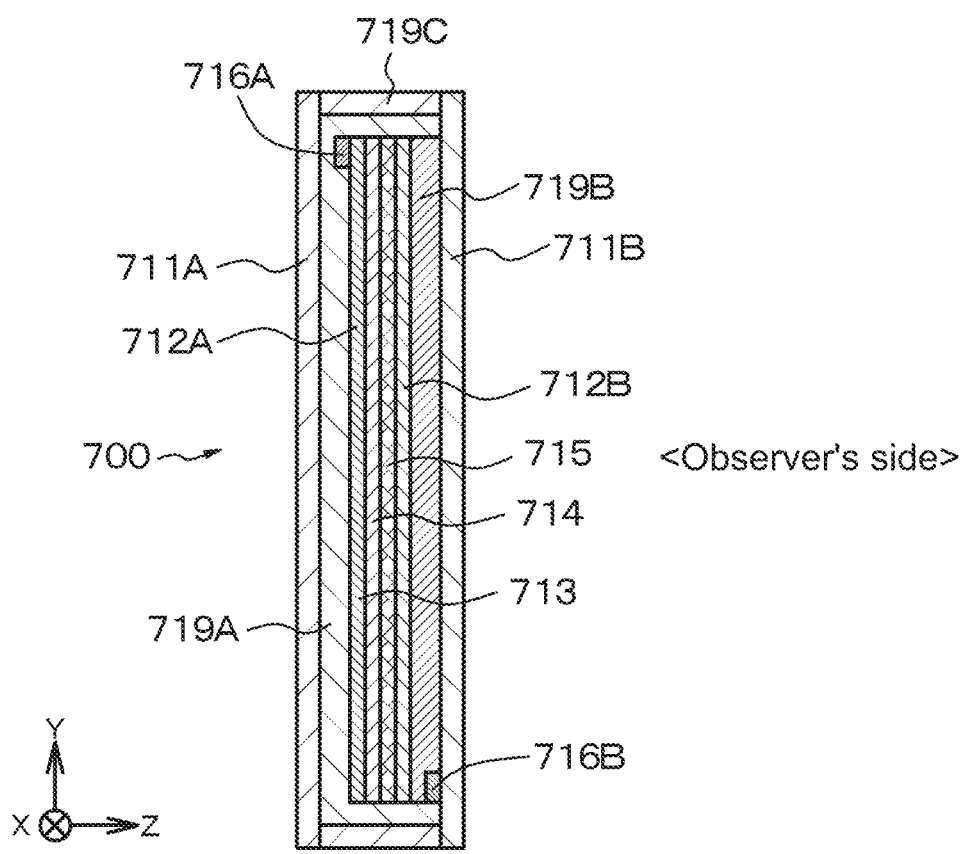
FIG. 4A is a schematic cross-sectional view of the dimming apparatus in the display apparatus according to Embodiment 1 as taken along the arrows B-B in FIG. 1A.
Figure 4B:
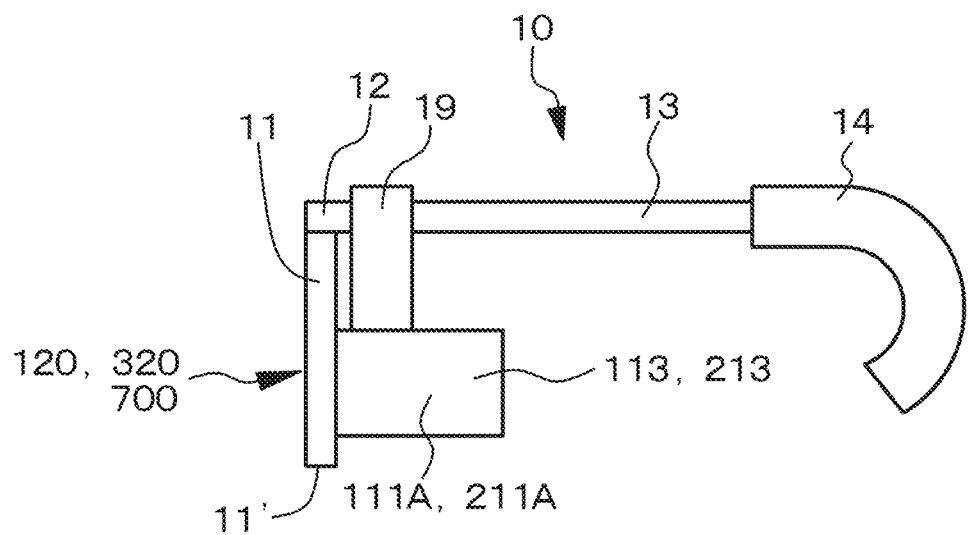
FIG. 4B is a schematic side view of the display apparatus according to Embodiment 1.
Figure 5A:
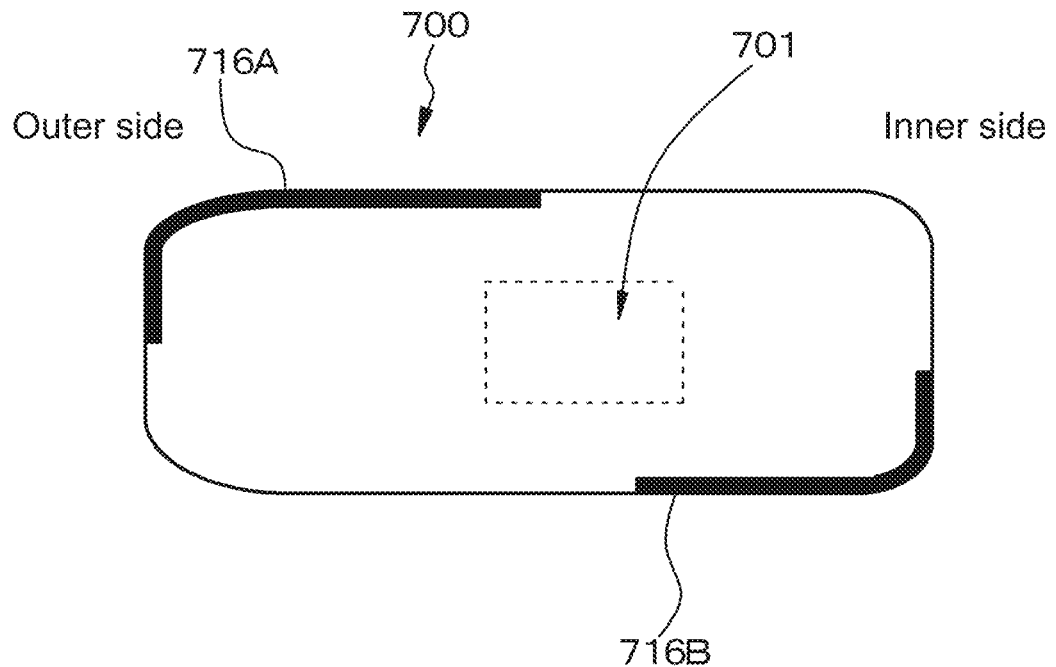
FIG. 5A is a schematic front view of the dimming apparatus before its operation in the display apparatus according to Embodiment 1.
Figure 5B:
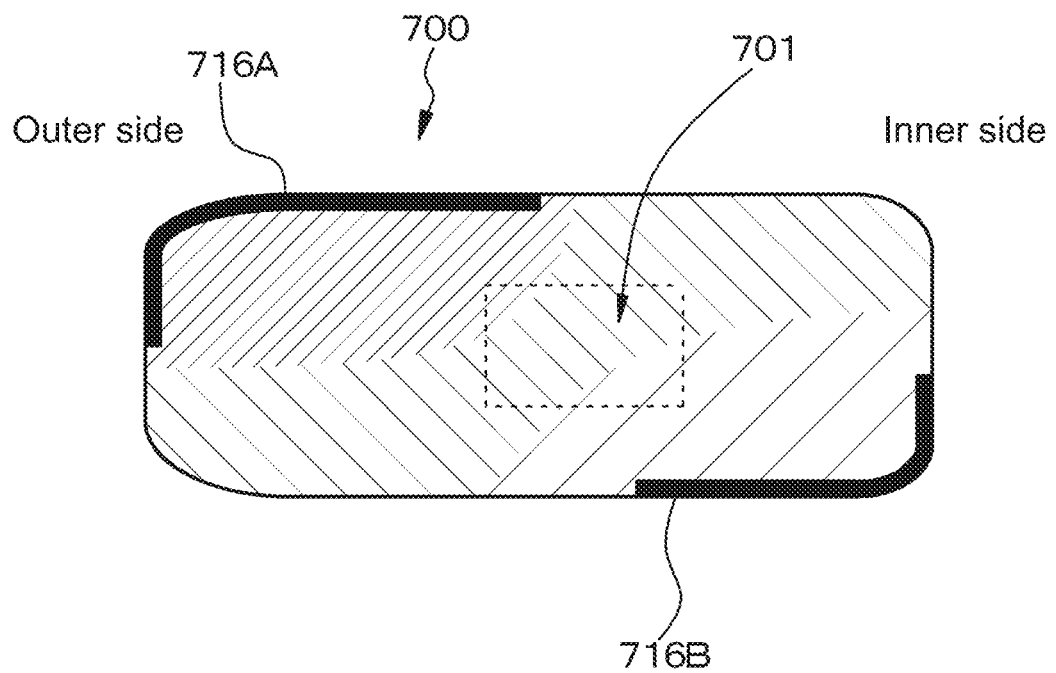
FIG. 5B is a schematic front view of the dimming apparatus during its operation.
Figure 6:
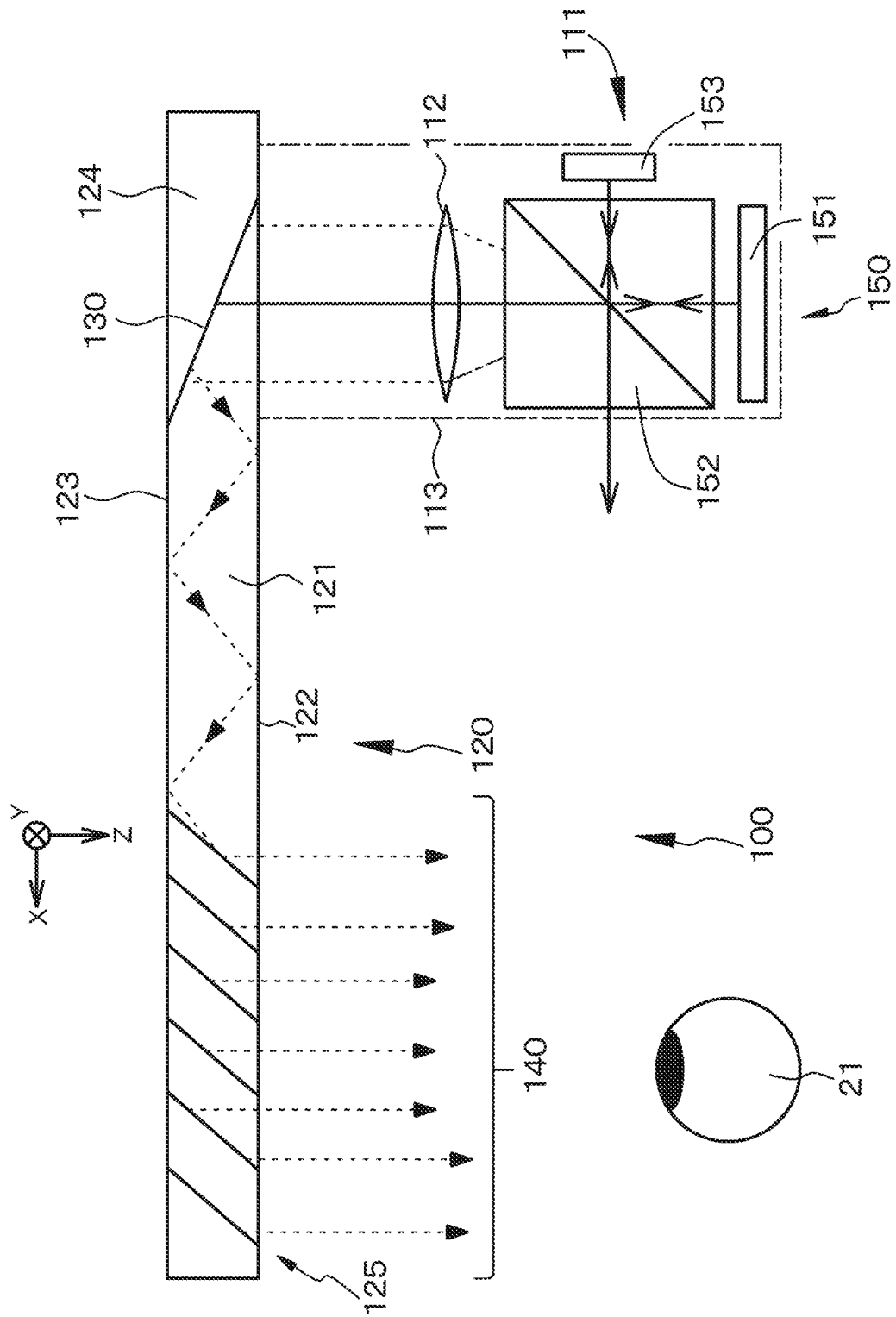
FIG. 6 is a conceptual view of an image display apparatus in the display apparatus according to Embodiment 1.
Figure 7:
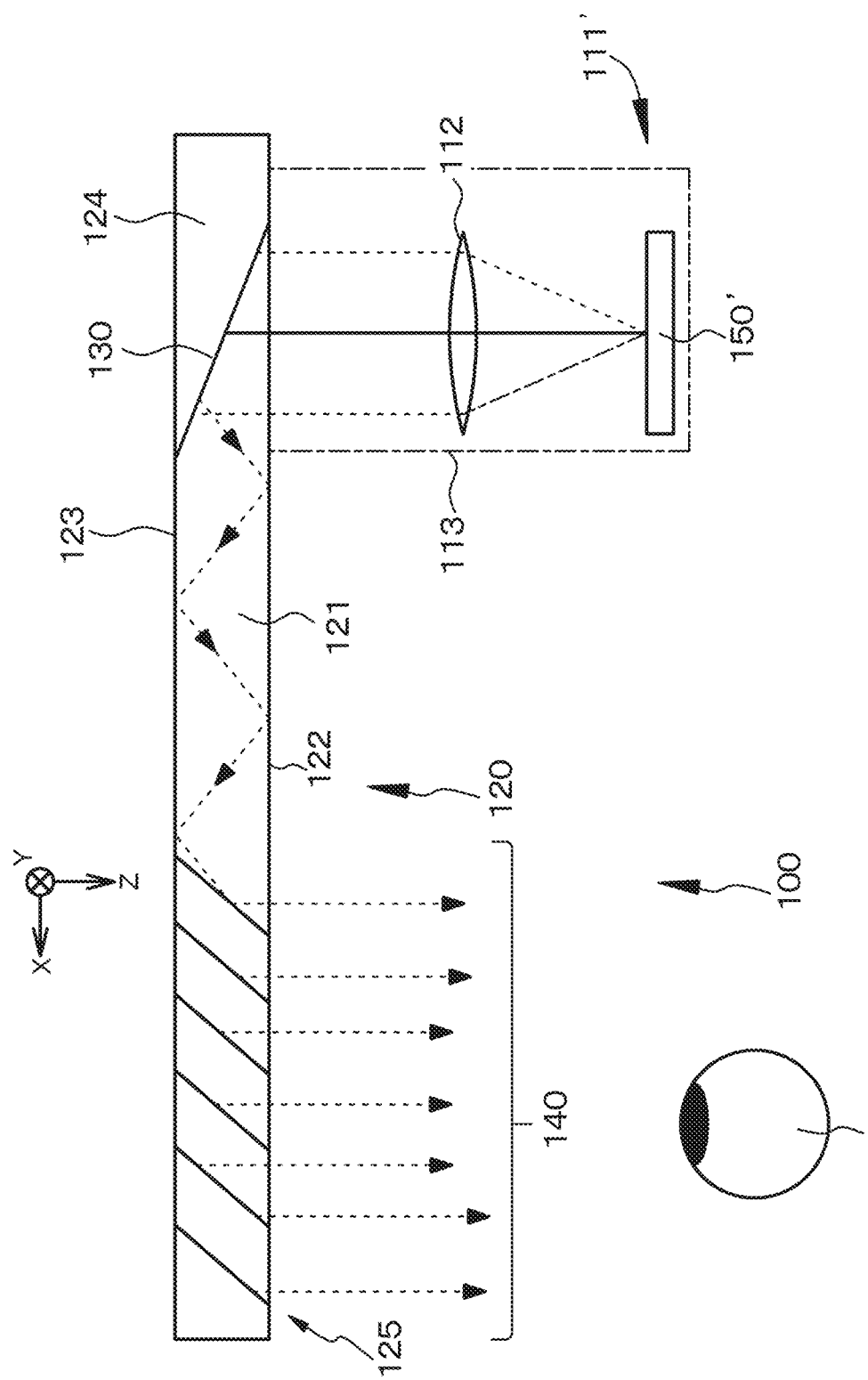
FIG. 7 is a conceptual view illustrating a modification of the image display apparatus in the display apparatus according to Embodiment 1.
Figure 8:
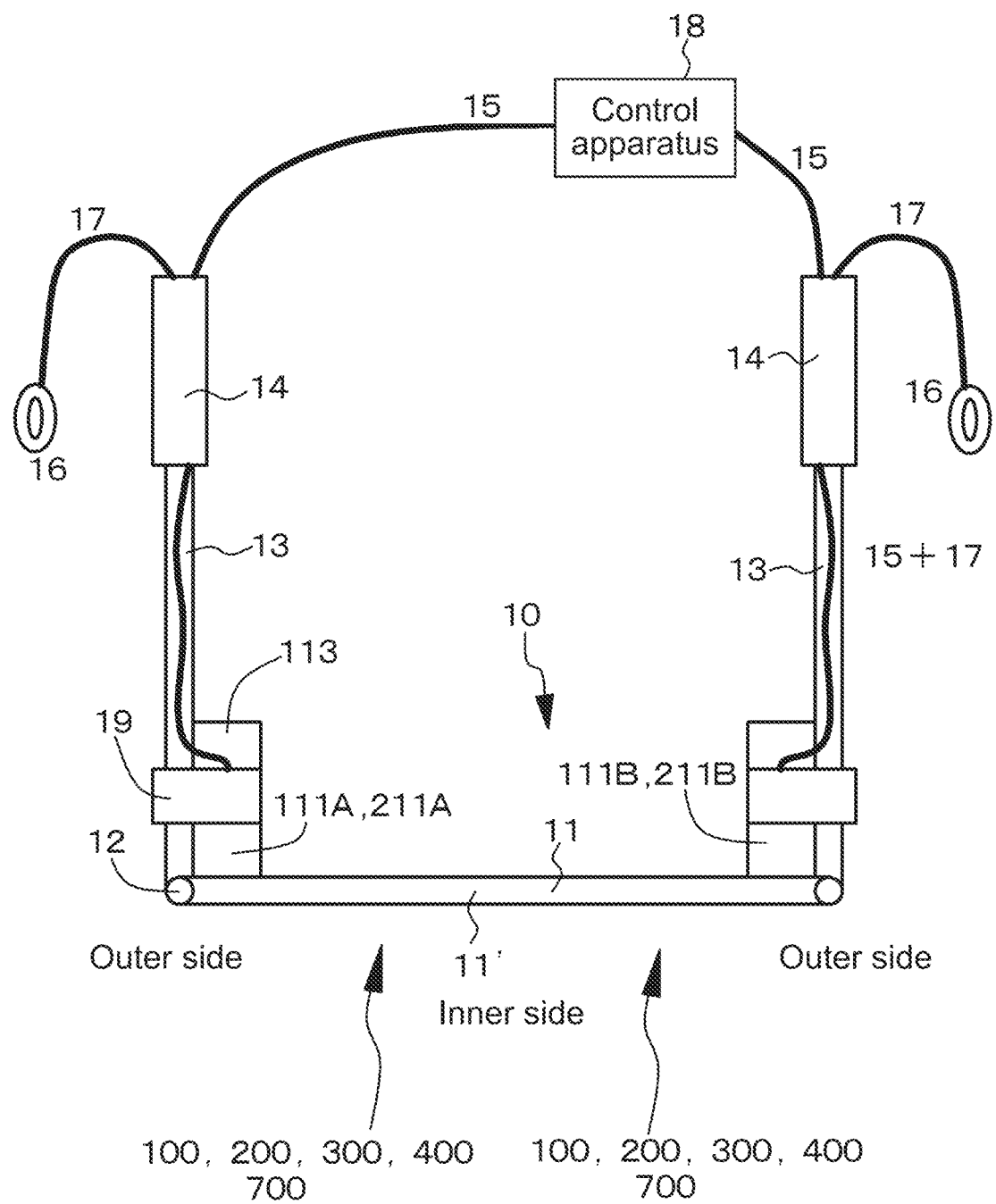
FIG. 8 is a schematic view of the display apparatus according to Embodiment 1 as viewed from above.

Embodiment 1 relates to the display apparatus according to the present disclosure (specifically, to head mounted display (HMD)). More specifically, Embodiment 1 relates to a display apparatus according to a first embodiment, which includes the optical apparatus having the first structure (more specifically, optical apparatus having the structure 1-A), and the image forming apparatus having the first configuration. FIG. 1A is a schematic front view of the optical apparatus and a dimming apparatus (each for right eye) in the display apparatus according to Embodiment 1. FIG. 1B is a schematic cross-sectional view taken along arrows B-B in FIG. 1A. FIG. 4A is a schematic cross-sectional view of the dimming apparatus as taken along the arrows B-B in FIG. 1A. FIG. 4B is a schematic side view of the display apparatus (mainly for right eye) as the display apparatus is viewed from a left-eye side. Further, FIG. 5A is a schematic front view of the dimming apparatus before its operation in the display apparatus according to Embodiment 1, and FIG. 5B is a schematic front view of the dimming apparatus during its operation. Still further, FIG. 6 and FIG. 7 are each a conceptual view of an image display apparatus in the display apparatus according to Embodiment 1, and FIG. 8 is a schematic view of the display apparatus according to Embodiment 1 as viewed from above. Note that, in the schematic view of FIG. 5B, regions corresponding to higher light-blocking rates in the dimming apparatus are more finely hatched. Note that, actually, the light blocking rate does not vary in a stepwise manner as schematically illustrated in FIG. 5B, but varies gradually. In other words, the dimming apparatus is brought into a state in which color gradation is displayed. Note that, depending on the arrangement patterns or the shapes of the electrodes or the connecting portions, there may be employed a configuration in which the light blocking rate varies in the stepwise manner. In other words, the dimming apparatus may be held in a state in which colors vary in the stepwise manner.

The display apparatus according to Embodiment 1, or display apparatuses according to Embodiment 2 to Embodiment 9 described below each include (A) a frame 10 to be mounted to the head of the observer, (B) image display apparatuses 100, 200, 300, 400, or 500 attached to the frame 10, and (C) dimming apparatuses 700 that adjust light intensities of external light beams that enter from an outside. Note that, although the display apparatuses according to these Embodiments are each of a binocular type including the two image-display apparatuses, the display apparatuses may each be of a monocular type including one image-display apparatus. In addition, the image forming apparatus 111 and an image forming apparatus 211 display monochromatic images.

Then, the image display apparatuses 100, 200, 300, 400, and 500 of Embodiment 1, or of Embodiment 2 to Embodiment 9 described below each include (a) the image forming apparatus 111 or 211, and (b) the optical apparatus 120 or 320 or an optical apparatus 520 having the virtual-image forming region in which virtual images are formed on the basis of light beams emitted from the image forming apparatus 111 or 211. Further, the image display apparatuses 100, 200, 300, and 400 of Embodiment 1, of Embodiment 2 to Embodiment 4 described below, or of Embodiment 6 to Embodiment 9 described below each include (c) the optical system (parallel-light-emitting optical system) 112 or an optical system (parallel-light-emitting optical system) 254 that converts the light beams emitted from the image forming apparatus 111 or 211 to parallel light beams. Light fluxes converted to the parallel light beams by the optical system 112 or 254 are input to, guided by, and emitted from the optical apparatus 120 or 320.

The optical apparatuses 120 and 320 of Embodiment 1, of Embodiment 2 to Embodiment 4 described below, or of Embodiment 6 to Embodiment 9 described below each have the first structure, that is, respectively include (b-1) the light guide plates 121 and 321 in which the light beams input from the image forming apparatus 111 or 211 are propagated by the total reflection therein, and then emitted toward the observer, (b-2) the first deflecting means 130 and 330 that deflect the light beams input to the light guide plates 121 and 321 such that the light beams input to the light guide plates 121 and 321 are totally reflected in the light guide plates 121 and 321, and (b-3) the second deflecting means 140 and 340 that deflect the light beams propagated by the total reflection in the light guide plates 121 and 321 such that the light beams propagated by the total reflection in the light guide plates 121 and 321 are emitted from the light guide plates 121 and 321. In addition, the virtual-image forming region in each of the optical apparatuses is formed by corresponding one of the second deflecting means 140 and 340. Further, the second deflecting means (virtual-image forming regions) 140 and 340 are each located within a projection image in corresponding one of the dimming apparatuses 700. In addition, the second deflecting means 140 and 340 are each covered with one of substrates constituting corresponding one of the dimming apparatuses 700. The optical apparatuses 120 and 320 are of the see-through type (transflective type).

In this context, in Embodiment 1, the first deflecting means 130 and the second deflecting means 140 are arranged in the light guide plate 121. Further, the first deflecting means 130 reflects the light beams input to the light guide plate 121, and the second deflecting means 140 transmits and reflects, a plurality of times, the light beams propagated by the total reflection in the light guide plate 121. In other words, the first deflecting means 130 functions as a reflective mirror, and the second deflecting means 140 functions as the transflective mirror. More specifically, the first deflecting means 130 provided in the light guide plate 121 is made of aluminum (Al), and is constituted by the light reflecting film (type of mirror) that reflects the light beams input to the light guide plate 121. Meanwhile, the second deflecting means 140 provided in the light guide plate 121 is constituted by the multi-layer laminated structure in which a large number of dielectric lamination films are laminated. The dielectric lamination films include a $TiO_2$ film as a high dielectric material, and a $SiO_2$ film as a low dielectric material. The multi-layer laminated structure in which the large number of dielectric lamination films are laminated is disclosed in Japanese Translation of PCT International Application No. 2005-521099. The number of the dielectric lamination films is not limited to six illustrated in the drawings. Thin pieces made of the same material as that of the light guide plate 121 are interposed between the dielectric lamination films. Note that, in the first deflecting means 130, in order that the parallel light beams input to the light guide plate 121 are totally reflected in the light guide plate 121, the parallel light beams input to the light guide plate 121 are reflected (or diffracted). Meanwhile, in the second deflecting means 140, the parallel light beams propagated by the total reflection in the light guide plate 121 are reflected (or diffracted) the plurality of times, and are emitted in a state of the parallel light beams from the light guide plate 121 toward the pupil 21 of the observer.

The first deflecting means 130 is formed merely by cutting out a part 124 of the light guide plate 121, at which the first deflecting means 130 is to be provided, such that an inclined surface on which the first deflecting means 130 is to be formed is provided; depositing the light reflecting film in vacuum on this inclined surface; and then bonding the cut-out part 124 of the light guide plate 121 to the first deflecting means 130. Further, the second deflecting means 140 is formed merely by preparing the multi-layer laminated structure in which a large number of pieces of the same material as that of the light guide plate 121 (such as glass), and the large number of dielectric lamination films (that can be formed, for example, by the vacuum deposition method) are laminated; cutting out a part 125 of the light guide plate 121, at which the second deflecting means 140 is to be provided, such that an inclined surface is formed; bonding the multi-layer laminated structure to this inclined surface; and smoothening a profile, for example, by polishing. In this way, the optical apparatus 120 including the light guide plate 121 in which the first deflecting means 130 and the second deflecting means 140 are provided is obtained.

In this context, in Embodiment 1, in Embodiment 2 to Embodiment 4 described below, or in Embodiment 6 to Embodiment 9 described below, the light guide plates 121 and 321 made of an optical glass or a plastic material each have two parallel surfaces (a first surface 122 and the first surface 322, and a second surface 123 and the second surface 323) that extend parallel to a direction of the light propagation (X-axis) by the total reflection in the light guide plates 121 and 321. The first surfaces 122 and 322 and the second surfaces 123 and 323 face each other. In addition, after the parallel light beams are input from a part of each of the first surfaces 122 and 322, which corresponds to the light incident surface, and then are propagated by the total reflection therein, the parallel light beams are emitted from another part of the first surfaces 122 and 322, which corresponds to the light emitting surface. Note that, alternatively, the light incident surfaces may be constituted by the second surfaces 123 and 323, and the light emitting surfaces may be constituted by the first surfaces 122 and 322.

In Embodiment 1 or Embodiment 3 described below, the image forming apparatus 111 is the image forming apparatus having the first configuration, which includes the plurality of pixels arrayed in two-dimensional matrix. Specifically, as illustrated in FIG. 6, the image forming apparatus 111 includes a reflective spatial-light modulator 150 and a light source 153 including a light-emitting diode that emits white light beams. An entirety of the image forming apparatus 111 is contained in a casing 113 (in FIG. 6, indicated by one-dot chain line). An opening portion (not shown) is provided through this casing 113, and the light beams from the optical system (parallel-light-emitting optical system or collimating optical system) 112 are emitted through this opening portion. The reflective spatial-light modulator 150 includes a liquid-crystal-display (LCD) apparatus 151 constituted by the LCOS as the light valve, and a polarizing beam splitter 152 that reflects and guides ones of the light beams from the light source 153 to the liquid-crystal-display apparatus 151, and that allows other ones of the light beams, which are reflected by the liquid-crystal-display apparatus 151, to pass therethrough, thereby guiding the other ones to the optical system 112. The liquid-crystal-display apparatus 151 includes the plurality of (for example, 640×480) pixels (liquid-crystal cells) arrayed in two-dimensional matrix. The polarizing beam splitter 152 has a known configuration and a known structure. Unpolarized ones of the light beams emitted from the light source 153 impinge on the polarizing beam splitter 152. P-polarized light components pass through the polarizing beam splitter 152, and are emitted to an outside of the system. Meanwhile, S-polarized light components are reflected by the polarizing beam splitter 152, enter the liquid-crystal-display apparatus 151, are reflected in the liquid-crystal-display apparatus 151, and then emitted from the liquid-crystal-display apparatus 151. In this context, among the light beams emitted from the liquid-crystal-display apparatus 151, light beams emitted from pixels that display "white" contain a large number of the P-polarized light components, and light beams emitted from pixels that display "black" contain a large number of the S-polarized light components. Thus, among the light beams that are emitted from the liquid-crystal-display apparatus 151 and impinge on the polarizing beam splitter 152, the P-polarized light components pass through the polarizing beam splitter 152, thereby being guided to the optical system 112. Meanwhile, the S-polarized light components are reflected by the polarizing beam splitter 152, thereby being returned to the light source 153. The optical system 112 is constituted, for example, by a convex lens. In order that the parallel light beams are generated, the image forming apparatus 111 (more specifically, liquid-crystal-display apparatus 151) is arranged at a point (position) at a focal length of the optical system 112.

Alternatively, as illustrated in FIG. 7, an image forming apparatus 111' is constituted by an organic EL display apparatus 150'. Images emitted from the organic EL display apparatus 150' are converted to the parallel light beams by passing through the convex lens 112, and then advance toward the light guide plate 121. The organic EL display apparatus 150' includes the plurality of (for example, 640×480) pixels (organic EL elements) arrayed in two-dimensional matrix.

The frame 10 includes a front portion 11 that is arranged in front of the observer, two temple portions 13 attached in a freely pivotal manner to both ends of the front portion 11 via hinges 12, and modern portions (referred also to as tip cells, ear pieces, or ear pads) 14 attached respectively to distal end portions of the temple portions 13. In addition, nose pads (not shown) are attached. In other words, an assembly of the frame 10 and the nose pads basically has substantially the same structure as those of the typical glasses. Further, the casing 113 is attached in a freely detachable manner to each of the temple portions 13 via an attachment member 19. The frame 10 is made of a metal or plastic. Note that, the casing 113 may be fixed to each of the temple portions 13 via the attachment member 19 so as to be undetachable. In addition, although the casing 113 in the illustration is attached to an inner side of each of the temple portions 13, the casing 113 may be attached to an outer side of each of the temple portions 13.

Further, a wire (such as signal line or power line) 15, which extends from an image forming apparatus 111A on one side, passes through the temple portion 13 and the modern portion 14, extends from a distal end portion of the modern portion 14 to the outside, and is connected to a control apparatus 18 (control circuit or control means). In addition, the image forming apparatus 111A and an image forming apparatus 111B each include a headphone unit 16, and a headphone-unit wire 17, which extends from each of the image forming apparatuses 111A and 111B, passes through the temple portion 13 and the modern portion 14, and extends from the distal end portion of the modern portion 14 to the headphone unit 16. More specifically, the headphone-unit wire 17 extends from the distal end portion of the modern portion 14 to the headphone unit 16 in a manner of wrapping around a rear of an auricle (concha). With such a configuration, it is possible to provide a neat display apparatus free from an impression that the headphone units 16 and the headphone-unit wires 17 are untidy.

In this context, in the display apparatus according to Embodiment 1, or in those according to Embodiment 2 to Embodiment 9 described below, the dimming apparatuses 700 are arranged at the front portion 11. In addition, the optical apparatuses 120 and 320 are attached to corresponding ones of the dimming apparatuses 700. The front portion 11 includes a rim 11', and the dimming apparatuses 700 are fitted in the rim 11'. Projection images from a first electrode 716A and a second electrode 716B described below are contained in a projection image in the rim 11'. Although the optical apparatuses 120 or 320 and the dimming apparatuses 700 are arranged in this order from the observer's side, these apparatuses may be arranged in another order of the dimming apparatuses 700 and the optical apparatuses 120 or 320 from the same.

Figure 2A:
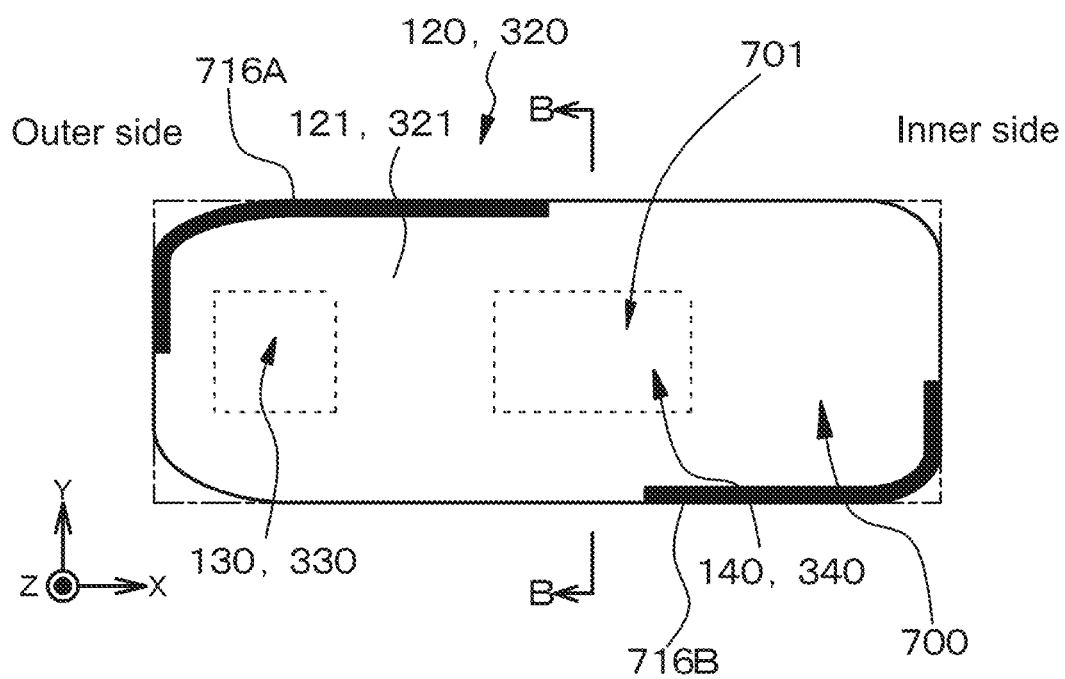
FIG. 2A is a schematic front view of an optical apparatus and a dimming apparatus in a modification of the display apparatus according to Embodiment 1.
Figure 2B:
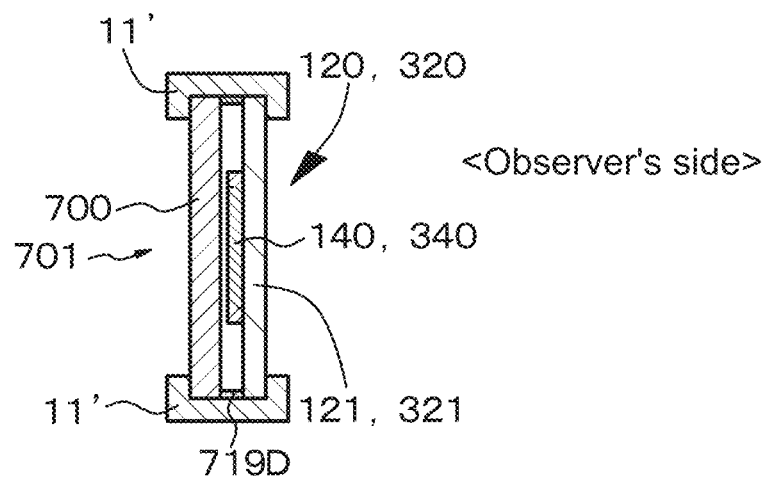
FIG. 2B is a schematic cross-sectional view of the optical apparatus and the dimming apparatus, which is taken along lines B-B in FIG. 2A.

In Embodiment 1, or in Embodiment 2 to Embodiment 9 described below, the optical apparatuses 120, 320, and 520 each overlap with at least a part of the dimming apparatus 700 being a type of an optical shutter. Specifically, in the examples illustrated in FIG. 1A and FIG. 1B, the optical apparatuses 120, 320, and 520 each overlap with at least the part of the dimming apparatus 700. Note that, alternatively, the optical apparatuses 120, 320, and 520 may each be overlaid on the dimming apparatus 700. In other words, the optical apparatuses 120, 320, and 520 (more specifically, light guide plates 121 and 321 constituting the optical apparatuses) and light guide members 602, 612, and 622 may each be formed into the same outer shape as an outer shape of the dimming apparatus 700. FIG. 2A is a schematic front view of the optical apparatus and the dimming apparatus in such a form (that is, in a modification of the display apparatus according to Embodiment 1), and FIG. 2B is a schematic cross-sectional view of the optical apparatus and the dimming apparatus, which is taken along lines B-B in FIG. 2A. In this modification, a clearance is provided between the dimming apparatus 700 and each of the light guide plates 121 and 321, and the dimming apparatus 700 and each of the light guide plates 121 and 321 are bonded along their outer peripheral portions by an adhesive 719D. The same applies to Embodiments described hereinbelow. In addition, with this, an outer periphery of each of the light guide plates 121 and 321 is covered with the rim 11' described below such that the outer periphery of each of the light guide plates 121 and 321 is not visually recognized.

Herein, an observer's nose side is referred to as an inner side, an observer's ear side is referred to as an outer side, a region in the dimming apparatus 700, which faces the virtual-image forming region (each of the second deflecting means 140 and 340) of the optical apparatus is referred to as a virtual-image-forming-region facing region 701. In addition, in Embodiment 1, the light blocking rate of the dimming apparatus decreases from an upper region and an outer-side region of the virtual-image-forming-region facing region 701 toward a central portion of the virtual-image-forming-region facing region 701.

In the display apparatus according to Embodiment 1, or in those according to Embodiment 2 to Embodiment 9 described below, the dimming apparatus 700 includes a first substrate 711A, a second substrate 711B that faces the first substrate 711A, a first transparent electrode 712A provided to face a facing surface of the first substrate 711A, the facing surface of the first substrate 711A facing the second substrate 711B, a second transparent electrode 712B provided to face a facing surface of the second substrate 711B, the facing surface of the second substrate 711B facing the first substrate 711A, and a dimming layer sandwiched between the first transparent electrode 712A and the second transparent electrode 712B. In Embodiment 1, the dimming apparatus 700 further includes the first electrode 716A formed on a part of the first transparent electrode 712A. In addition, the first electrode 716A is connected, via a connector (not shown), directly to a control circuit (dimming-apparatus control circuit) for controlling the light blocking rate of the dimming apparatus 700. Further, the dimming apparatus 700 further includes the second electrode 716B formed on a part of the second transparent electrode 712B, and a second connecting portion (not shown) that is connected to the second electrode 716B and that is provided to keep parts other than this connecting portion out of contact with the second electrode 716B. The second connecting portion is connected to the dimming-apparatus control circuit via a connector (not shown). When necessary, a first connecting portion connected to the first electrode 716A may be provided, and the first connecting portion may be connected to the dimming-apparatus control circuit. Alternatively, when necessary, the second electrode 716B may be connected directly to the dimming-apparatus control circuit, or the second connecting portion may be provided to be held in contact with a part of the second transparent electrode 712B, and the second connecting portion may be connected to the dimming-apparatus control circuit.

The dimming apparatus 700 is constituted by the optical shutter that utilizes color variation of a substance to be generated by the oxidation-reduction reaction of the electrochromic material. Specifically, the dimming layer contains the electrochromic material. More specifically, the dimming layer has a laminated structure including, from the first transparent electrode side, a $WO_3$ layer 713/a $Ta_2O_5$ layer 714/an $Ir_xSn_{1-x}O$ layer 715. The $WO_3$ layer 713 emits colors through the reduction. Further, the $Ta_2O_5$ layer 714 constitutes a solid electrolyte, and the $Ir_xSn_{1-x}O$ layer 715 emits colors through the oxidation. Between the first substrate 711A and an assembly of the first transparent electrode 712A and the first electrode 716A, a protective layer 719A constituted by an SiN layer, an $SiO_2$ layer, an $Al_2O_3$ layer, and a $TiO_2$ layer, or by lamination films of these layers is formed. When the protective layer 719A is formed, ion blocking properties of inhibiting ion immigration, water-proofing properties, moisture-proofing properties, and scratch resistance can be imparted to the dimming apparatus. A foundation layer 719B is formed between the first substrate 711A and the second transparent electrode 712B. Further, the first substrate 711A and the second substrate 711B are sealed along their outer-rim portions with a sealing member 719C made of an ultraviolet-curable epoxy resin, an ultraviolet-curable resin such as an epoxy resin that is cured by ultraviolet rays, or a thermosetting resin that is cured by heat. The first substrate 711A and the second substrate 711B are each made of a PEN (polyethylene naphthalate) resin, a PES (polyether sulfone) resin, a COP (cycloolefin polymer), a colorless-transparent polyimide resin, a TAC film, or a highly transparent self-adhesive acrylic film, but materials are not limited thereto. The first transparent electrode 712A and the second transparent electrode 712B each made of ITO are what is called solid electrodes that are not patterned. Further, the first electrode 716A and the second electrode 716B each patterned into a thin line shape are made of metal materials such as nickel, copper, titanium, and an Al/Ni laminated structure. The dimming apparatus 700 itself can be produced by known methods.

In the $Ir_xSn_{1-x}O$ layer 715, Ir and $H_2O$ react with each other, and exist as iridium hydroxide $Ir(OH)_n$. When a negative potential is applied to the first electrode 716A, and a positive potential is applied to the second electrode 716B, protons $H^+$ move from the $Ir_xSn_{1-x}O$ layer 715 to the $Ta_2O_5$ layer 714, and electrons are emitted therefrom to the second transparent electrode 712B. With this, the following oxidative reaction progresses to color the $Ir_xSn_{1-x}O$ layer 715.

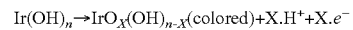

$Ir(OH)_n \rightarrow IrO_X(OH)_{n-X}(\text{colored}) + X.H^+ + X.e^-$

Meanwhile, the protons $H^+$ move into the $WO_3$ layer 713, and electrons are injected from the first transparent electrode 712A into the $WO_3$ layer 713. In the $WO_3$ layer 713, the following reductive reaction progresses to color the $WO_3$ layer 713.

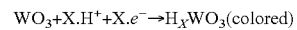

$WO_3 + X.H^+ + X.e^- \rightarrow H_XWO_3(\text{colored})$

In contrast, when the positive potential is applied to the first electrode 716A, and the negative potential is applied to the second electrode 716B, in the $Ir_xSn_{1-x}O$ layer 715, the reductive reaction progresses in a direction opposite to the above-described reaction direction, and the $Ir_xSn_{1-x}O$ layer 715 is decolorized. In the $WO_3$ layer 713, the oxidative reaction progresses in a direction opposite to the above-described oxidative reaction, and the $WO_3$ layer 713 is decolorized. Note that, $H_2O$ is contained in the $Ta_2O_5$ layer 714. When voltages are applied to the first electrode 716A and the second electrode 716B, $H_2O$ is dissociated into the protons LI+ and OH− ions. This state contributes to the coloration reaction and the decoloration reaction.

Alternatively, the display apparatus according to Embodiment 1 is a display apparatus including (A) the frame 10 to be mounted to the head of the observer, (B) the image display apparatuses 100, 200, 300, 400, or 500 attached to the frame 10, and (C) the dimming apparatuses 700 that adjust the light intensities of the external light beams that enter from the outside. In addition, the image display apparatuses 100, 200, 300, 400, and 500 each include (a) the image forming apparatus 111 or 211, and (b) the optical apparatus 120, 320, or 520 having the virtual-image forming region in which virtual images are formed on the basis of the light beams emitted from the image forming apparatus 111 or 121. Further, the dimming apparatuses 700 each include the first substrate 711A, the second substrate 711B that faces the first substrate 711A, the first transparent electrode 712A provided to face the facing surface of the first substrate 711A, the facing surface of the first substrate 711A facing the second substrate 711B, the second transparent electrode 712B provided to face the facing surface of the second substrate 711B, the facing surface of the second substrate 711B facing the first substrate 711A, the first electrode 716A formed in contact with the part of the first transparent electrode 712A, the second electrode 716B formed in contact with the part of the second transparent electrode 712B, and the dimming layer sandwiched between the first transparent electrode 712A and the second transparent electrode 712B. In this context, the optical apparatuses 120, 320, and 520 each overlap with at least the part of corresponding one of the dimming apparatuses 700. The projection image from the first electrode 716A onto the first substrate 711A, and the projection image from the second electrode 716B onto the first substrate 711A do not overlap with each other. In addition, between the projection image from the first electrode 716A onto the first substrate 711A and the projection image from the second electrode 716B onto the first substrate 711A, a projection image from the virtual-image forming region (each of the second deflecting means 140 and 340) onto the first substrate 711A is located. Further, various configurations and structures described in Embodiment 1 are applicable to the configurations and the structures of the first electrode 716A and the second electrode 716B.

In the display apparatus according to Embodiment 1, or in those according to Embodiment 2 to Embodiment 9 described below, planar shapes of the virtual-image forming regions 140 and 340 in the optical apparatuses, and a planar shape of the virtual-image-forming-region facing region 701 in each of the dimming apparatuses 700 are each a rectangle. Further, the outer shape of each of the dimming apparatuses 700 is a quadrangle formed of four side segments, and vertices of the quadrangle are rounded. Note that, the planar shapes of the virtual-image forming regions 140 and 340 in the optical apparatuses, and the outer shape of each of the dimming apparatuses are not limited thereto. For the sake of convenience, one of the sides of the quadrangle forming the outer shape of each of the dimming apparatuses 700, which faces an upper side of the virtual-image-forming-region facing region 701, is referred to as an upper side of corresponding one of the dimming apparatuses. For the sake of convenience, another one of the sides of the quadrangle forming the outer shape of each of the dimming apparatuses 700, which faces a lower side of the virtual-image-forming-region facing region 701, is referred to as a lower side of corresponding one of the dimming apparatuses. For the sake of convenience, still another one of the sides of the quadrangle forming the outer shape of each of the dimming apparatuses 700, which faces an inner-side lateral side of the virtual-image-forming-region facing region 701, is referred to as an inner-side lateral side of corresponding one of the dimming apparatuses. For the sake of convenience, yet another one of the sides of the quadrangle forming the outer shape of each of the dimming apparatuses 700, which faces an outer-side lateral side of the virtual-image-forming-region facing region 701, is referred to as an outer-side lateral side of corresponding one of the dimming apparatuses. Note that, the upper side and the lower side of the virtual-image-forming-region facing region 701 extend in the horizontal direction (X-axis direction), and the inner-side lateral side and the outer-side lateral side of the virtual-image-forming-region facing region 701 extend in the perpendicular direction (Y-axis direction).

In the display apparatus according to Embodiment 1, in operating the dimming apparatus, a voltage relatively higher than that to be applied to the first electrode 716A is applied to the second electrode 716B. Further, the light blocking rate of the dimming apparatus decreases from the upper region and the outer-side region of the virtual-image-forming-region facing region 701 toward the central portion of the virtual-image-forming-region facing region 701. Specifically, the light blocking rate decreases in a direction from, for example, the first corner portion (B) of the dimming apparatus 700 substantially toward, for example, the third corner portion (B) of the dimming apparatus 700. As illustrated in the schematic view of FIG. 3 in which the dimming apparatus 700, the light guide plate 121 or 321, and other components are viewed from front. the first electrode 716A is arranged along the upper side (B) of the dimming apparatus 700, and extends from the first corner portion (B) of the dimming apparatus 700 toward the inner side along the upper side (B) of the dimming apparatus 700. As examples of the position $K_{12\text{-}UP}$ of an inner-side-direction end portion of the first electrode 716A at this part, the positions corresponding to 10% to 100% of the value of $k_{11\text{-}UP}$ may be mentioned. In addition, the first electrode 716A extends downward from the first corner portion (B) along the outer-side lateral side (B). Specifically, as examples of the position $K_{12\text{-}OUT}$ of a downward-direction end portion of the first electrode 716A at this part, the positions corresponding to 10% to 70% of the value of $k_{11\text{-}OUT}$ may be mentioned. The connector (not shown) is connected to a part on the outer-side lateral side (B) of the first electrode 716A.

Meanwhile, with respect to the first electrode 716A, it is appropriate to provide the second electrode 716B at a position where a potential gradient that causes the light blocking rate of the dimming apparatus 700 to decrease from the upper region and the outer-side region of the virtual-image-forming-region facing region 701 toward the central portion of the virtual-image-forming-region facing region 701 is obtained. Specifically, as illustrated in FIG. 1A, it is appropriate to provide the second electrode 716B, for example, from the third corner portion (B) to the lower side (B) and to the inner-side lateral side (B).

The display apparatus according to Embodiment 1 includes the dimming apparatus, which enables the virtual images that the observer observes to exhibit high contrast. Further, the observer who uses the display apparatus is enabled to reliably recognize an external environment through the virtual-image-forming-region facing region. In addition, the light blocking rate of the dimming apparatus decreases from the first predetermined region (such as upper region and outer-side region) of the virtual-image-forming-region facing region toward the second predetermined region (such as central portion) of the virtual-image-forming-region facing region. In this context, when it is preferred to increase an angle of the virtual-image-forming-region facing region 701 such that the virtual images are formed in the outer-side region of the virtual-image-forming-region facing region 701 (that is, vicinity of the outer-side lateral side (A)), or the lower region of the same (that is, vicinity of the lower side (A)), the virtual images formed in these regions are enabled to exhibit high contrast. In addition, the observer who uses the display apparatuses according to the first embodiment to the fourth embodiment is enabled to reliably recognize his/her feet and a central side of his/her body by sight. With this, the observer is enabled to safely act in a real environment.

Incidentally, when a voltage is applied between the first electrode and the second electrode, a potential difference is generated between the first transparent electrode and the second transparent electrode. In this context, due to the potential gradient that is generated between the transparent electrodes, the potential difference that is generated between the first transparent electrode and the second transparent electrode decreases as a distance from the first electrode increases. In addition, only a small amount of leakage current is generated between the first transparent electrode and the second transparent electrode. The phenomenon that the leakage current is generated is conspicuous when the dimming layer contains the electrochromic material. Thus, these results demonstrate that, merely by optimizing the position and the part where the first electrode is provided, and the position and the part where the second electrode is provided, specifically, by arranging the first electrode and the second electrode such that, for example, the projection image from the first electrode onto the first substrate and the projection image from the second electrode onto the first substrate do not overlap with each other, the light blocking rate of the dimming apparatus varies in the manner of decreasing from the upper region and the outer-side region of the virtual-image-forming-region facing region toward the central portion of the virtual-image-forming-region facing region. In other words, the results demonstrate that, even with significantly simple configurations and structures, the light blocking rate of the dimming apparatus can be reliably varied from the upper region and the outer-side region of the virtual-image-forming-region facing region toward the central portion of the virtual-image-forming-region facing region. In still other words, the dimming apparatus enters a state of exhibiting color gradation.

Now, another modification of the display apparatus according to Embodiment 1 is described.

Figure 9:
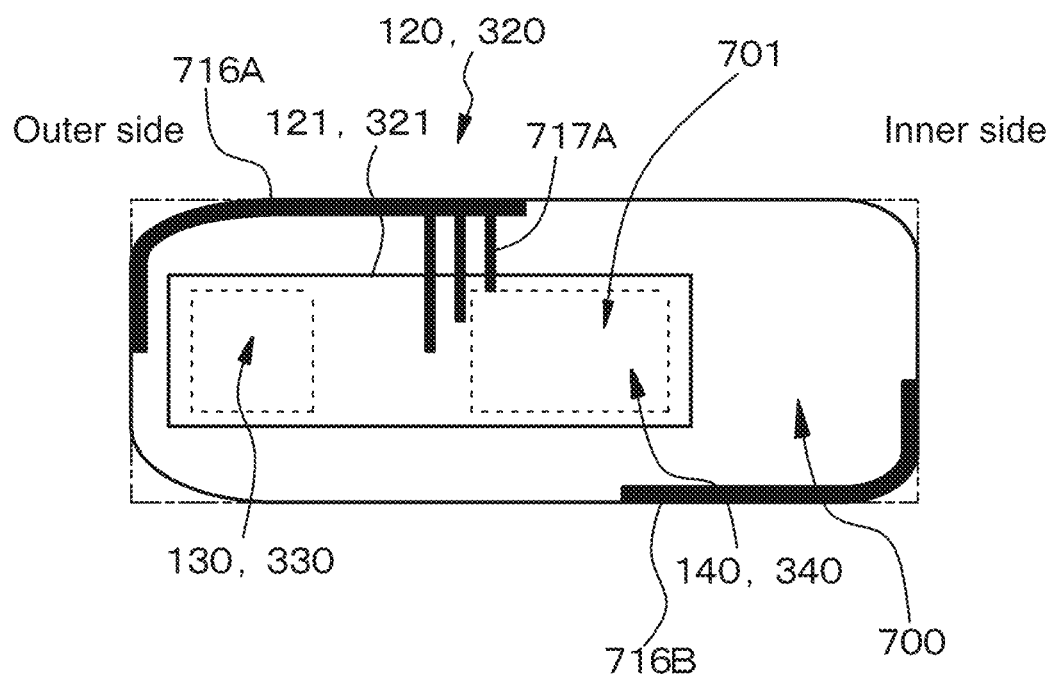
FIG. 9 is a schematic front view of an optical apparatus and a dimming apparatus in another modification of the display apparatus according to Embodiment 1.

As illustrated in the schematic front view of FIG. 9, in the optical apparatus and the display apparatus, one or a plurality of first-electrode branch electrodes 717A may be provided from the first electrode 716A in the direction toward the lower side (B).

As described above, with respect to the first electrode 716A, it is appropriate to provide the second connecting portion or the second electrode 716B at the position where the potential gradient that causes the light blocking rate of the dimming apparatus 700 to decrease from the upper region and the outer-side region of the virtual-image-forming-region facing region 701 toward the central portion of the virtual-image-forming-region facing region 701 is obtained. Specifically, as illustrated in FIG. 1A, it is appropriate to provide the second electrode 716B, for example, from the third corner portion (B) to the lower side (B) and to the inner-side lateral side (B).

Figure 10A:
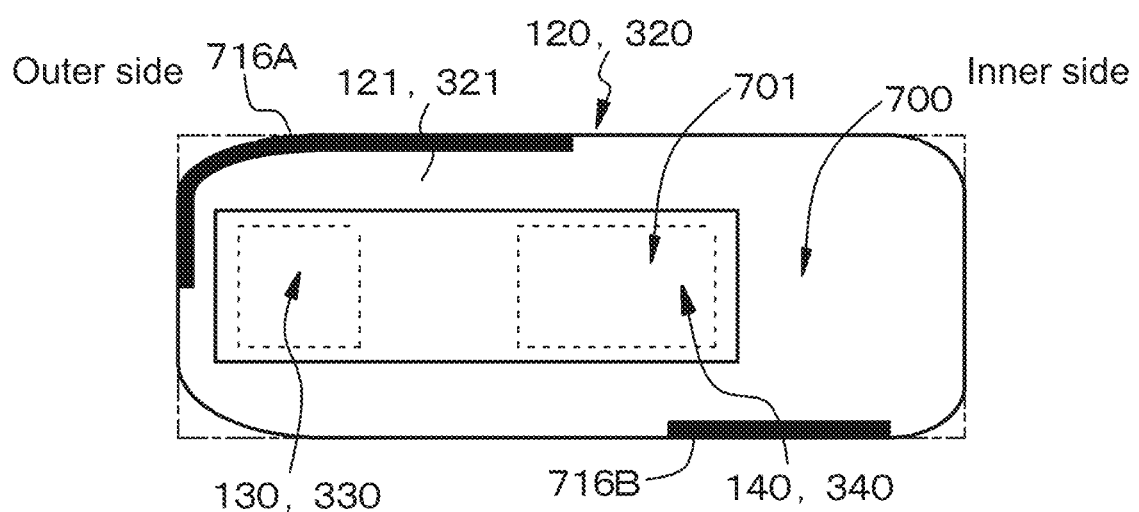
FIG. 10A and FIG. 10B are schematic front views of the optical apparatus and the dimming apparatus in still another modification of the display apparatus according to Embodiment 1 (specifically, a display apparatus according to a first embodiment).
Figure 10B:
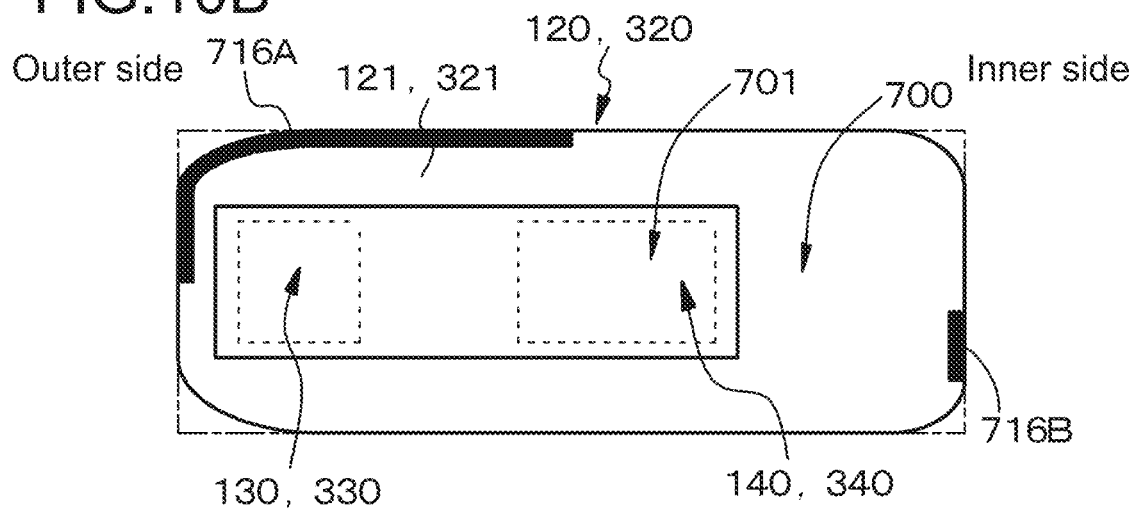
Figure 11A:
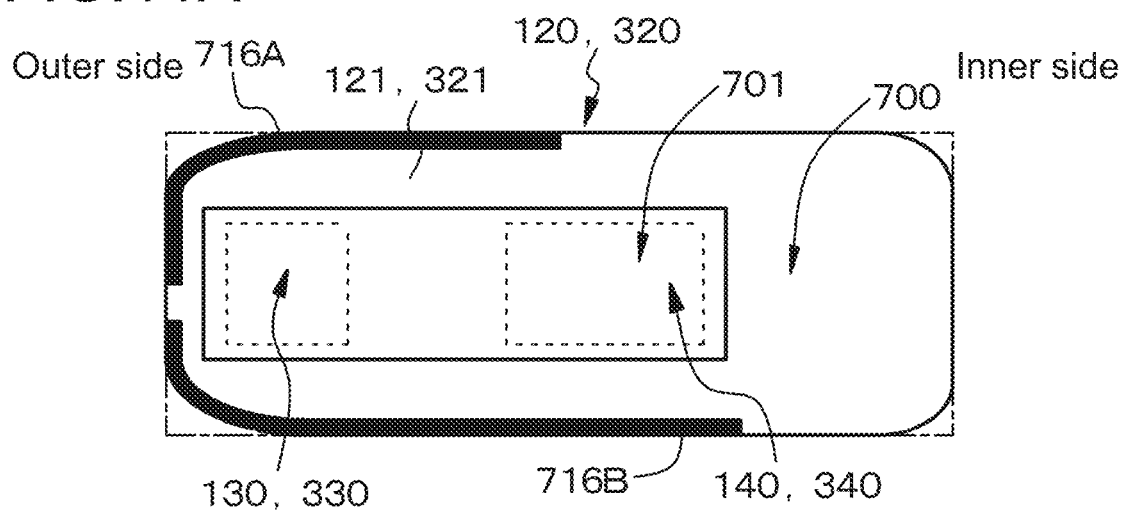
FIG. 11A, FIG. 11B, and FIG. 11C are schematic front views of the optical apparatus and the dimming apparatus in yet another modification of the display apparatus according to Embodiment 1 (specifically, display apparatus according to the first embodiment).
Figure 11B:
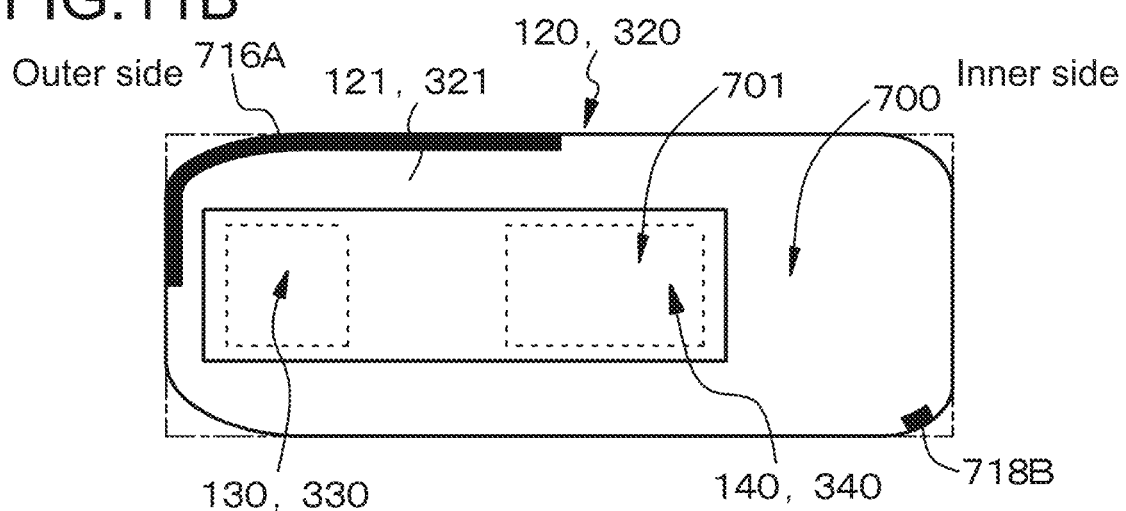
Figure 11C:
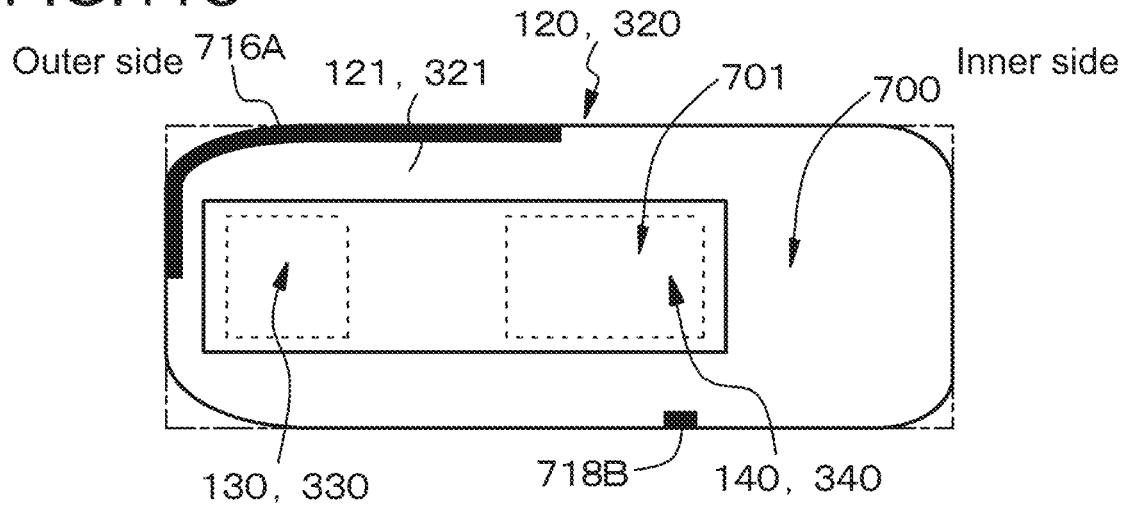

Alternatively, as illustrated in FIG. 10A and FIG. 10B, the second electrode 716B may be provided on the lower side (B) on the third corner portion (B) side, or on the inner-side lateral side (B) on the third corner portion (B) side. As illustrated in FIG. 11A, the second electrode 716B may be provided from the second corner portion (B) to the lower side (B) and to the outer-side lateral side (B). As illustrated in FIG. 11B and FIG. 11C, a second connecting portion 718B may be provided at the third corner portion (B) or on the lower side (B). Note that, in FIG. 11B and FIG. 11C, only a part corresponding to the second connecting portion 718B in contact with the second electrode 716B is illustrated.

Figure 12A:
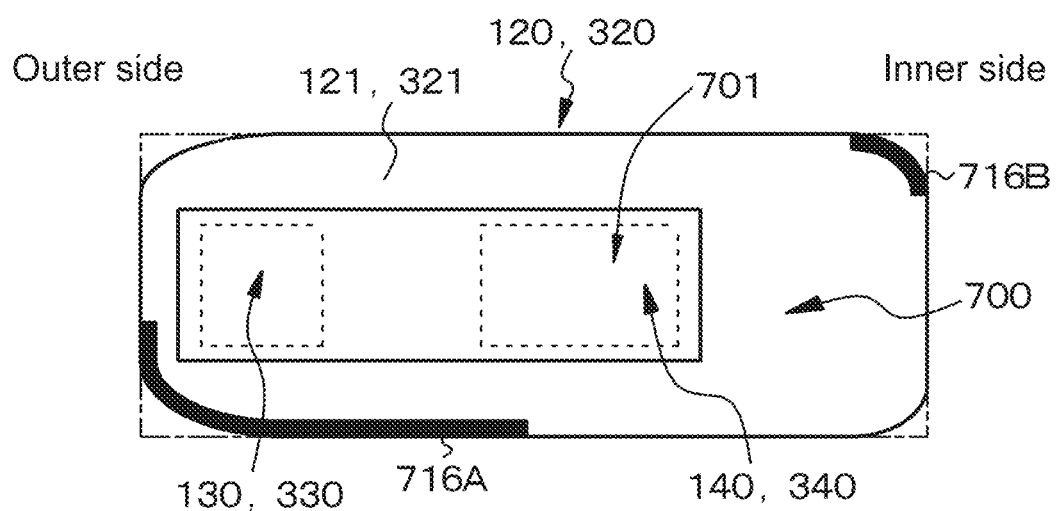
FIG. 12 and FIG. 12B are schematic front views of the optical apparatus and the dimming apparatus in yet another modification of the display apparatus according to Embodiment 1 (specifically, a display apparatus according to a second embodiment).

Alternatively, there may be employed a structure in which the light blocking rate of the dimming apparatus 700 decreases from the lower region and the outer-side region of the virtual-image-forming-region facing region 701 toward the central portion of the virtual-image-forming-region facing region 701. In this case, the light blocking rate decreases in a direction from the second corner portion (B) of the dimming apparatus 700 substantially toward, for example, the fourth corner portion (B) of the dimming apparatus 700. As illustrated in FIG. 12A, the first electrode 716A is arranged along the lower side (B) of the dimming apparatus 700, and extends from the second corner portion (B) of the dimming apparatus 700 toward the inner side along the lower side (B) of the dimming apparatus 700. Specifically, as examples of the position $K_{12-DN}$ of an inner-side-direction end portion of the first electrode 716A at this part, the positions corresponding to 10% to 100% of the value of $k_{11-DN}$ may be mentioned. In addition, the first electrode 716A extends upward from the second corner portion (B) along the outer-side lateral side (B). Specifically, as examples of the position $K_{12-OUT}$ of an upward-direction end portion of the first electrode 716A at this part, the positions corresponding to 30% to 90% of the value of $k_{11-OUT}$ may be mentioned. The connector (not shown) is connected to the part on the outer-side lateral side (B) of the first electrode 716A. The one or the plurality of first-electrode branch electrodes 717A may be provided from the first electrode 716A in the direction toward the upper side (B).

Figure 12B:
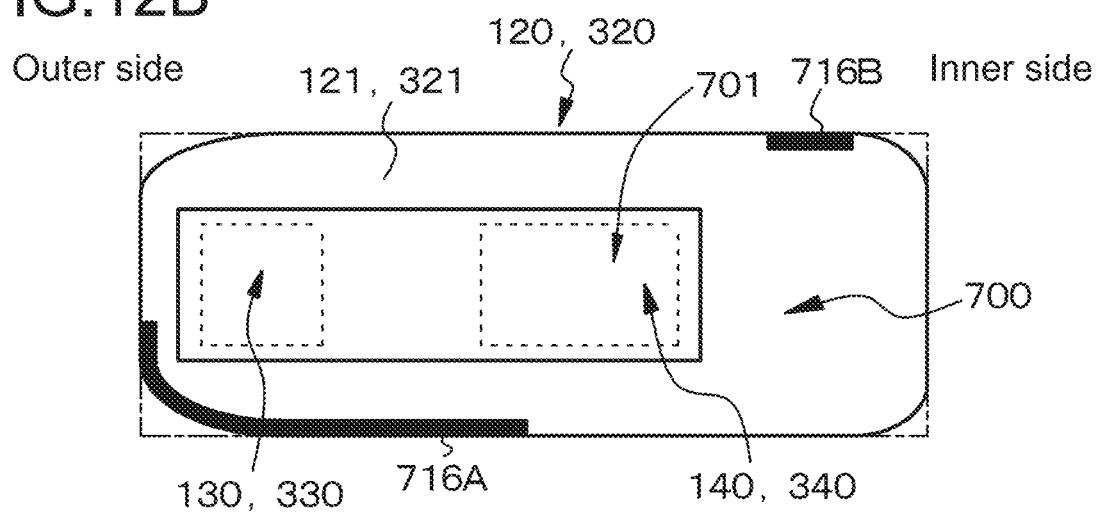
Figure 13A:
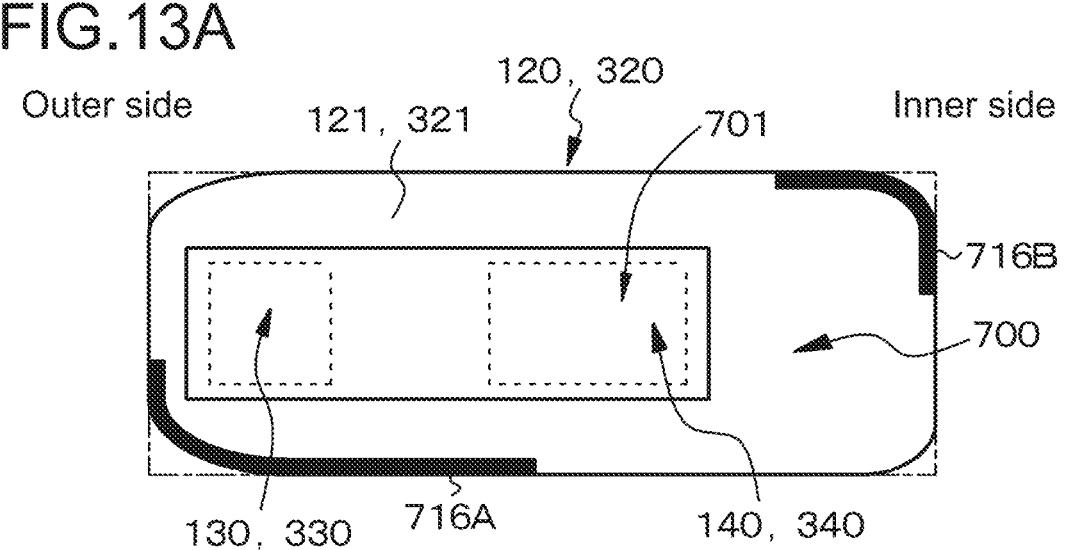
FIG. 13A, FIG. 13B, and FIG. 13C are schematic front views of the optical apparatus and the dimming apparatus in yet another modification of the display apparatus according to Embodiment 1 (specifically, display apparatus according to the second embodiment).
Figure 13B:
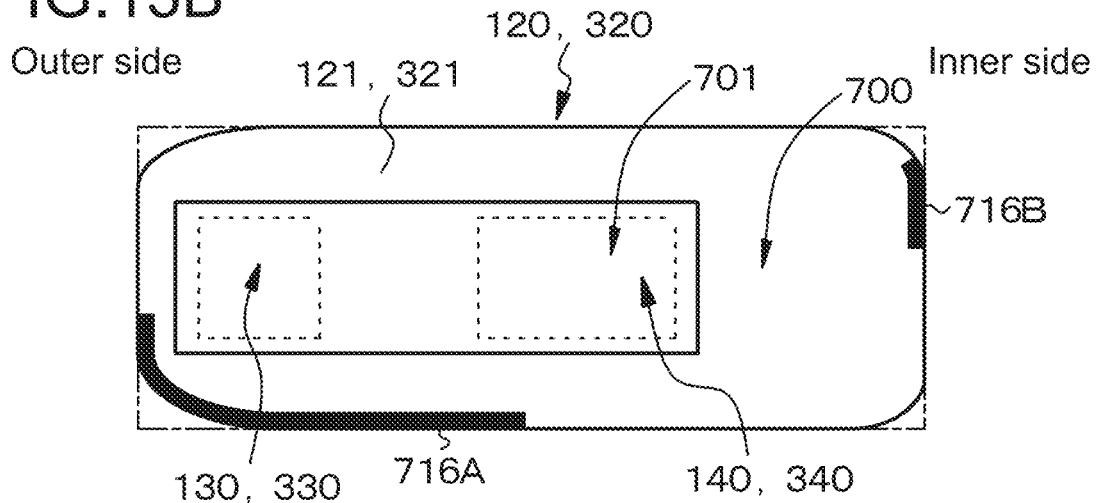
Figure 13C:
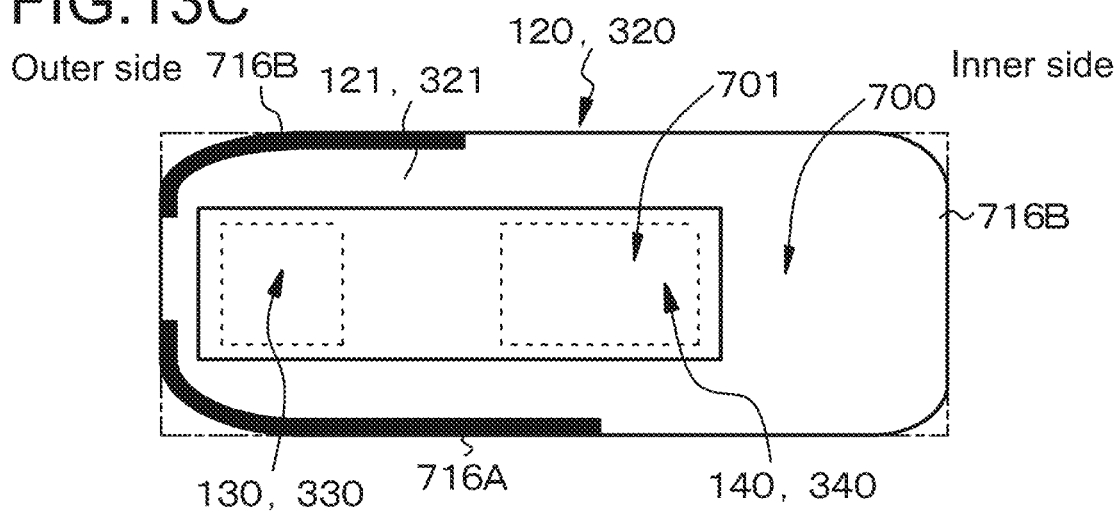

Further, with respect to the first electrode 716A, it is appropriate to provide the second connecting portion 718B or the second electrode 716B at a position where a potential gradient that causes the light blocking rate of the dimming apparatus 700 to decrease from the lower region and the outer-side region of the virtual-image-forming-region facing region 701 toward the central portion of the virtual-image-forming-region facing region 701 is obtained. Specifically, as illustrated in FIG. 12A and FIG. 12B, it is appropriate to provide the second connecting portion, for example, at the fourth corner portion (B) or on the upper side (B). Alternatively, as illustrated in FIG. 13A, the second electrode 716B may be provided from the fourth corner portion (B) to the upper side (B) and to the inner-side lateral side (B), or on the upper side (B) on the fourth corner portion (B) side. As illustrated in FIG. 13B, the second electrode 716B may be provided on the inner-side lateral side (B) on the fourth corner portion (B) side. As illustrated in FIG. 13C, it is appropriate to provide the second electrode 716B from the first corner portion (B) to the upper side (B) and to the outer-side lateral side (B).

Figure 14A:
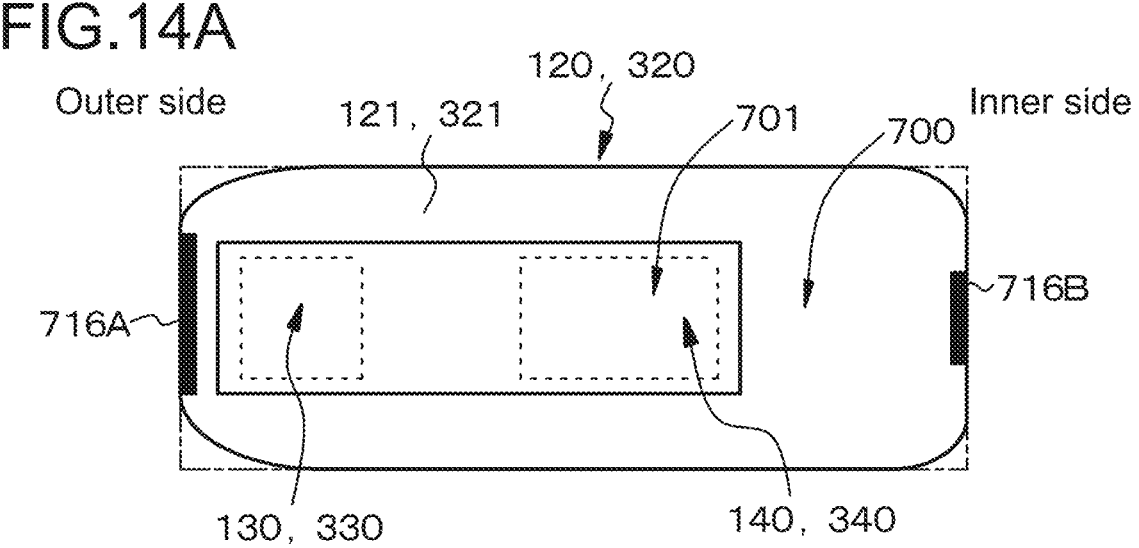
FIG. 14A, FIG. 14B, and FIG. 14C are schematic front views of the optical apparatus and the dimming apparatus in yet another modification of the display apparatus according to Embodiment 1 (specifically, display apparatus according to a third embodiment).

Alternatively, the light blocking rate of the dimming apparatus 700 may decrease from the outer-side region of the virtual-image-forming-region facing region 701 toward an inner-side region of the virtual-image-forming-region facing region 701. In this case, the light blocking rate of the dimming apparatus 700 decreases substantially along the horizontal direction. As illustrated in FIG. 14A, the first electrode 716A is arranged on the outer-side lateral side (B) of the dimming apparatus 700, and extends upward and downward from a central portion of the outer-side lateral side (B) of the dimming apparatus 700 along the outer-side lateral side (B) of the dimming apparatus 700. Specifically, as examples of the position $K_{12\text{-}OUT}$ of the upward-direction end portion of the first electrode 716A at this part, the positions corresponding to 0% to 30% of the value of $k_{11\text{-}OUT}$ may be mentioned. As examples of the position $K_{12\text{-}OUT}$ of the downward-direction end portion of the same, the positions corresponding to 70% to 100% of the value of $k_{11\text{-}OUT}$ may be mentioned. The upward-direction end portion of the first electrode 716A may be located on the upper side (B) of the dimming apparatus 700, and the downward-direction end portion of the first electrode 716A may be located on the lower side (B) of the dimming apparatus 700.

Further, with respect to the first electrode 716A, it is appropriate to provide the second connecting portion or the second electrode 716B at a position where a potential gradient that causes the light blocking rate of the dimming apparatus 700 to decrease from the outer-side region of the virtual-image-forming-region facing region 701 toward the inner-side region of the virtual-image-forming-region facing region 701 is obtained. Specifically, it is appropriate to provide the second connecting portion, for example, at a central portion of the inner-side lateral side (B). Alternatively, as illustrated in FIG. 14A, it is appropriate to provide the second electrode 716B over the inner-side lateral side (B), or to provide the second electrode 716B from the inner-side lateral side (B) to the upper side (B) and from the inner-side lateral side (B) to the lower side (B).

Figure 14B:
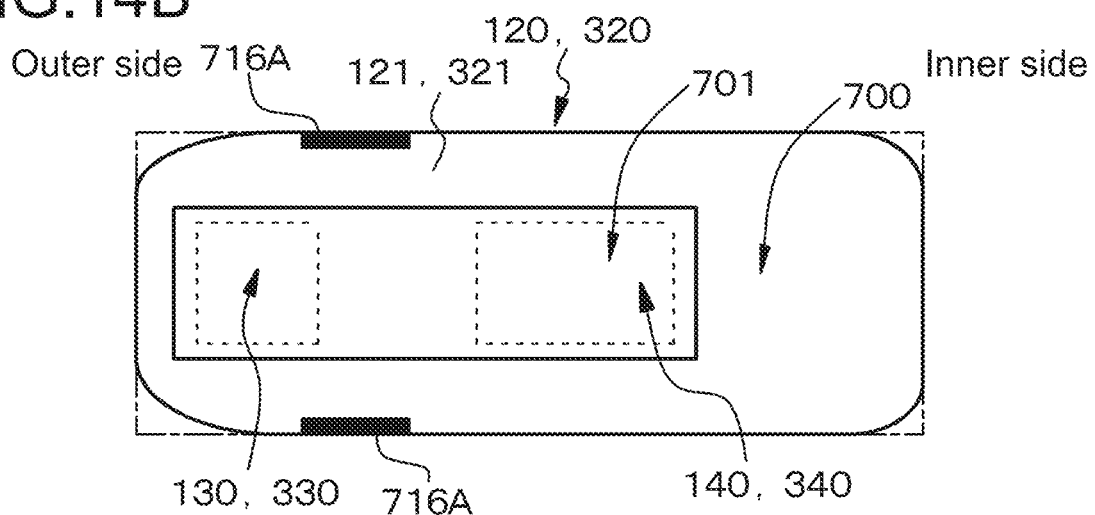
Figure 14C:
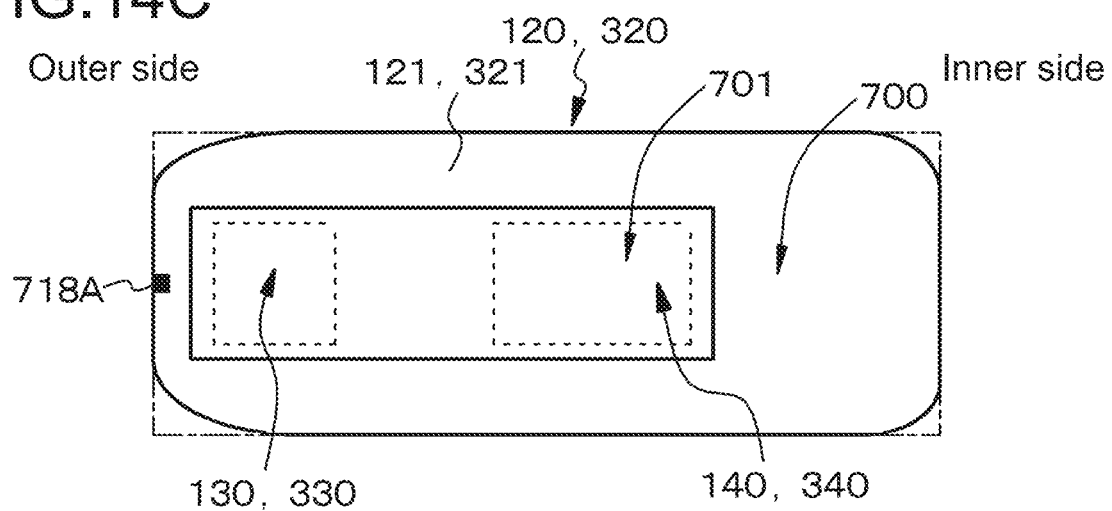

Alternatively, as illustrated in FIG. 14B, it is appropriate to arrange the first electrode 716A on the upper side (B) on the first corner portion (B) side of the dimming apparatus, and on the lower side (B) on the first corner portion (B) side of the dimming apparatus. When necessary, it is appropriate to arrange the second electrode on the upper side (B) on the first corner portion (B) side of the dimming apparatus, and on the lower side (B) on the first corner portion (B) side of the dimming apparatus. Still alternatively, as illustrated in FIG. 14C, there may be employed a configuration in which a first connecting portion 718A is connected to the part on the outer-side lateral side (B) of the first transparent electrode, and the second connecting portion (overlapping with the first connecting portion, and hence not illustrated in FIG. 14C) is connected to the part on the outer-side lateral side (B) of the second transparent electrode.

Yet alternatively, the light blocking rate of the dimming apparatus 700 may decrease from the lower region of the virtual-image-forming-region facing region 701 toward the upper region of the virtual-image-forming-region facing region 701. In this case, the light blocking rate of the dimming apparatus 700 decreases substantially along the perpendicular direction. As illustrated in FIG. 15A, the first electrode 716A is arranged along the outer-side lateral side (B) of the dimming apparatus 700. Specifically, as examples of the position $K_{12\text{-}DN}$ of an inner-side-direction end portion of the first electrode 716A at this part, the positions corresponding to 100% to 120% of the value of $k_{11\text{-}DN}$ may be mentioned. The first connecting portion is connected to the first electrode 716A. The one or the plurality of first-electrode branch electrodes may be provided from the first electrode 716A in the direction toward the upper side (B). In addition, with respect to the first electrode 716A, it is appropriate to provide the second connecting portion or the second electrode 716B at a position where a potential gradient that causes the light blocking rate of the dimming apparatus 700 to decrease from the lower region of the virtual-image-forming-region facing region 701 toward the upper region of the virtual-image-forming-region facing region 701 is obtained. Specifically, it is appropriate to provide the second connecting portion, for example, on the upper side (B). Alternatively, as illustrated in FIG. 15A, it is appropriate to provide the second electrode 716B on the upper side (B).

Yet alternatively, the light blocking rate of the dimming apparatus 700 may decrease from outer-edge regions of the virtual-image-forming-region facing region 701 toward the central portion of the virtual-image-forming-region facing region 701. In this case, as illustrated in FIG. 15B, it is appropriate to provide the first electrode 716A over the upper side (B), the outer-side lateral side (B), the lower side (B), and the inner-side lateral side (B) of the dimming apparatus 700, that is, over an outer peripheral portion of the dimming apparatus 700. In this case, the first electrode 716A to be provided may be continuous, or the first electrode 716A to be provided may be discontinuous. In the latter case, it is appropriate to connect segments of the first electrode 716A to each other with the first connecting portions. In addition, with respect to the first electrode 716A, it is appropriate to provide the second connecting portion or the second electrode 716B at a position where a potential gradient that causes the light blocking rate of the dimming apparatus 700 to decrease from the outer-edge regions of the virtual-image-forming-region facing region 701 toward the central portion of the virtual-image-forming-region facing region 701 is obtained. Specifically, it is appropriate to provide, for example, a plurality of second connecting portions to the peripheral portion of the dimming apparatus 700. When necessary, it is appropriate to provide the first electrode 716A over the outer-side lateral side (B), the upper side (B), and the inner-side lateral side (B), that is, over a part of the outer peripheral portion of the dimming apparatus 700.

Yet alternatively, when necessary, (vi) there may be employed a configuration in which the light blocking rate of the dimming apparatus 700 decreases from the upper region of the virtual-image-forming-region facing region 701 toward the lower region of the virtual-image-forming-region facing region 701. In this case, the light blocking rate of the dimming apparatus 700 decreases substantially along the perpendicular direction. As illustrated in FIG. 15C, the first electrode 716A is arranged along the upper side (B) of the dimming apparatus 700. Specifically, as examples of the position $K_{12\text{-}UP}$ of the inner-side-direction end portion of the first electrode 716A at this part, the positions corresponding to 100% to 120% of the value of $k_{11\text{-}UP}$ may be mentioned. The first connecting portion is connected to the first electrode 716A. The one or the plurality of first-electrode branch electrodes may be provided from the first electrode 716A in the direction toward the lower side (B). In addition, with respect to the first electrode 716A, it is appropriate to provide the second connecting portion or the second electrode 716B at a position where a potential gradient that causes the light blocking rate of the dimming apparatus 700 to decrease from the upper region of the virtual-image-forming-region facing region 701 toward the lower region of the virtual-image-forming-region facing region 701 is obtained. Specifically, it is appropriate to provide the second connecting portion, for example, on the lower side (B). Alternatively, as illustrated in FIG. 15C, it is appropriate to provide the second electrode 716B on the lower side (B).

Further, when necessary, there may be employed a configuration in which, when the virtual image is formed in a part of the virtual-image forming region on the basis of the light beams emitted from the image forming apparatus, the light blocking rate of the dimming apparatus 700 decreases from a region in the dimming apparatus 700, which faces the part of the virtual-image forming region, the virtual image being formed in this part, toward the central portion of the virtual-image-forming-region facing region 701.

Embodiment 2

Figure 16:
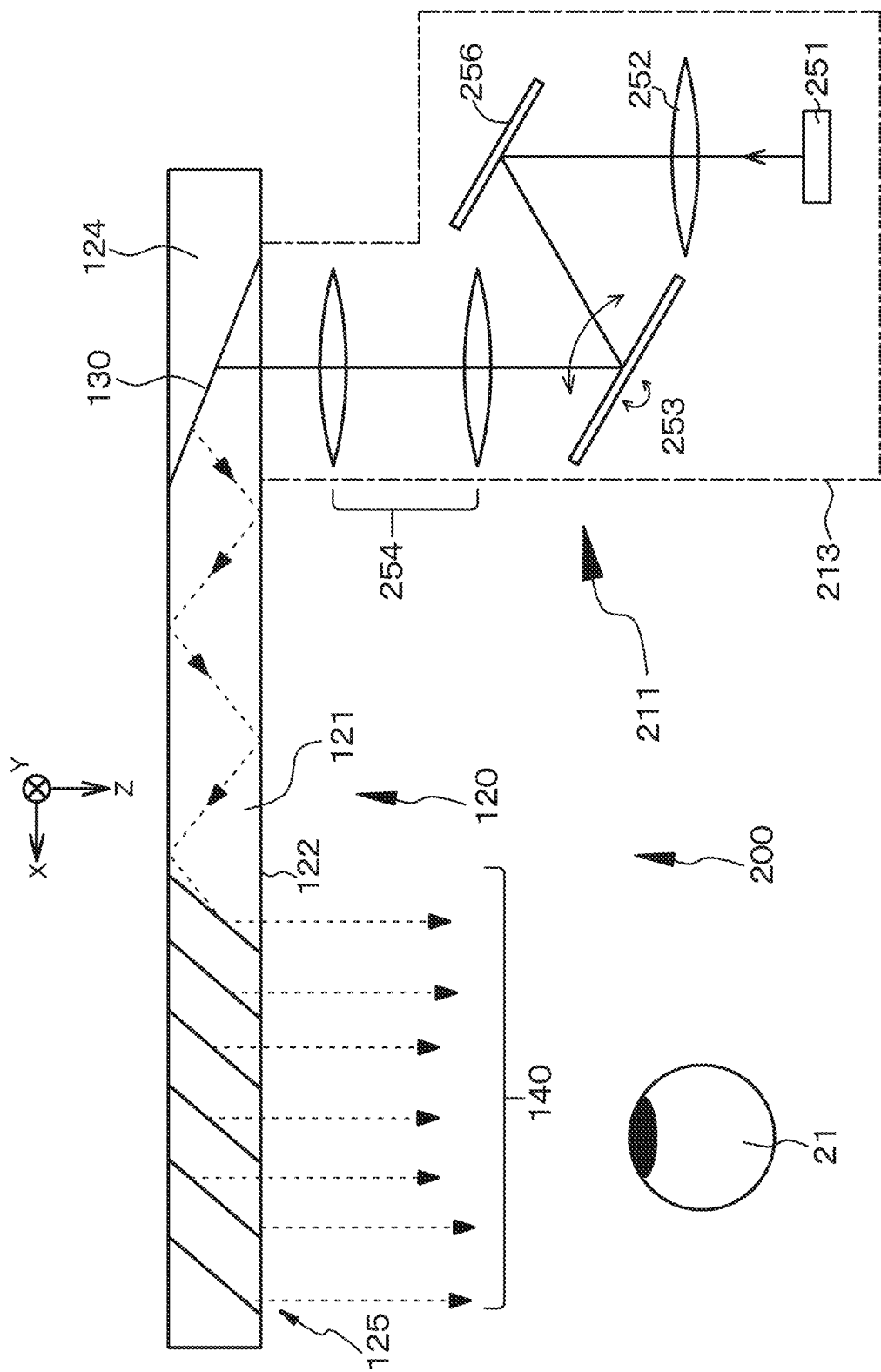
FIG. 16 is a conceptual view of an image display apparatus in a display apparatus according to Embodiment 2.

Embodiment 2, which is a modification of Embodiment 1, relates to the optical apparatus having the structure 1-A and the image forming apparatus having the second configuration. As illustrated in the conceptual view of FIG. 16, in the image display apparatus 200 in the display apparatus (head mounted display) according to Embodiment 2, in Embodiment 2, the image forming apparatus 211 is constituted by the image forming apparatus having the second configuration. Specifically, the image forming apparatus 211 includes a light source 251 and scanning means 253 that scans parallel light beams emitted from the light source 251. More specifically, the image forming apparatus 211 includes the light source 251, a collimating optical system 252 that converts light beams emitted from the light source 251 to the parallel light beams, the scanning means 253 that scans the parallel light beams emitted from the collimating optical system 252, and a relay optical system 254 that relays and emits the parallel light beams scanned by the scanning means 253. Note that, an entirety of the image forming apparatus 211 is contained in a casing 213 (in FIG. 16, indicated by one-dot chain line). An opening portion (not shown) is provided through this casing 213, and the light beams from the relay optical system 254 are emitted through this opening portion. In addition, the casing 213 is attached in a freely detachable manner to each of the temple portions 13 via the attachment member 19.

The light source 251 includes the light-emitting diode that emits white light beams. Further, the light beams emitted from the light source 251 enter the collimating optical system 252 having a positive optical power as a whole, and then are emitted as the parallel light beams. Then, these parallel light beams are reflected by a total reflection mirror 256, and then horizontally and vertically scanned by the scanning means 253 constituted by a MEMS capable of two-dimensionally scanning the input parallel light beams with use of a micromirror that is rotatable in two-dimensional directions. With this, the parallel light beams are converted to a type of a two-dimensional image, and virtual pixels are generated (the number of pixels may be set, for example, to the same as that in Embodiment 1). Next, light beams from the virtual pixels pass through the relay optical system (parallel-light-emitting optical system) 254 constituted by a known relay-optical system, and light fluxes converted to the parallel light beams enter the optical apparatus 120.

The optical apparatus 120, which receives, guides, and emits the light fluxes converted to the parallel light beams by the relay optical system 254, has the same configuration and the same structure as those of the optical apparatus described in Embodiment 1. Thus, detailed description thereof is omitted. In addition, as described above, except that the different image-forming apparatus 211 is provided, the display apparatus according to Embodiment 2 also has substantially the same configuration and the same structure as those of the display apparatus according to Embodiment 1. Thus, detailed description thereof is omitted.

Embodiment 3

Figure 17:
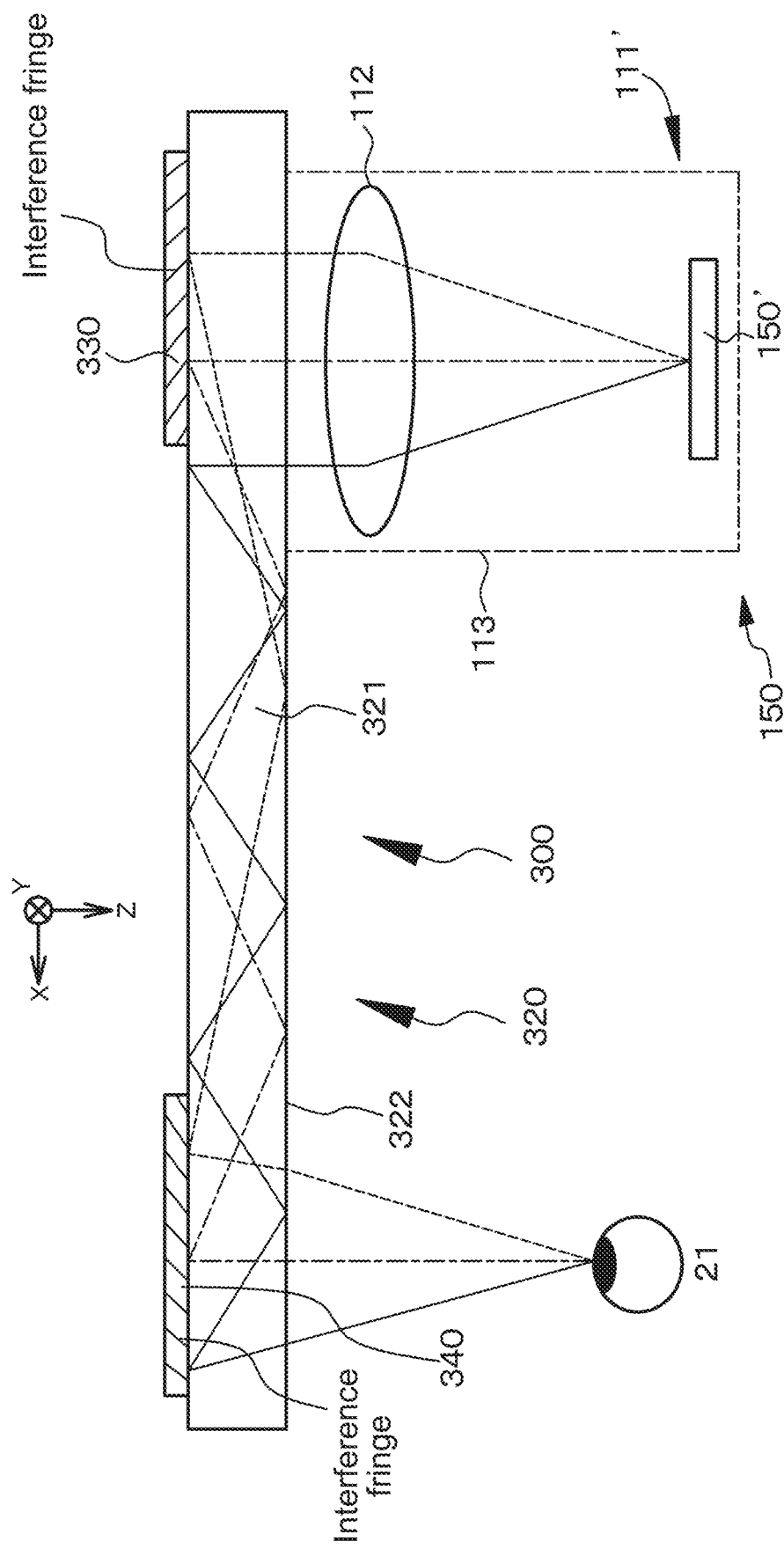
FIG. 17 is a conceptual view of an image display apparatus in a display apparatus according to Embodiment 3.

Embodiment 3, which is another modification of Embodiment 1, relates to the optical apparatus having the structure 1-B and the image forming apparatus having the first configuration. The image display apparatus 300 in the display apparatus (head mounted display) according to Embodiment 3 is illustrated in the conceptual view of FIG. 17. In addition, a part of a reflective volume-holographic diffraction grating is illustrated on an enlarged scale in the schematic cross-sectional view of FIG. 18. In Embodiment 3, as in Embodiment 1, the image forming apparatus 111' is constituted by the organic EL display apparatus 150'. Further, except that the first deflecting means and the second deflecting means have different configurations and structures, the optical apparatus 320 basically has the same configuration and the same structure as those of the optical apparatus 120 of Embodiment 1.

In Embodiment 3, the first deflecting means and the second deflecting means are arranged on a surface of the light guide plate 321 (specifically, on the second surface 323 of the light guide plate 321). Further, the first deflecting means diffracts the light beams input to the light guide plate 321, and the second deflecting means diffracts the light beams propagated by the total reflection in the light guide plate 321. In this context, the first deflecting means and the second deflecting means are each constituted by the diffraction grating element, specifically, by the reflective diffraction-grating element, more specifically, by the reflective volume-holographic diffraction grating. In the description hereinbelow, for the sake of convenience, the first deflecting means constituted by the reflective volume-holographic diffraction grating is referred to as a "first diffraction-grating member 330," and for the sake of convenience, the second deflecting means constituted by the reflective volume-holographic diffraction grating is referred to as a "second diffraction-grating member 340."

In addition, in Embodiment 3 or in Embodiment 4 described below, the first diffraction-grating member 330 and the second diffraction-grating member 340 are each formed by laminating one diffraction-grating layer. Note that, interference fringes corresponding to one type of a wavelength band (or wavelength) are formed in the diffraction grating layer, which is made of a photopolymer material and prepared by a related-art method. A pitch of the interference fringes formed in the diffraction grating layer (diffraction optical element) is constant. The interference fringes are formed in a straight pattern parallel to the Y-axis. Note that, axial lines of the first diffraction-grating member 330 and the second diffraction-grating member 340 are parallel to the X-axis, and their normal lines are parallel to a Z-axis.

Figure 18:
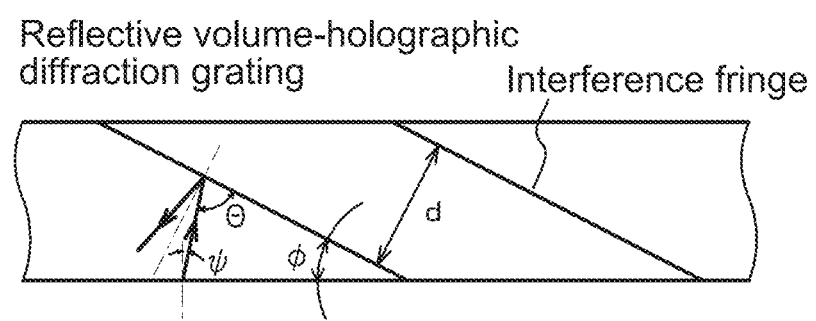
FIG. 18 is a schematic cross-sectional view illustrating, on an enlarged scale, a part of a reflective volume-holographic diffraction grating in the display apparatus according to Embodiment 3.

The reflective volume-holographic diffraction grating is illustrated on the enlarged scale in the schematic partial cross-sectional view of FIG. 18. The interference fringes formed in the reflective volume-holographic diffraction grating each have an inclination angle (slant angle) $\varphi$. Herein, the inclination angle $\varphi$ refers to an angle formed between surfaces of the reflective volume-holographic diffraction grating and each of the interference fringes. The interference fringes are formed from an inside of the reflective volume-holographic diffraction grating to the surfaces thereof. The interference fringes satisfy a Bragg's condition. Specifically, the Bragg's condition refers to a condition that satisfies Equation (A) below. In Equation (A), "m" is a positive integer, "λ" is a wavelength, "d" is a pitch of grating planes (an interval of virtual planes including the interference fringes in a direction of the normal line), and "Θ" is a complementary angle of an incident angle with respect to the interference fringe. In addition, at a time when light beams enter the diffraction grating member at an incident angle ψ, Θ, the inclination angle φ, and the incident angle ψ have a relationship as expressed by Equation (B).

$$m \cdot \lambda = 2 \cdot d \cdot \sin(\Theta) \tag{A}$$

$$\Theta = 90° - (\varphi + \psi) \tag{B}$$

As described above, the first diffraction-grating member 330 is arranged on (bonded to) the second surface 323 of the light guide plate 321. The first diffraction-grating member 330 diffracts (specifically, diffracts and reflects) the parallel light beams input to the light guide plate 321 through the first surface 322 such that these parallel light beams input to the light guide plate 321 are totally reflected in the light guide plate 321. In addition, as described above, the second diffraction-grating member 340 is arranged on (bonded to) the second surface 323 of the light guide plate 321. The second diffraction-grating member 340 diffracts (specifically, diffracts and reflects a plurality of times) these parallel light beams propagated by the total reflection in the light guide plate 321, and emits the parallel light beams as they are from the light guide plate 321 through the first surface 322.

Further, also from the light guide plate 321, the parallel light beams are emitted after being propagated by the total reflection therein. The light guide plate 321 is thin, and paths of the light beams that advance in the light guide plate 321 are long. Thus, at this time, how many times the light beams are totally reflected before reaching the second diffraction-grating member 340 is different from viewing angle to viewing angle. More specifically, among the parallel light beams that enter the light guide plate 321, the number of times parallel light beams that enter the light guide plate 321 at angles in a direction of approaching the second diffraction-grating member 340 are totally reflected is smaller than the number of times parallel light beams that enter the light guide plate 321 at angles in a direction away from the second diffraction-grating member 340 are reflected. This is because, among the parallel light beams that are diffracted by the first diffraction-grating member 330, the parallel light beams that enter the light guide plate 321 at the angles in the direction of approaching the second diffraction-grating member 340 are lower in angle with respect to a normal line of the light guide plate 321 at a time when the light beams that are propagated in the light guide plate 321 impinge on inner surfaces of the light guide plate 321 than the parallel light beams that enter the light guide plate 321 at the angles in the direction opposite thereto. Further, the pattern of the interference fringes formed in the second diffraction-grating member 340 and the pattern of the interference fringes formed in the first diffraction-grating member 330 have a symmetrical relationship with respect to a virtual plane perpendicular to an axial line of the light guide plate 321. There may be employed a structure in which surfaces of the first diffraction-grating member 330 and the second diffraction-grating member 340, which do not face the light guide plate 321, are covered with transparent resin plates or transparent resin films so as to prevent damage to the first diffraction-grating member 330 and the second diffraction-grating member 340. Further, a transparent protective film may be applied to the first surface 322 so as to protect the light guide plate 321.

The light guide plate 321 of Embodiment 4 described below basically has the same configuration and the same structure as the configuration and the structure of the light guide plate 321 described above.

As described above, except that the different optical apparatus 320 is provided, the display apparatus according to Embodiment 3 basically has substantially the same configuration and the same structure as those of the display apparatus according to Embodiment 1. Thus, detailed description thereof is omitted.

Embodiment 4

Figure 19:
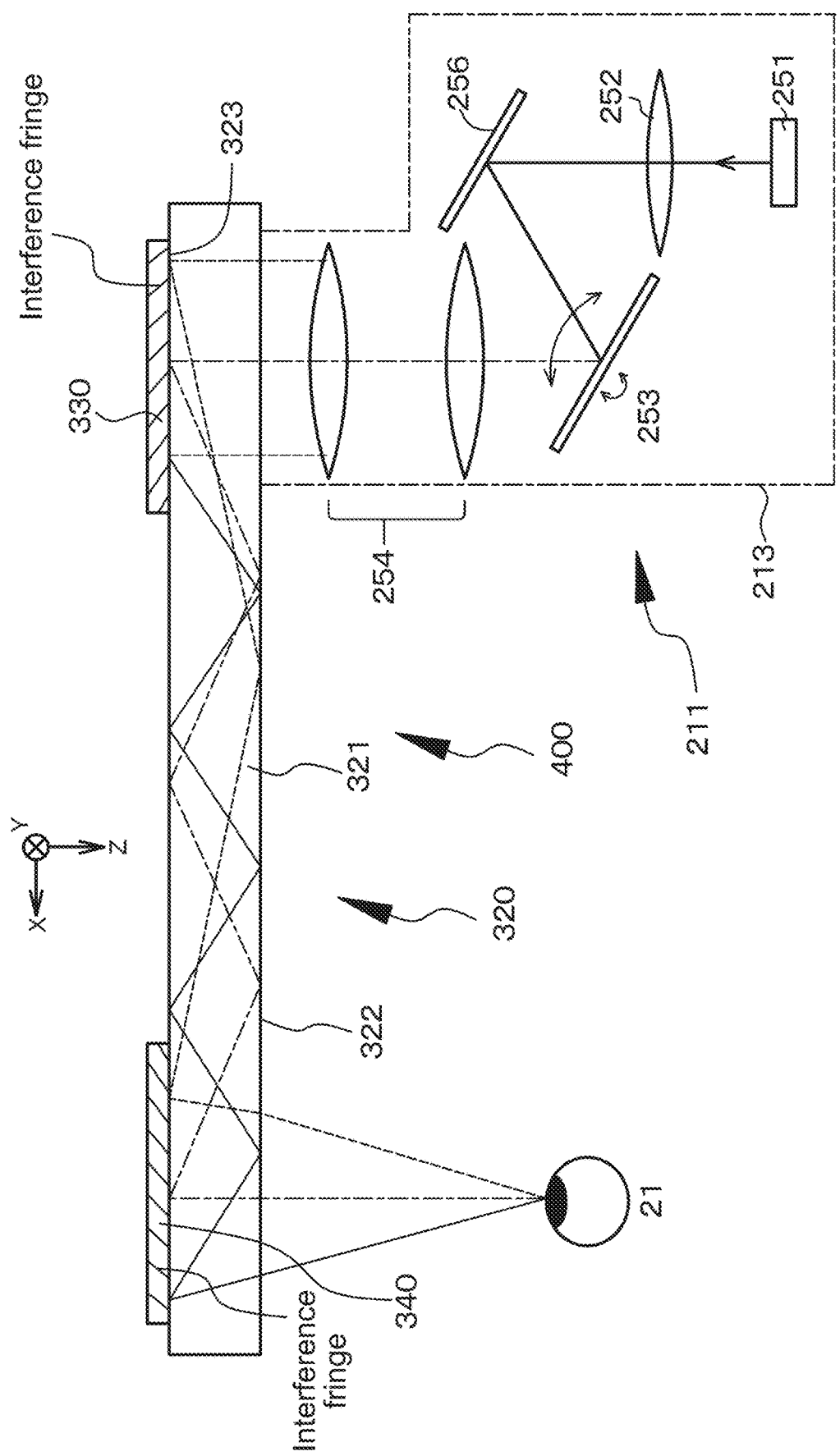
FIG. 19 is a conceptual view of an image display apparatus in a display apparatus according to Embodiment 4.

Embodiment 4, which is still another modification of Embodiment 1, relates to the optical apparatus having the structure 1-B and the image forming apparatus having the second configuration. The image display apparatus in the display apparatus (head mounted display) according to Embodiment 4 is illustrated in the conceptual view of FIG. 19. The light source 251, the collimating optical system 252, the scanning means 253, the parallel-light-emitting optical system (relay optical system 254), and the like in the image display apparatus 400 of Embodiment 4 each have the same configuration and the same structure as those in Embodiment 2 (as those in the image forming apparatus having the second configuration). Further, the optical apparatus 320 of Embodiment 4 has the same configuration and the same structure as those of the optical apparatus 320 of Embodiment 3. Except these differences, the display apparatus according to Embodiment 4 substantially has the same configuration and the same structure as those of the display apparatus according to Embodiment 1. Thus, detailed description thereof is omitted.

Embodiment 5

Figure 20:
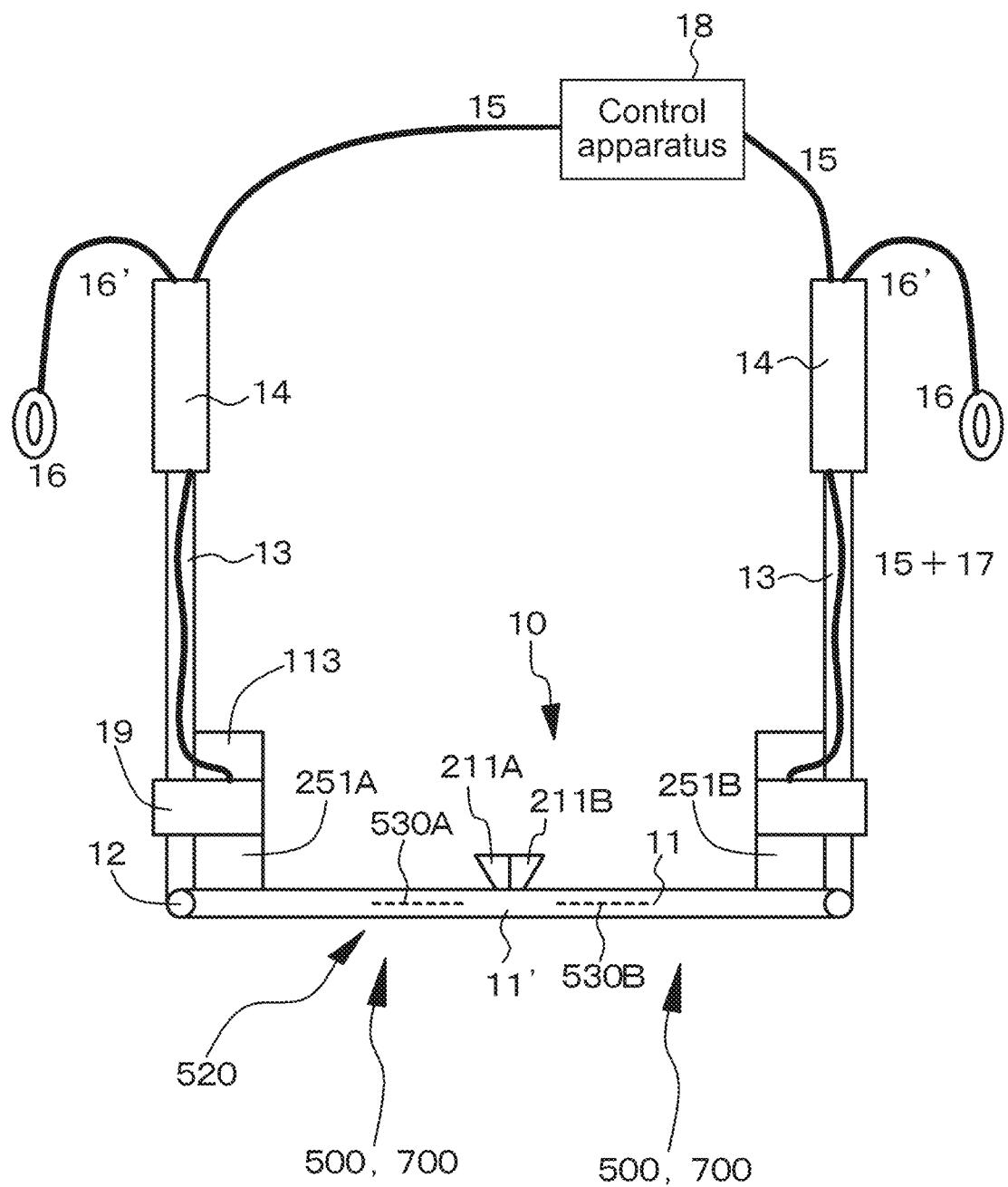
FIG. 20 is a schematic view of a display apparatus according to Embodiment 5 as viewed from above.

Embodiment 5, which is yet another modification of Embodiment 1, relates to the optical apparatus having the second structure and the image forming apparatus having the second configuration. The display apparatus according to Embodiment 5 as viewed from above is illustrated in the schematic view of FIG. 20.

In Embodiment 5, the optical apparatuses 520 constituting the image display apparatuses 500 respectively include transflective mirrors 530A and 530B to which light beams emitted from light sources 251A and 251B are input, and from which these light beams are emitted toward the pupils 21 of the observer. Note that, in Embodiment 5, the light beams emitted from the light sources 251 arranged in the casings 213 are propagated through optical fibers (not shown), and the scanning means 253 that receive these light beams are attached, for example, to parts near the nose pads of the rims 11'. The light beams scanned by the scanning means 253 enter the transflective mirrors 530A and 530B. Alternatively, the light beams emitted from the light sources 251A and 251B arranged in the casings 213 are propagated through the optical fibers (not shown), and the scanning means 253 that receive these light beams are attached, for example, to parts on the rim 11', which correspond respectively to both the eyes. The light beams scanned by the scanning means 253 enter the transflective mirrors 530A and 530B. Still alternatively, the scanning means 253, which receives the light beams emitted from the light sources 251A and 251B arranged in the casings 213, are arranged in the casings 213, and the light beams scanned by the scanning means 253 directly enter the transflective mirrors 530A and 530B. Then, the light beams reflected by the transflective mirrors 530A and 530B enter the pupils of the observer. The image forming apparatus may substantially be the image forming apparatus 211 described in Embodiment 2. Except these differences, the display apparatus according to Embodiment 5 substantially has the same configuration and the same structure as those of the display apparatus according to Embodiment 1. Thus, detailed description thereof is omitted.

Embodiment 6

Figure 21A:
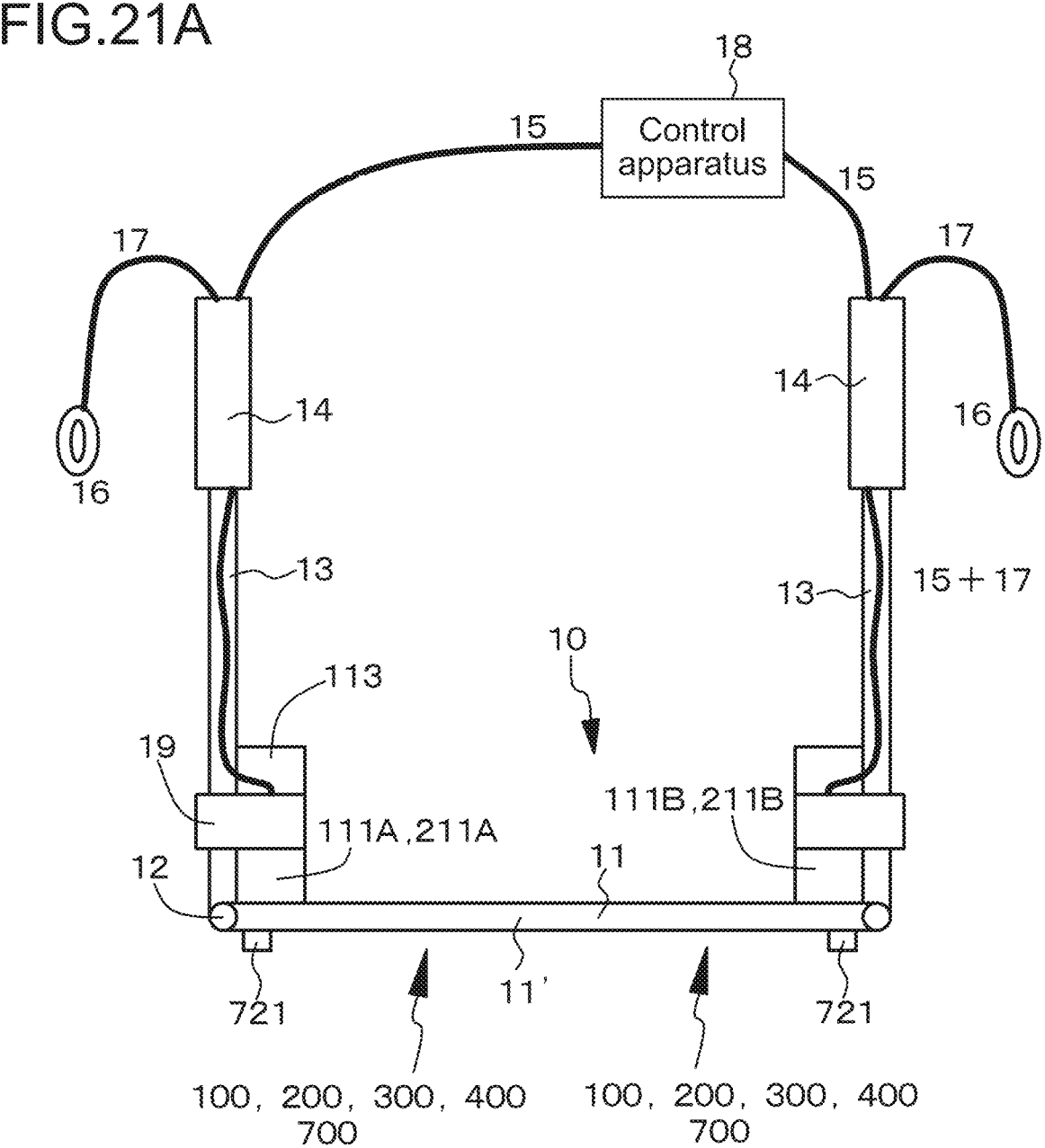
FIG. 21A is a schematic view of a display apparatus according to Embodiment 6 as viewed from above.
Figure 21B:
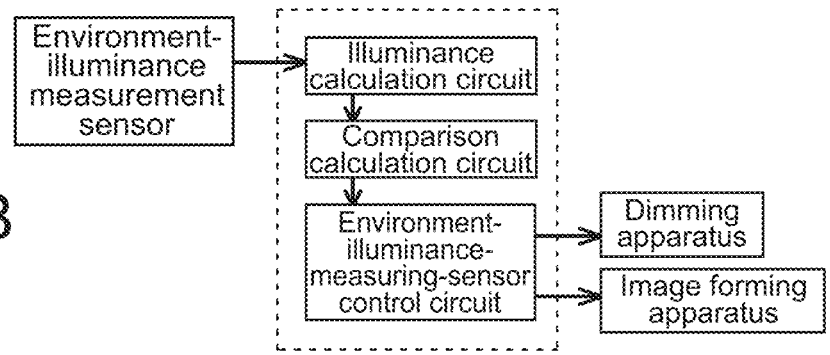
FIG. 21B is a schematic diagram of a circuit that controls illuminance sensors.

Embodiment 6 is yet another modification of Embodiment 1. The display apparatus according to Embodiment 6 as viewed from above is illustrated in the schematic view of FIG. 21A. Further, a circuit that controls illuminance sensors is shown in the schematic diagram of FIG. 21B The display apparatus according to Embodiment 6 further includes illuminance sensors (environment-illuminance measurement sensors) 721 that measure an illuminance in a surrounding environment of the display apparatus. On the basis of measurement results of the illuminance sensors (environment-illuminance measurement sensors) 721, the display apparatus controls the light blocking rates of the dimming apparatuses 700. Together or independently, on the basis of the measurement results of the illuminance sensors (environment-illuminance measurement sensors) 721, the display apparatus controls luminances of the images to be formed by the image forming apparatuses 111 and 211. It is appropriate to arrange the environment-illuminance measurement sensors 721, each of which has a known configuration and a known structure, for example, respectively at outer-side end portions of the dimming apparatuses 700. The environment-illuminance measurement sensors 721 are connected to the control apparatus 18 via connectors and wires (none of which is shown). The control apparatus 18 includes the circuit that controls the environment-illuminance measurement sensors 721. The circuit that controls the environment-illuminance measurement sensors 721 includes an illuminance calculation circuit that receives measurement values from the environment-illuminance measurement sensors 721 and calculates the illuminance, a comparison calculation circuit that compares values of the illuminance calculated by the illuminance calculation circuit with a standard value, and an environment-illuminance-measuring-sensor control circuit that controls the dimming apparatuses 700 and/or the image forming apparatuses 111 and 211 on the basis of values calculated by the comparison calculation circuit. These circuits may be constituted by known circuits. The control of the light blocking rates of the dimming apparatuses 700 is performed as control of the dimming apparatuses 700. Meanwhile, the control of the luminances of the images to be formed by the image forming apparatuses 111 and 211 is performed as control of the image forming apparatuses 111 and 211. Note that, the control of the light blocking rates of the dimming apparatuses 700, and the control of the luminances of the images to be formed by the image forming apparatuses 111 and 211 may be performed independently of or in correlation with each other.

For example, when the measurement results of the illuminance sensors (environment-illuminance measurement sensors) 721 are each a predetermined value (first illuminance-measurement value) or more, the light blocking rates of the dimming apparatuses 700 are each set to a predetermined value (first light-blocking rate) or more. Meanwhile, when the measurement results of the illuminance sensors (environment-illuminance measurement sensors) 721 are each another predetermined value (second illuminance-measurement value) or less, the light blocking rates of the dimming apparatuses 700 are each set to another predetermined value (second light-blocking rate) or less. Specifically, 10 luxes may be mentioned as an example of the first illuminance-measurement value, any value from 99% to 70% may be mentioned as an example of the first light-blocking rate, 0.01 luxes may be mentioned as an example of the second illuminance-measurement value, and any value from 49% to 1% may be mentioned as an example of the second light-blocking rate.

Note that, the illuminance sensors (environment-illuminance measurement sensors) 721 of Embodiment 6 are applicable to the display apparatuses described in Embodiment 2 to Embodiment 5. Further, when the display apparatus includes an imaging apparatus, the illuminance sensor (environment-illuminance measurement sensor) 721 may be constituted by an exposure-measurement light-receiving element provided to the imaging apparatus.

In the display apparatus according to Embodiment 6, or in that according to Embodiment 7 described below, the light blocking rates of the dimming apparatuses are controlled on the basis of the measurement results of the illuminance sensors (environment-illuminance measurement sensors). Further, the luminances of the images to be formed by the image forming apparatuses are controlled on the basis of the measurement results of the illuminance sensors (environment-illuminance measurement sensors). In addition, the light blocking rates of the dimming apparatuses are controlled on the basis of measurement results of the second illuminance sensors (transmitted-light-illuminance measurement sensors). Further, the luminances of the images to be formed by the image forming apparatuses are controlled on the basis of the measurement results of the second illuminance sensors (transmitted-light-illuminance measurement sensors). With this, the virtual images that the observer observes are enabled to exhibit high contrast. In addition, a state in which the virtual images are observed can be optimized in accordance with the illuminance in the surrounding environment of the display apparatus.

Embodiment 7

Figure 22A:
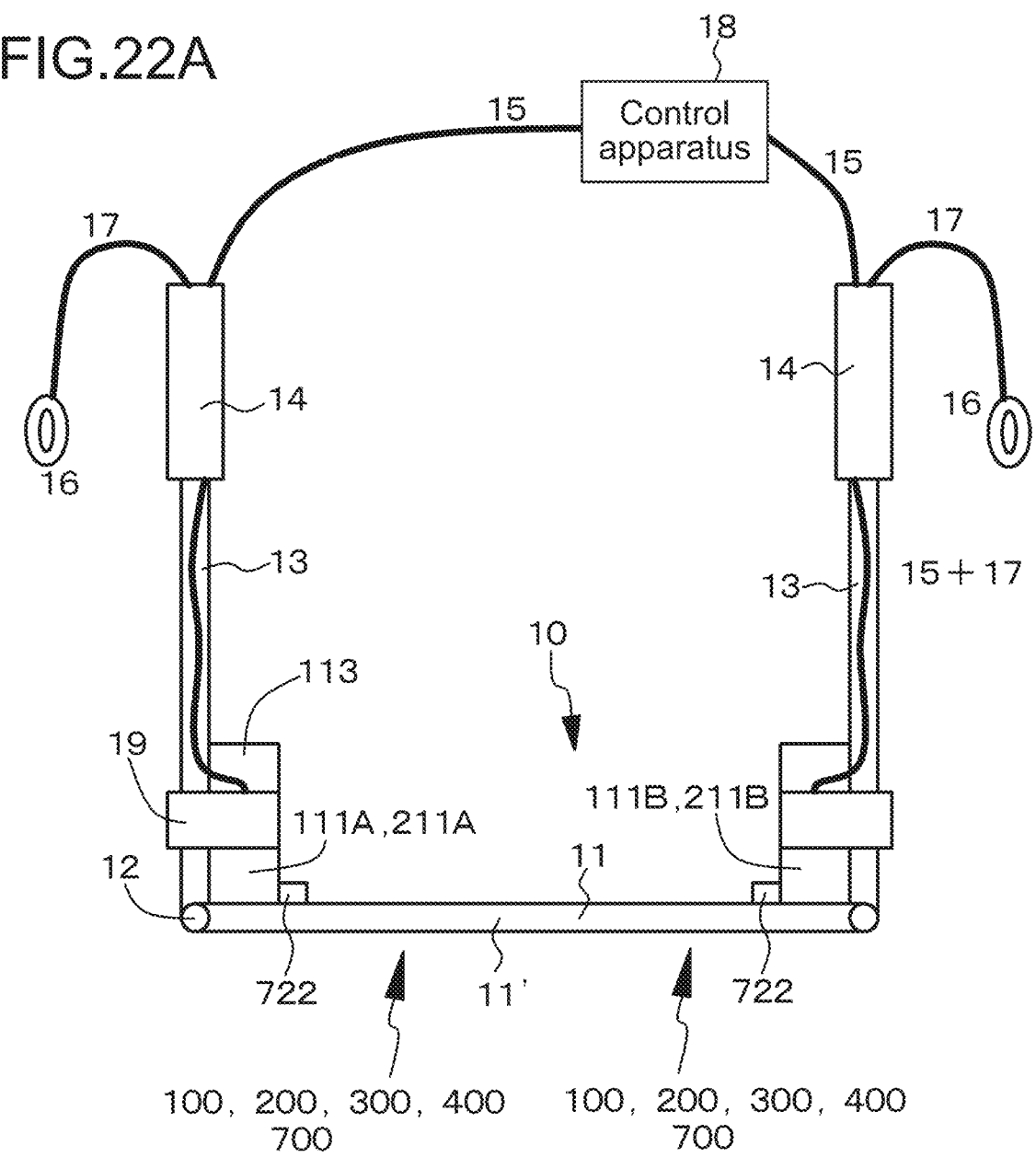
FIG. 22A is a schematic view of a display apparatus according to Embodiment 7 as viewed from above.
Figure 22B:
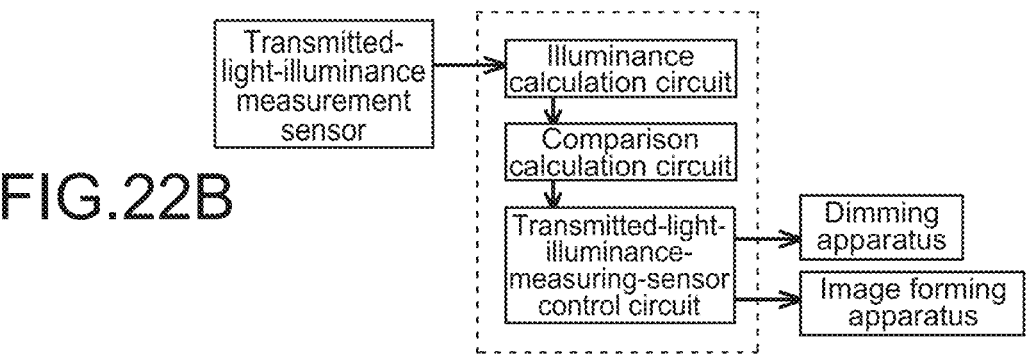
FIG. 22B is a schematic diagram of a circuit that controls other illuminance sensors.

Embodiment 7 is yet another modification of Embodiment 1. The display apparatus according to Embodiment 7 as viewed from above is illustrated in the schematic view of FIG. 22A. Further, a circuit that controls the second illuminance sensors is shown in the schematic diagram of FIG. 22B.

The display apparatus according to Embodiment 7 further includes second illuminance sensors (transmitted-light-illuminance measurement sensors) 722 that measure an illuminance on the basis of light beams from the external environment, which have transmitted through the dimming apparatuses 700, that is, measure whether or not environment light beams have been adjusted to a predetermined illuminance by transmitting through the dimming apparatuses. On the basis of measurement results of the second illuminance sensors (transmitted-light-illuminance measurement sensors) 722, the display apparatus controls the light blocking rates of the dimming apparatuses 700. Together or independently, further, on the basis of the measurement results of the second illuminance sensors (transmitted-light-illuminance measurement sensors) 722, the display apparatus controls the luminances of the images to be formed by the image forming apparatuses 111 and 211. The transmitted-light-illuminance measurement sensors 722, each of which has a known configuration and a known structure, are arranged on the observer's side with respect to the optical apparatuses 120, 320, and 520. Specifically, it is appropriate to arrange the transmitted-light-illuminance measurement sensors 722, for example, on inner-side surfaces of the casings 113 and 213. The transmitted-light-illuminance measurement sensors 722 are connected to the control apparatus 18 via connectors and wires (none of which is shown). The control apparatus 18 includes the circuit that controls the transmitted-light-illuminance measurement sensors 722. The circuit that controls the transmitted-light-illuminance measurement sensors 722 includes an illuminance calculation circuit that receives measurement values from the transmitted-light-illuminance measurement sensors 722 and calculates the illuminance, a comparison calculation circuit that compares values of the illuminance calculated by the illuminance calculation circuit with a standard value, and a transmitted-light-illuminance-measuring-sensor control circuit that controls the dimming apparatuses 700 and/or the image forming apparatuses 111 and 211 on the basis of values calculated by the comparison calculation circuit. These circuits may be constituted by known circuits. The control of the light blocking rates of the dimming apparatuses 700 is performed as the control of the dimming apparatuses 700. Meanwhile, the control of the luminances of the images to be formed by the image forming apparatuses 111 and 211 is performed as the control of the image forming apparatuses 111 and 211. Note that, the control of the light blocking rates of the dimming apparatuses 700, and the control of the luminances of the images to be formed by the image forming apparatuses 111 and 211 may be performed independently of or in correlation with each other. Further, when an illuminance that has failed to be controlled to a desired illuminance in comparison with the illuminance measured by the environment-illuminance measurement sensors 721 is obtained as the measurement result of the transmitted-light-illuminance measurement sensors 722, that is, when the desired illuminance is not obtained as the measurement result of the transmitted-light-illuminance measurement sensors 722, or when much finer illuminance adjustment is desired, it is appropriate to adjust the light blocking rates of the dimming apparatuses while monitoring the values from the transmitted-light-illuminance measurement sensors 722. At least two second illuminance sensors (transmitted-light-illuminance measurement sensors) may be arranged such that the illuminance is measured on the basis of light beams that have passed through a part corresponding to a high light-blocking rate, and that the illuminance is measured on the basis of light beams that have passed through a part corresponding to a low light-blocking rate.

Note that, the second illuminance sensors (transmitted-light-illuminance measurement sensors) 722 of Embodiment 7 are applicable to the display apparatuses described in Embodiment 2 to Embodiment 5. Alternatively, the second illuminance sensors (transmitted-light-illuminance measurement sensors) 722 of Embodiment 7 and the illuminance sensors (environment-illuminance measurement sensors) 721 of Embodiment 6 may be used together. In this case, various tests may be carried out, and the control of the light blocking rates of the dimming apparatuses 700, and the control of the luminances of the images to be formed by the image forming apparatuses 111 and 211 may be performed independently of or in correlation with each other. In each of the dimming apparatus for the right eye and the dimming apparatus for the left eye, by adjusting the voltages to be applied to the first electrode and the second electrode, a light blocking rate of the dimming apparatus for the right eye, and a light blocking rate of the dimming apparatus for the left eye can be equalized to each other. The potential difference between the first electrode and the second electrode may be controlled, and the voltage to be applied to the first electrode and the voltage to be applied to the second electrode may be controlled independently of each other. The light blocking rate of the dimming apparatus for the right eye, and the light blocking rate of the dimming apparatus for the left eye can be controlled on the basis of, for example, the measurement results of the second illuminance sensors (transmitted-light-illuminance measurement sensors) 722. Alternatively, these light blocking rates may be manually controlled and adjusted by operations of a switch, a button, a dial, a slider, a knob, or the like by the observer who observes brightness of light beams that have passed through the dimming apparatus and the optical apparatus for the right eye, and brightness of light beams that have passed through the dimming apparatus and the optical apparatus for the left eye.

Embodiment 8

Embodiment 8 is a modification of Embodiment 1 to Embodiment 7. In Embodiment 8, the dimming layer was formed of an electrophoretic dispersion liquid. Now, a method of preparing the electrophoretic dispersion liquid is described.

First, a solution-A was prepared by adding 10 g of carbon black (#40 manufactured by Mitsubishi Chemical Corporation) as electrophoretic particles to 1 L of pure water, stirring the carbon black and the pure water, and then adding thereto 1 $cm^3$ of 37% by mass of hydrochloric acid, and 0.2 g of 4-vinylaniline. Meanwhile, a solution-B was prepared by dissolving 0.3 g of sodium nitrite into 10 $cm^3$ of pure water, and then heating the sodium nitrite and the pure water up to 40° C. Then, the solution-B was slowly added to the solution-A, and stirred for 10 hours. Next, a product obtained through reaction was subjected to centrifugal separation, and a solid product was obtained. After that, the solid product was washed by a method including washing with pure water, performing dispersion into acetone, and then performing centrifugal separation. Then, the solid product was dried overnight with a vacuum dryer set to a temperature of 50° C.

Next, into a reaction flask provided with a nitrogen purge apparatus, an electromagnetic stirrer, and a reflux column, 5 g of the solid product, 100 $cm^3$ of toluene, 15 $cm^3$ of 2-ethylhexyl methacrylate, and 0.2 g of azobisisobutyronitrile (AIBN) were put and mixed therein. After that, the reaction flask was purged with a nitrogen gas for 30 minutes while being stirred. Then, the reaction flask was put into an oil bath, and gradually heated up to 80° C. while being continuously stirred. This state was maintained for 10 hours. Next, the reaction flask was cooled to room temperature, and the solid product was subjected to centrifugal separation. The solid product was washed by performing three times an operation including subjecting the solid product to centrifugal separation together with tetrahydrofuran (THF) and ethyl acetate. Next, the solid product was taken out and dried overnight with the vacuum dryer set to the temperature of 50° C. In this way, 4.7 g of brown electrophoretic particles were obtained.

Meanwhile, as a dispersion liquid (dispersion medium) being an insulating liquid, a solution of Isopar G (manufactured by Exxon Mobil Corporation) containing a total of 0.5% of N,N-dimethylpropan-1,3-diamine, 1,2-hydroxyoctadecanoic acid, and methoxysulfonyloxymethane (Solsperse 17000 manufactured by Lubrizol Japan Co., Ltd.), and containing 1.5% of sorbitan trioleate (Span 85) was prepared. Then, 0.1 g of the electrophoretic particles were added to 9.9 g of the dispersion medium, and stirred for 5 minutes with a bead mill. Next, the mixed solution was subjected to centrifugal separation for 5 minutes with a centrifuge machine (rotation speed of 2,000 rpm), and then beads were removed. In this way, the electrophoretic dispersion liquid was successfully obtained. Note that, the electrophoretic particles are positively charged.

In the dimming apparatus 700 of Embodiment 8, a clearance between the first substrate 711A and the second substrate 711B each made of a glass with a thickness of 0.5 mm was set to 50 µm. The first transparent electrode 712A and the second transparent electrode 712B, each of which is made of an indium-tin oxide (ITO), are formed by a combination of a lift-off method and PVD methods such as a sputtering method. The first transparent electrode 712A is patterned into a comb-shaped electrode. Meanwhile, the second transparent electrode 712B is not patterned, that is, what is called a solid electrode. The first transparent electrode 712A and the second transparent electrode 712B are connected to the control apparatus 18 via connectors and wires (none of which is shown).

The light blocking rate (light transmittance) of the dimming apparatus 700 can be controlled with voltages to be applied to the first transparent electrode 712A and the second transparent electrode 712B. Specifically, when a relatively positive voltage is applied to the first transparent electrode 712A, and a relatively negative voltage is applied to the second transparent electrode 712B, the positively-charged electrophoretic particles migrate in a manner of covering the second transparent electrode 712B. Thus, a value of the light blocking rate of the dimming apparatus 700 increases. Meanwhile, in contrast, when the relatively negative voltage is applied to the first transparent electrode 712A, and the relatively positive voltage is applied to the second transparent electrode 712B, the electrophoretic particles migrate in a manner of covering the first transparent electrode 712A. Thus, the value of the light blocking rate of the dimming apparatus 700 decreases. The voltages to be applied to the first transparent electrode 712A and the second transparent electrode 712B can be performed when the observer operates a control knob provided to the control apparatus 18. In other words, it is appropriate to increase contrast of the virtual images from the optical apparatuses 120 and 320 by the adjustment of the light blocking rate of the dimming apparatus 700 after the observer views these virtual images.

Embodiment 9

Embodiment 9 is a modification of Embodiment 8. In Embodiment 8, a color to be exhibited by the dimming apparatus 700 is fixed to black. Meanwhile, in Embodiment 9, the light beams that pass through the dimming apparatus are colored in a desired color by the dimming apparatus. In addition, the color to be exhibited by the dimming apparatus is variable. Specifically, the dimming apparatus is constituted by laminating a dimming apparatus to be colored in red, a dimming apparatus to be colored in yellow, and a dimming apparatus to be colored in blue. In this context, the electrophoretic dispersion liquid in the dimming apparatus to be colored in red is obtained by dispersing particles as the electrophoretic particles into the solution of Isopar G (manufactured by Exxon Mobil Corporation), the particles being obtained by preliminarily mixing a styrene resin and C.I. Pigment Red 122 with a Henschel mixer, then melting and kneading the resultant mixture with a twin screw extruder, cooling the molten-and-kneaded mixture, coarsely pulverizing the cooled mixture with a hammer mill, and then finely pulverizing the coarsely-pulverized mixture with a jet mill, the solution of Isopar G containing a total of 0.5% of N,N-dimethylpropan-1,3-diamine, 1,2-hydroxyoctadecanoic acid, and methoxysulfonyloxymethane (Solsperse 17000 manufactured by Lubrizol Japan Co., Ltd.), and containing 1.5% of sorbitan trioleate (Span 85). Further, the electrophoretic dispersion liquid in the dimming apparatus to be colored in yellow is obtained by dispersing particles as the electrophoretic particles into the solution of Isopar G (manufactured by Exxon Mobil Corporation), the particles being obtained by preliminarily mixing a styrene resin and C.I. Pigment Yellow 12 with a Henschel mixer, then melting and kneading the resultant mixture with a twin screw extruder, cooling the molten-and-kneaded mixture, coarsely pulverizing the cooled mixture with a hammer mill, and then finely pulverizing the coarsely-pulverized mixture with a jet mill, the solution of Isopar G containing a total of 0.5% of N,N-dimethylpropan-1,3-diamine, 1,2-hydroxyoctadecanoic acid, and methoxysulfonyloxymethane (Solsperse 17000 manufactured by Lubrizol Japan Co., Ltd.), and containing 1.5% of sorbitan trioleate (Span 85). In addition, the electrophoretic dispersion liquid in the dimming apparatus to be colored in blue is obtained by dispersing particles as the electrophoretic particles into the solution of Isopar G (manufactured by Exxon Mobil Corporation), the particles being obtained by preliminarily mixing a styrene resin and C.I. Pigment Blue 1 with a Henschel mixer, then melting and kneading the resultant mixture with a twin screw extruder, cooling the molten-and-kneaded mixture, coarsely pulverizing the cooled mixture with a hammer mill, and then finely pulverizing the coarsely-pulverized mixture with a jet mill, the solution of Isopar G containing a total of 0.5% of N,N-dimethylpropan-1,3-diamine, 1,2-hydroxyoctadecanoic acid, and methoxysulfonyloxymethane (Solsperse 17000 manufactured by Lubrizol Japan Co., Ltd.), and containing 1.5% of sorbitan trioleate (Span 85). In addition, by controlling the voltages to be applied to the electrodes of each of the dimming apparatuses, external light beams to be emitted from the three-layer dimming apparatus can be colored in a desired color.

Except the above-described features, the configuration and the structure of the display apparatus according to Embodiment 9 are the same as the configuration and the structure of the display apparatus described in Embodiment 8. Thus, detailed description thereof is omitted.

Hereinabove, the present disclosure is described on the basis of preferred Embodiments, but the present disclosure is not limited to these Embodiments. The configurations and the structures of the display apparatuses (head mounted displays) and the image display apparatuses described in Embodiments are merely examples, and hence may be changed as appropriate. For example, a surface relief hologram (refer to US Patent No. 20040062505 A1) may be arranged on the light guide plate. In the optical apparatus 320, the diffraction grating element may be constituted by the transmissive diffraction-grating element. Alternatively, there may be employed a configuration in which any one of the first deflecting means and the second deflecting means is constituted by the reflective diffraction-grating element, and another one may be constituted by the transmissive diffraction-grating element. Still alternatively, the diffraction grating element may include a reflective blazed diffraction-grating element. The display apparatus according to the present disclosure may be used as a stereoscopic display apparatus. In this case, when necessary, it is appropriate to attach a polarizing plate or a polarizing film to the optical apparatus in a freely detachable manner, or to apply the polarizing plate or the polarizing film to the optical apparatus.

Depending on shapes and structures of the frame and the rim, the frame and the rim may include parts having high curvature (small curvature radius). In addition, electric fields to be formed by the first electrode and the second electrode are liable to concentrate on these parts. As a countermeasure, when necessary, it is appropriate to provide first-electrode segments and second-electrode segments without forming the first electrode and the second electrode at such high-curvature parts of the frame and the rim, and to connect the first-electrode segments and the second-electrode segments with the first connecting portion and the second connecting portion.

The image forming apparatuses 111 and 211 described in Embodiments display monochromatic (for example, green) images, but the image forming apparatuses 111 and 211 may be capable of displaying color images. In this case, it is appropriate to provide, as the light source, for example, light sources that respectively emit red light beams, green light beams, and blue light beams. Specifically, in order to emit white light beams, it is appropriate to use, for example, light pipes so as to mix the colors of the red light beam, the green light beam, and the blue light beam emitted respectively from a red light-emitting element, a green light-emitting element, and a blue light-emitting element, and so as to equalize their luminances to each other. When necessary, there may be employed a configuration in which the light beams that pass through the dimming apparatus are colored in a desired color by the dimming apparatus. In this case, the color to be exhibited by the dimming apparatus can be varied. Specifically, it is appropriate to laminate the dimming apparatus to be colored in red, the dimming apparatus to be colored in yellow, and the dimming apparatus to be colored in blue.

Figure 23:
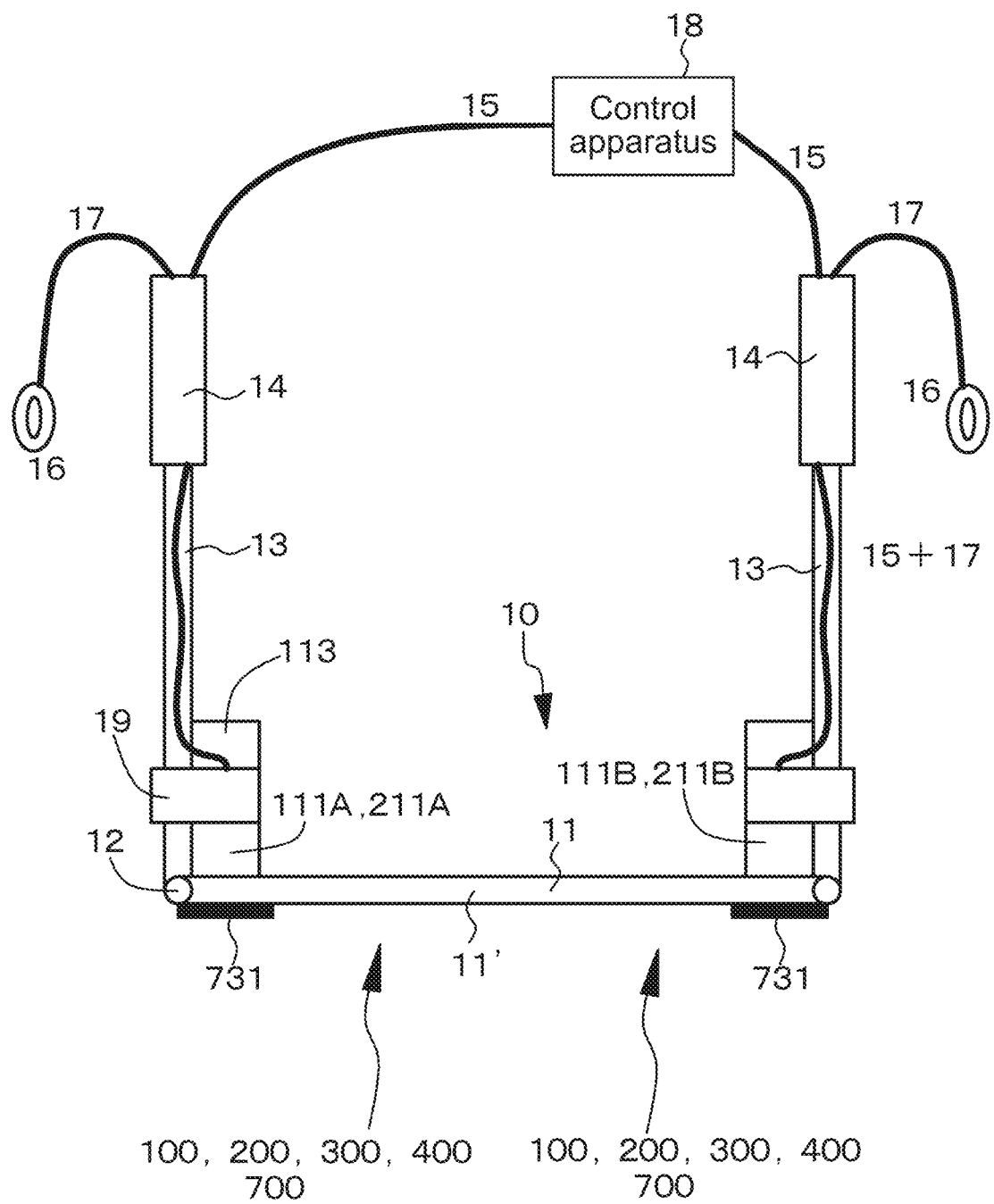
FIG. 23 is a schematic view illustrating yet another modification of the display apparatus according to Embodiment 1 as viewed from above.
Figure 24:
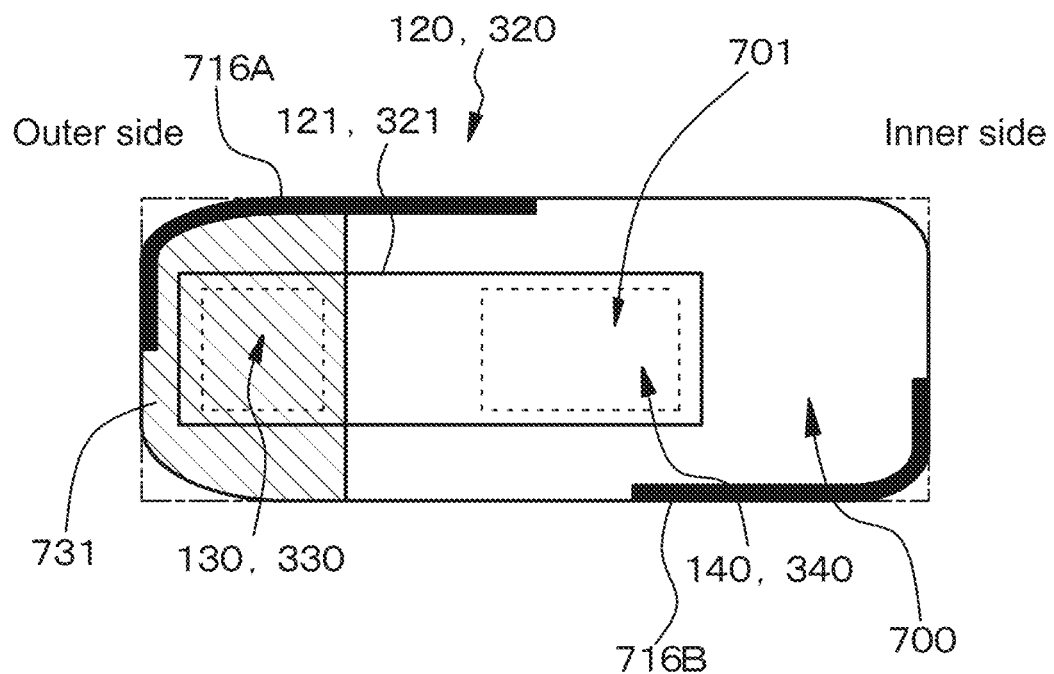
FIG. 24 is a schematic front view of the optical apparatus and the dimming apparatus in the yet another modification of the display apparatus according to Embodiment 1, which is illustrated in FIG. 23.

Further, the image forming apparatuses described in Embodiment 1 to Embodiment 9 may be modified as described below. Specifically, as illustrated in the schematic view of FIG. 23 as viewed from above, and as illustrated in the schematic front view of FIG. 24, in the optical apparatus and the dimming apparatus, a light blocking member 731 for preventing degradation in efficiency of utilizing light beams due to leakage of the light beams to the outside of the light guide plate 321 is formed on an outer surface of each of the dimming apparatuses 700, which faces the first diffraction-grating member 330.

Figure 25:
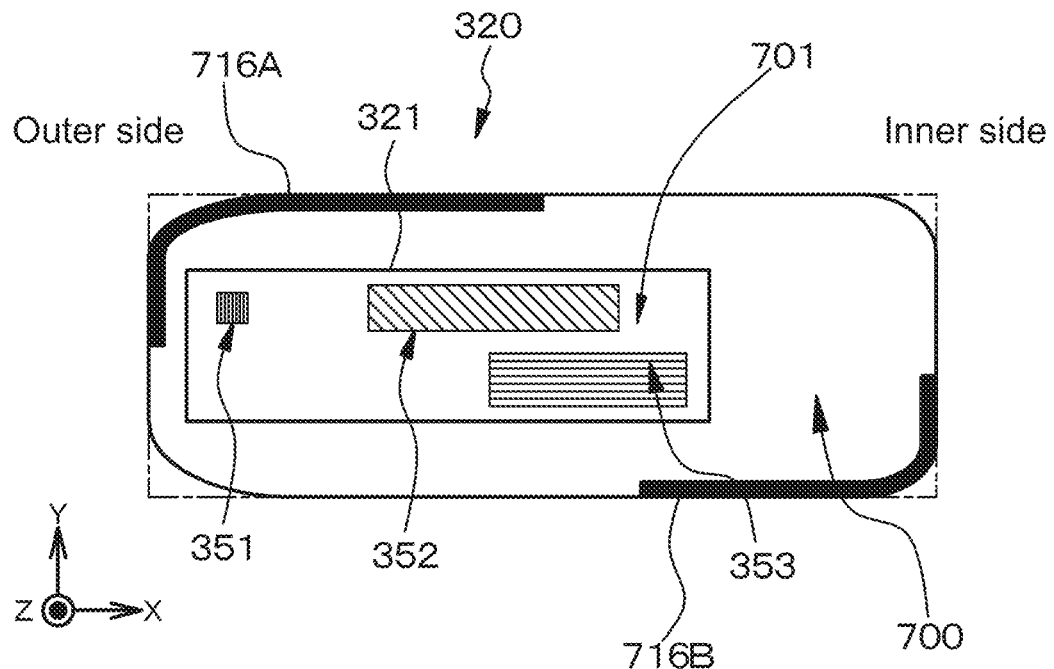
FIG. 25 is a conceptual view of the optical apparatus in yet another modification of the display apparatus according to Embodiment 1.

The image display apparatuses described in Embodiment 3 and Embodiment 4 may be modified as described below. Specifically, as illustrated in the conceptual view of FIG. 25, in the optical apparatus and the dimming apparatus in still another modification of the display apparatus according to Embodiment 1, there may be provided a first reflective volume-holographic diffraction grating 351, a second reflective volume-holographic diffraction grating 352, and a third reflective volume-holographic diffraction grating 353. In the first reflective volume-holographic diffraction grating 351, the interference fringes of the diffraction grating member extend substantially parallel to the Y-axis. In the second reflective volume-holographic diffraction grating 352, the interference fringes of the diffraction grating member extend in an oblique direction. In the third reflective volume-holographic diffraction grating 353, the interference fringes of the diffraction grating member extend substantially parallel to the X-axis. The light beams emitted from the image forming apparatuses 111, 111', and 211 are diffracted in the X-axis direction by the first reflective volume-holographic diffraction grating 351, propagated in the light guide plate 321, and enter the second reflective volume-holographic diffraction grating 352. Then, the light beams are diffracted obliquely downward by the second reflective volume-holographic diffraction grating 352, and enter the third reflective volume-holographic diffraction grating 352. Next, the light beams are diffracted in the Z-axis direction by the third reflective volume-holographic diffraction grating 353, and enter the pupil of the observer.

Figure 26A:
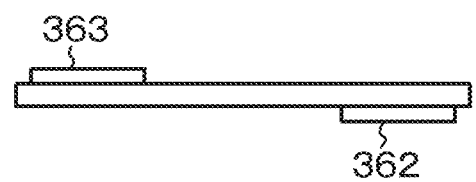
FIG. 26A, FIG. 26B, FIG. 26C, FIG. 26D, FIG. 26E, FIG. 26F, FIG. 26G, and FIG. 26H are each a conceptual view of the optical apparatus in yet another modification of the display apparatus according to Embodiment 1.
Figure 26B:
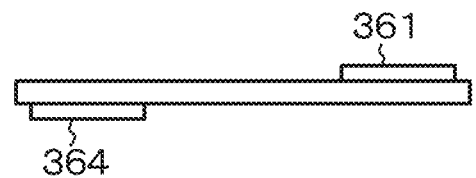
Figure 26C:
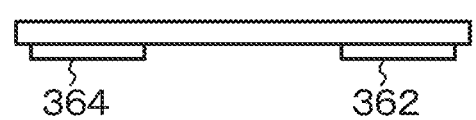
Figure 26D:
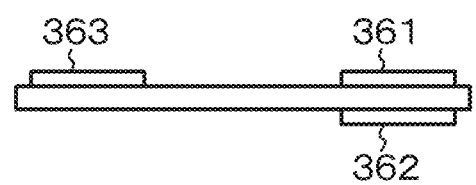
Figure 26E:
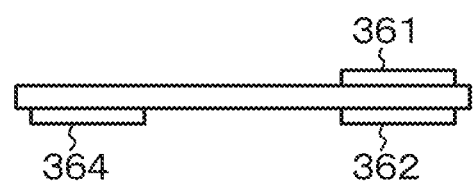
Figure 26F:
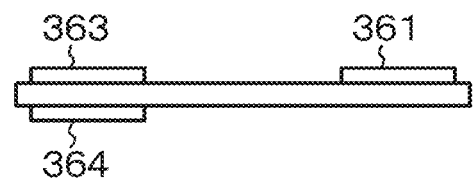
Figure 26G:
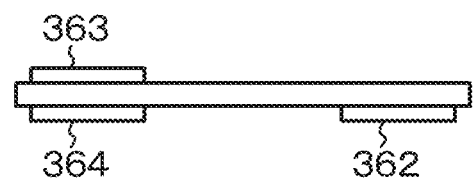
Figure 26H:
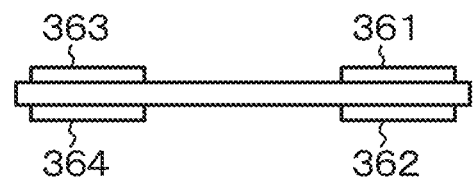

Alternatively, the optical apparatus in the image display apparatuses described in Embodiment 3 and Embodiment 4 may be modified as described below. Specifically, as illustrated in the conceptual view of FIG. 26A, in the optical apparatus in yet another modification of the display apparatus according to Embodiment 1, a transmissive diffraction-grating element 362 may be provided as a holographic diffraction grating on a light incident side, and a reflective diffraction-grating element 363 may be provided as a holographic diffraction grating on a light emitting side. Note that, light beams enter on the transmissive diffraction-grating element 362 side, and the light beams are emitted on the transmissive diffraction-grating element 364 side. Alternatively, as illustrated in the conceptual view of FIG. 26B, in the optical apparatus in yet another modification of the display apparatus according to Embodiment 1, a reflective diffraction-grating element 361 may be provided as the holographic diffraction grating on the light incident side, and the transmissive diffraction-grating element 364 may be provided as the holographic diffraction grating on the light emitting side. Still alternatively, as illustrated in the conceptual view of FIG. 26C, in the optical apparatus in yet another modification of the display apparatus according to Embodiment 1, the transmissive diffraction-grating element 362 may be provided as the holographic diffraction grating on the light incident side, and the transmissive diffraction-grating element 364 may be provided as the holographic diffraction grating on the light emitting side. Yet alternatively, as illustrated in the conceptual view of FIG. 26D, in the optical apparatus in yet another modification of the display apparatus according to Embodiment 1, the reflective diffraction-grating element 361 and the transmissive diffraction-grating element 362 may be provided as the holographic diffraction gratings on the light incident side, and the reflective diffraction-grating element 363 may be provided as the holographic diffraction grating on the light emitting side. Yet alternatively, as illustrated in the conceptual view of FIG. 26E, in the optical apparatus in yet another modification of the display apparatus according to Embodiment 1, the reflective diffraction-grating element 361 and the transmissive diffraction-grating element 362 may be provided as the holographic diffraction gratings on the light incident side, and the transmissive diffraction-grating element 364 may be provided as the holographic diffraction grating on the light emitting side. Yet alternatively, as illustrated in the conceptual view of FIG. 26F, in the optical apparatus in yet another modification of the display apparatus according to Embodiment 1, the reflective diffraction-grating element 361 may be provided as the holographic diffraction grating on the light incident side, and the reflective diffraction-grating element 363 and the transmissive diffraction-grating element 364 may be provided as the holographic diffraction gratings on the light emitting side. Yet alternatively, as illustrated in the conceptual view of FIG. 26G, in the optical apparatus in yet another modification of the display apparatus according to Embodiment 1, the transmissive diffraction-grating element 362 may be provided as the holographic diffraction grating on the light incident side, and the reflective diffraction-grating element 363 and the transmissive diffraction-grating element 364 may be provided as the holographic diffraction gratings on the light emitting side. Yet alternatively, as illustrated in the conceptual view of FIG. 26H, in the optical apparatus in yet another modification of the display apparatus according to Embodiment 1, the reflective diffraction-grating element 361 and the transmissive diffraction-grating element 362 may be provided as the holographic diffraction gratings on the light incident side, and the reflective diffraction-grating element 363 and the transmissive diffraction-grating element 364 may be provided as the holographic diffraction gratings on the light emitting side.

Figure 27A:
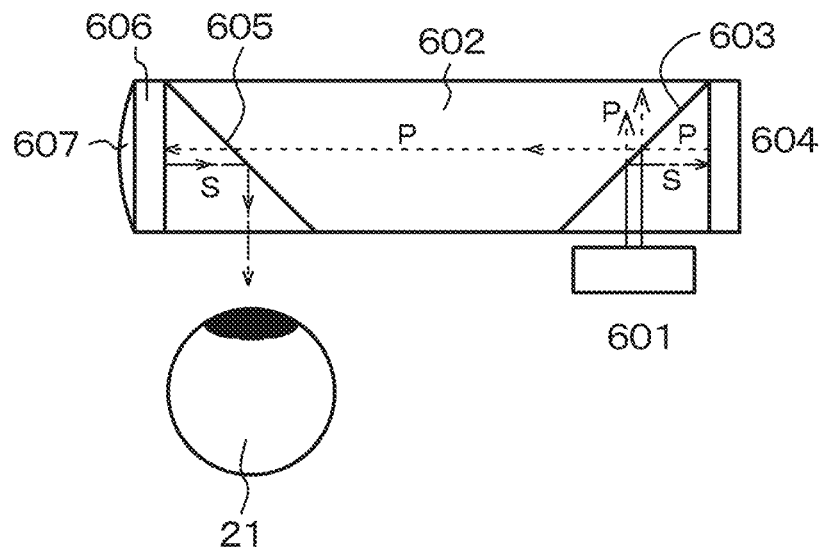
FIG. 27A and FIG. 27B are each a schematic view in which the optical apparatus in a modification of the display apparatus according to Embodiment 5 is viewed from above.
Figure 27B:
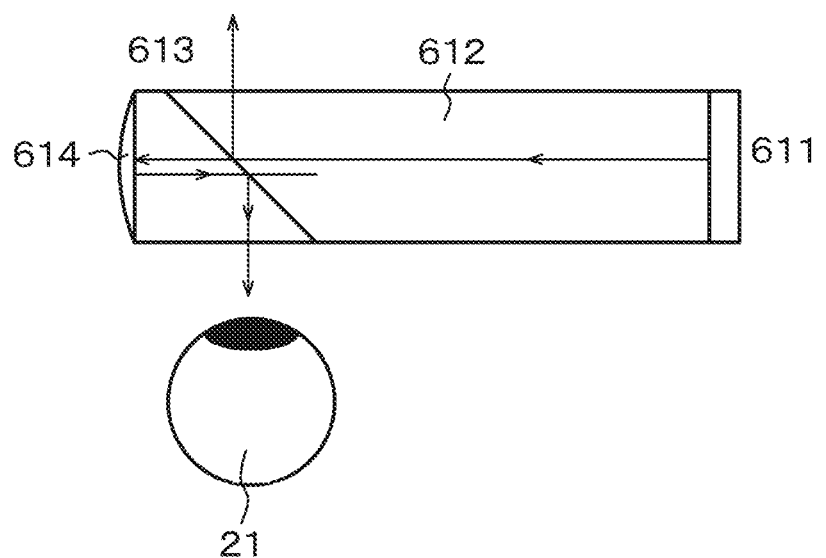

Modifications of the optical apparatus as viewed from above, which constitutes the optical apparatus having the second structure as described in Embodiment 5, are illustrated in the schematic views of FIG. 27A and FIG. 27B.

In the example illustrated in FIG. 27A, light beams from a light source 601 enter the light guide member 602, and impinge on a polarizing beam splitter 603 provided in the light guide member 602. P-polarized light components in the light beams from the light source 601, which have impinged on the polarizing beam splitter 603, pass through the polarizing beam splitter 603, and S-polarized light components in the same are reflected by the polarizing beam splitter 603, and advance toward a liquid-crystal-display apparatus (LCD) 604 constituted by the LCOS as the light valve. Images are formed by the liquid-crystal-display (LCD) apparatus 604. The P-polarized components account for polarized light components of light beams reflected by the liquid-crystal-display (LCD) apparatus 604. Thus, the light beams reflected by the liquid-crystal-display (LCD) apparatus 604 pass through the polarizing beam splitter 603 and another polarizing beam splitter 605, pass through a ¼ wavelength plate 606, are reflected by impinging on a reflecting plate 607, pass through the ¼ wavelength plate 606, and advance toward the polarizing beam splitter 605. S-polarized light components, which account for polarized light components at this time, are reflected by the polarizing beam splitter 605, and advance toward the pupil 21 of the observer. In this way, the image forming apparatus includes the light source 601 and the liquid-crystal-display (LCD) apparatus 604, and the optical apparatus includes the light guide member 602, the polarizing beam splitters 603 and 605, the ¼ wavelength plate 606, and the reflecting plate 607. The polarizing beam splitter 605 corresponds to the virtual-image forming region in the optical apparatus.

In the example illustrated in FIG. 27B, light beams from an image forming apparatus 611 advance in the light guide member 612, and impinge on a transflective mirror 613. Ones of the light beams pass through the transflective mirror 613, are reflected by impinging on a reflecting plate 614, and impinge on the transflective mirror 613 again. The other ones of the light beams are reflected by the transflective mirror 613, and advance toward the pupil 21 of the observer. In this way, the optical apparatus includes the light guide member 612, the transflective mirror 613, and the reflecting plate 614. The transflective mirror 613 corresponds to the virtual-image forming region in the optical apparatus.

Figure 28A:
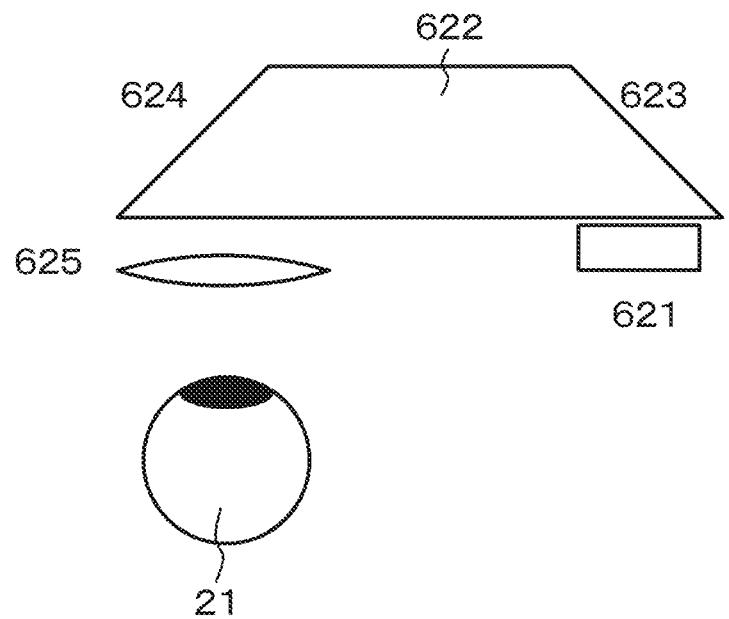
FIG. 28A and FIG. 28B are schematic views in which the optical apparatus in another modification of the display apparatus according to Embodiment 5 is viewed from above and from a lateral side, respectively.
Figure 28B:
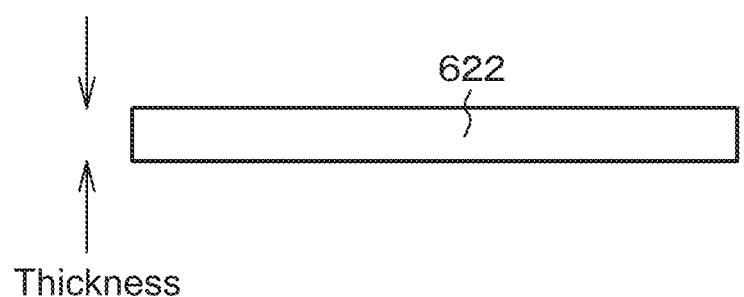
Figure 29:
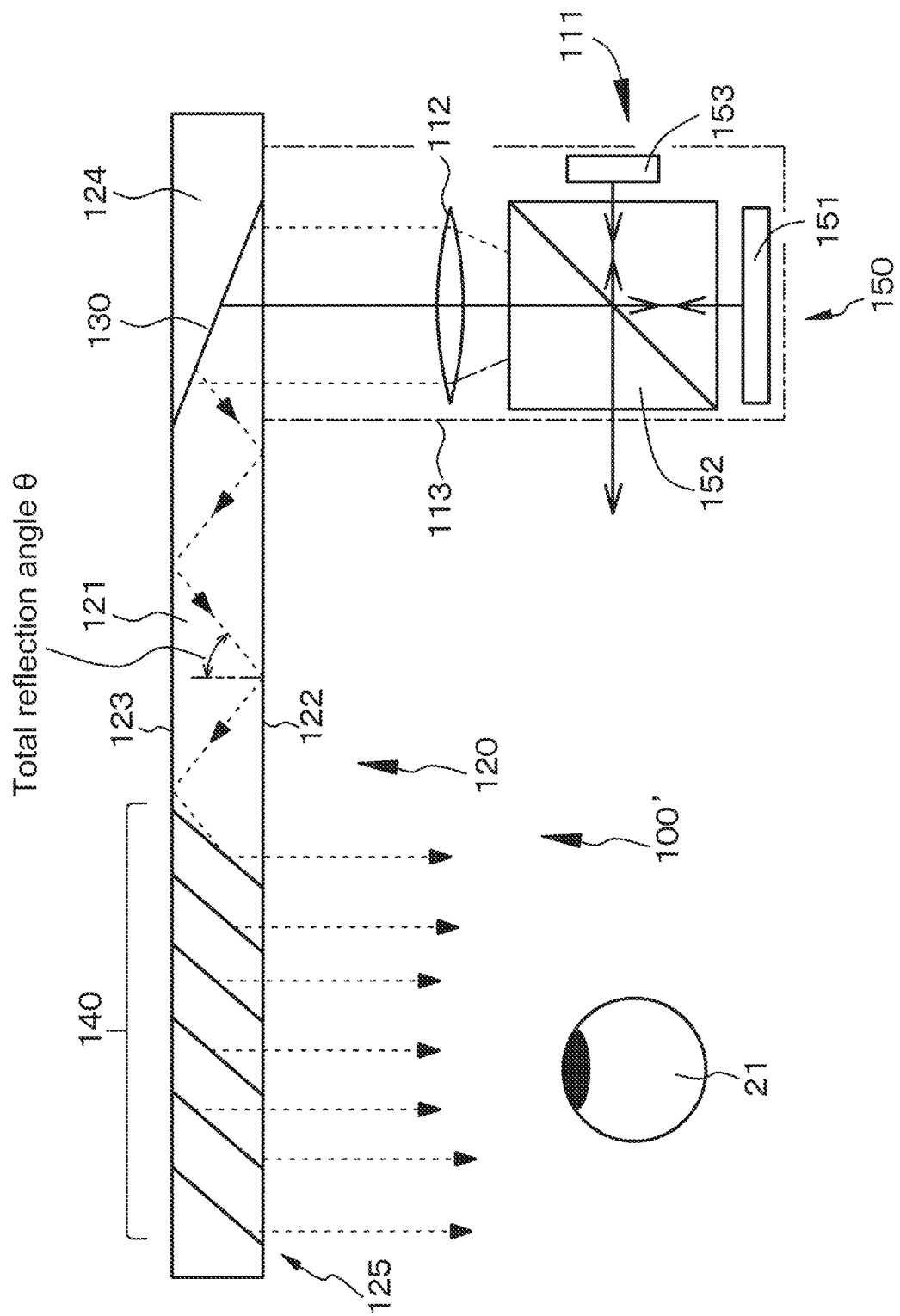
FIG. 29 is a conceptual view of an image display apparatus in a related-art display apparatus.
Figure 30:
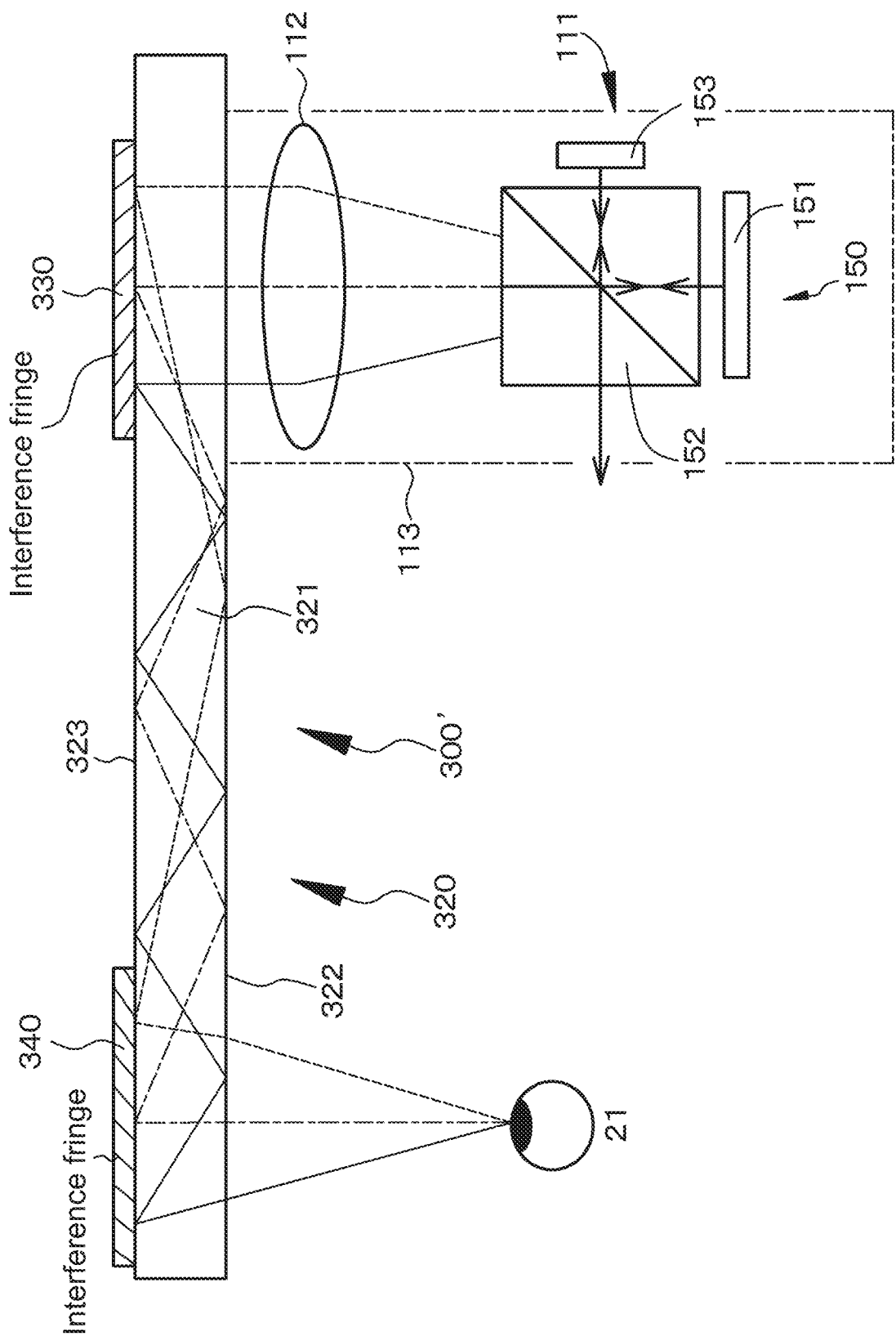
FIG. 30 is a conceptual view of the image display apparatus in a modification of the related-art display apparatus.

As other examples, the optical apparatus in a modification of the display apparatus according to Embodiment 5 as viewed from above and from a lateral side are illustrated respectively in the schematic views of FIG. 28A and FIG. 28B. This optical apparatus includes a hexahedral prism 622 and a convex lens 625. Light beams emitted from an image forming apparatus 621 enter the prism 622, are reflected by impinging on a prism surface 623, advance in the prism 622, and are reflected by impinging on a prism surface 624. In this way, the light beams reach the pupil 21 of the observer through the convex lens 625. The prism surface 623 and the prism surface 624 are inclined in directions facing each other. The prism 622 has a planar trapezoidal shape, specifically, a planar isosceles-trapezoidal shape. The prism surfaces 623 and 624 are subjected to mirror coating. When a thickness (height) of a part of the prism 622, which faces the pupil 21, is set to less than 4 mm being an average diameter of a pupil of humans, the observer is enabled to view an image of an outside world and a virtual image from the prism 622 in a superimposed manner.

When necessary, there may be employed a configuration in which, by dividing the first transparent electrode and/or the second transparent electrode into a plurality of blocks, and controlling respective light blocking rates in these blocks, the light blocking rate from the first predetermined region of the virtual-image-forming-region facing region toward the second predetermined region of the virtual-image-forming-region facing region in the dimming apparatus is controlled. Alternatively, there may be employed a configuration in which, by providing a strip-shaped electrode or a mesh-shaped electrode as the first transparent electrode or the second transparent electrode, or by forming a strip-shaped auxiliary electrode or a mesh-shaped auxiliary electrode on the first transparent electrode or the second transparent electrode, the light blocking rates of the plurality of regions in the dimming apparatus are controlled independently of each other such that the light blocking rate from the first predetermined region of the virtual-image-forming-region facing region toward the second predetermined region of the virtual-image-forming-region facing region in the dimming apparatus is controlled. Still alternatively, there may be employed a configuration in which, for example, without changing the position of the first electrode 716A in FIG. 1A, the second electrode 716B is provided to overlap with the first electrode 716A such that the light blocking rate is increased in the upper region and the outer-side region of the virtual-image-forming-region facing region, and is reduced at the central portion of the virtual-image-forming-region facing region. When necessary, in order to control the light blocking rate from the first predetermined region of the virtual-image-forming-region facing region toward the second predetermined region of the virtual-image-forming-region facing region in the dimming apparatus, the dimming apparatus may be constituted by a liquid-crystal-display apparatus that is driven by an active-matrix system or a simple-matrix system.

Note that, the present disclosure may also employ the following configurations.

[A01] <<Display Apparatus>>

A display apparatus, including:
(A) a frame to be mounted to a head of an observer;
(B) an image display apparatus attached to the frame; and
(C) a dimming apparatus that adjusts light intensities of external light beams that enter from an outside,
the image display apparatus including
(a) an image forming apparatus, and
(b) an optical apparatus having a virtual-image forming region in which virtual images are formed on a basis of light beams emitted from the image forming apparatus,
the optical apparatus overlapping with at least a part of the dimming apparatus,
when the dimming apparatus operates,
(i) a light blocking rate of the dimming apparatus decreasing from an upper region and an outer-side region of a virtual-image-forming-region facing region toward a central portion of the virtual-image-forming-region facing region,
(ii) the light blocking rate of the dimming apparatus decreasing from a lower region and the outer-side region of the virtual-image-forming-region facing region toward the central portion of the virtual-image-forming-region facing region,
(iii) the light blocking rate of the dimming apparatus decreasing from the outer-side region of the virtual-image-forming-region facing region toward an inner-side region of the virtual-image-forming-region facing region,
(iv) the light blocking rate of the dimming apparatus decreasing from the lower region of the virtual-image-forming-region facing region toward the upper region of the virtual-image-forming-region facing region, or
(v) the light blocking rate of the dimming apparatus decreasing from an outer-edge region of the virtual-image-forming-region facing region toward the central portion of the virtual-image-forming-region facing region, the inner side being an observer's nose side, the outer side being an observer's ear side, the virtual-image-forming-region facing region being a region in the dimming apparatus, the region facing the virtual-image forming region in the optical apparatus.

[A02] The display apparatus according to Item [A01], in which
the dimming apparatus includes
a first substrate,
a second substrate that faces the first substrate,
a first transparent electrode provided to face a facing surface of the first substrate, the facing surface of the first substrate facing the second substrate,
a second transparent electrode provided to face a facing surface of the second substrate, the facing surface of the second substrate facing the first substrate, and
a dimming layer sandwiched between the first transparent electrode and the second transparent electrode.

[A03] The display apparatus according to Item [A02], in which
the dimming layer contains an electrochromic material.

[A04] The display apparatus according to Item [A03], in which
the dimming layer has a laminated structure including, from the first transparent electrode side,
a $WO_3$ layer,
a $Ta_2O_5$ layer, and
an $Ir_XSn_{1-X}O$ layer.

[A05] The display apparatus according to any one of Items [A01] to [A04], in which
the optical apparatus is attached to the dimming apparatus.

[A06] The display apparatus according to any one of Items [A01] to [A05], in which
the frame includes
a front portion that is arranged in front of the observer,
two temple portions attached in a freely pivotal manner to both ends of the front portion via hinges, and
a nose pad, and
the dimming apparatus is arranged at the front portion.

[A07] The display apparatus according to Item [A06], in which
the front portion includes a rim, and
the dimming apparatus is fitted in the rim.

[A08] The display apparatus according to any one of Items [A01] to [A07], in which
the optical apparatus includes
(b-1) a light guide plate in which the light beams input from the image forming apparatus are propagated by total reflection in the light guide plate, and then emitted toward the observer,
(b-2) first deflecting means that deflects the light beams input to the light guide plate such that the light beams input to the light guide plate are totally reflected in the light guide plate, and
(b-3) second deflecting means that deflects the light beams propagated by the total reflection in the light guide plate such that the light beams propagated by the total reflection in the light guide plate are emitted from the light guide plate, and
the virtual-image forming region in the optical apparatus is formed of the second deflecting means.

REFERENCE SIGNS LIST

10 frame
11 front portion
11' rim
12 hinge
13 temple portion
14 modern portion
15 wire (such as signal line or power line)
16 headphone unit
17 headphone-unit wire
18 control apparatus (control circuit or control means)
19 attachment member
21 pupil
100, 200, 300, 400, 500 image display apparatus
111, 111A, 111B, 111', 211, 211A, 211B image forming apparatus
112 optical system (collimating optical system)
113, 213 casing
120, 320, 520 optical apparatus
121, 321 light guide plate
122, 322 first surface of light guide plate
123, 323 second surface of light guide plate
124, 125 part of light guide plate
130 first deflecting means
140 second deflecting means (virtual-image forming region)
330 first deflecting means (first diffraction-grating member)
340 second deflecting means (second diffraction-grating member)
351 first reflective volume-holographic diffraction grating
352 second reflective volume-holographic diffraction grating 353 third reflective volume-holographic diffraction grating
361, 363 reflective diffraction-grating element
362, 364 transmissive diffraction-grating element
150 reflective spatial-light modulator
150' organic EL display apparatus
151 liquid-crystal-display apparatus (LCD)
152 polarizing beam splitter (PBS)
153 light source
251, 251A, 251B light source
252 collimating optical system
253 scanning means
254 optical system (relay optical system)
256 total reflection mirror
530A, 530B transflective mirror
601 light source
602 light guide member
603, 605 polarizing beam splitter
604 liquid-crystal-display apparatus
606 ¼ wavelength plate
607 reflecting plate
611 image forming apparatus
612 light guide member 612
613 transflective mirror
614 reflecting plate
621 image forming apparatus
622 prism
623, 624 prism surface
625 convex lens
700 dimming apparatus
701 virtual-image-forming-region facing region
711A first substrate
711B second substrate
712A first transparent electrode
712B second transparent electrode
713 $WO_3$ layer
714 $Ta_2O_5$ layer
715 $Ir_xSn_{1-x}O$ layer
716A first electrode
716B second electrode
717A first-electrode branch electrode
718A first connecting portion
718B second connecting portion
719A protective layer
719B foundation layer
719C sealing member
719D adhesive
721 illuminance sensor (environment-illuminance measurement sensor)
722 second illuminance sensor (transmitted-light-illuminance measurement sensor)
731 light blocking member

The invention claimed is:

1. A display apparatus, comprising:
   (A) a frame to be mounted to a head of an observer;
   (B) an image display apparatus attached to the frame; and
   (C) a dimming apparatus that adjusts light intensities of external light beams that enter from an outside,
   the image display apparatus including
     (a) an image forming apparatus, and
     (b) an optical apparatus having a virtual-image forming region in which virtual images are formed on a basis of light beams emitted from the image forming apparatus, the optical apparatus overlapping with at least a part of the dimming apparatus, when the dimming apparatus operates,
   (i) a light blocking rate of the dimming apparatus decreasing from an upper region and an outer-side region of a virtual-image-forming-region facing region toward a central portion of the virtual-image-forming-region facing region,
   (ii) the light blocking rate of the dimming apparatus decreasing from a lower region and the outer-side region of the virtual-image-forming-region facing region toward the central portion of the virtual-image-forming-region facing region,
   (iii) the light blocking rate of the dimming apparatus decreasing from the outer-side region of the virtual-image-forming-region facing region toward an inner-side region of the virtual-image-forming-region facing region,
   (iv) the light blocking rate of the dimming apparatus decreasing from the lower region of the virtual-image-forming-region facing region toward the upper region of the virtual-image-forming-region facing region, or
   (v) the light blocking rate of the dimming apparatus decreasing from an outer-edge region of the virtual-image-forming-region facing region toward the central portion of the virtual-image-forming-region facing region,
   the inner-side region being adjacent an observer's nose side, the outer-side region being adjacent an observer's ear side, the outer-edge region being along one or more edges of the virtual-image-forming-region, the central portion being surrounded by the one or more edges, the virtual-image-forming-region facing region being a region in the dimming apparatus, the virtual-image-forming-region facing region facing the virtual-image forming region in the optical apparatus, wherein the virtual-image-forming-region facing region and the virtual-image forming region have a same two-dimensional size.

2. The display apparatus according to claim 1, wherein the dimming apparatus includes
   a first substrate,
   a second substrate that faces the first substrate,
   a first transparent electrode provided to face a facing surface of the first substrate, the facing surface of the first substrate facing the second substrate,
   a second transparent electrode provided to face a facing surface of the second substrate, the facing surface of the second substrate facing the first substrate, and
   a dimming layer sandwiched between the first transparent electrode and the second transparent electrode.

3. The display apparatus according to claim 2, wherein the dimming layer contains an electrochromic material.

4. The display apparatus according to claim 3, wherein the dimming layer has a laminated structure including, from the first transparent electrode side,
   a $WO_3$ layer, and
   a $Ta_2O_5$ layer.

5. The display apparatus according to claim 1, wherein the optical apparatus is attached to the dimming apparatus.

6. The display apparatus according to claim 1, wherein the frame includes
   a front portion that is arranged in front of the observer,
   two temple portions attached in a freely pivotal manner to both ends of the front portion via hinges, and
   a nose pad, and
   the dimming apparatus is arranged at the front portion.

7. The display apparatus according to claim 6, wherein the front portion includes a rim, and
the dimming apparatus is fitted in the rim.

8. The display apparatus according to claim 1, wherein the optical apparatus includes
- (b-1) a light guide plate in which the light beams input from the image forming apparatus are propagated by total reflection in the light guide plate, and then emitted toward the observer,
- (b-2) first deflecting body that deflects the light beams input to the light guide plate such that the light beams input to the light guide plate are totally reflected in the light guide plate, and
- (b-3) second deflecting body that deflects the light beams propagated by the total reflection in the light guide plate such that the light beams propagated by the total reflection in the light guide plate are emitted from the light guide plate, and the virtual-image forming region in the optical apparatus is formed of the second deflecting body.

\* \* \* \* \*